United States Patent
Ando et al.

(10) Patent No.: US 7,031,310 B2
(45) Date of Patent: Apr. 18, 2006

(54) ROUTER AND IP-PACKET-TRANSFERRING METHOD

(75) Inventors: Tatsuhiro Ando, Kawasaki (JP); Toshiyuki Kamo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 09/845,581

(22) Filed: Apr. 30, 2001

(65) Prior Publication Data

US 2002/0080804 A1 Jun. 27, 2002

(30) Foreign Application Priority Data

Dec. 21, 2000 (JP) .............................. 2000-389032

(51) Int. Cl.
*H04L 12/28* (2006.01)

(52) U.S. Cl. ...................................... 370/392; 370/400

(58) Field of Classification Search ................... None
See application file for complete search history.

(56) References Cited

U.S. PATENT DOCUMENTS

| | | | | |
|---|---|---|---|---|
| 5,623,601 A * | 4/1997 | Vu | ............................. | 713/201 |
| 5,905,859 A * | 5/1999 | Holloway et al. | .......... | 713/201 |
| 6,075,776 A * | 6/2000 | Tanimoto et al. | ........... | 370/254 |
| 6,172,991 B1 * | 1/2001 | Mori | ........................... | 370/389 |
| 6,269,099 B1 * | 7/2001 | Borella et al. | .............. | 370/389 |
| 6,345,299 B1 * | 2/2002 | Segal | ......................... | 709/244 |
| 6,449,251 B1 * | 9/2002 | Awadallah et al. | ......... | 370/465 |
| 6,609,154 B1 * | 8/2003 | Fuh et al. | .................... | 709/225 |
| 6,662,223 B1 * | 12/2003 | Zhang et al. | ............... | 709/224 |
| 6,693,878 B1 * | 2/2004 | Daruwalla et al. | .......... | 370/392 |
| 6,708,218 B1 * | 3/2004 | Ellington et al. | ........... | 709/230 |
| 6,738,909 B1 * | 5/2004 | Cheng et al. | ............... | 709/223 |
| 6,754,832 B1 * | 6/2004 | Godwin et al. | ............. | 713/201 |
| 6,775,657 B1 * | 8/2004 | Baker | .......................... | 706/45 |
| 6,792,461 B1 * | 9/2004 | Hericourt | ..................... | 370/230 |
| 6,799,177 B1 * | 9/2004 | Fai et al. | ..................... | 709/217 |
| 6,816,903 B1 * | 11/2004 | Rakoshitz et al. | .......... | 709/226 |
| 6,839,809 B1 * | 1/2005 | Forster et al. | .............. | 711/134 |
| 6,854,063 B1 * | 2/2005 | Qu et al. | .................... | 713/201 |

FOREIGN PATENT DOCUMENTS

| | | |
|---|---|---|
| JP | 11-122265 | 4/1999 |
| JP | 2000505270 | 4/2000 |

* cited by examiner

*Primary Examiner*—Andrew C. Lee
(74) *Attorney, Agent, or Firm*—Katten Muchin Rosenman LLP

(57) ABSTRACT

In a router provided on a boundary between the Internet and an intranet and used for receiving an incoming first packet and then passing on the first packet to a destination router indicated by a destination address of the first packet, the router includes a decapsulation unit for carrying out a process of decapsulating the first packet into a second packet in the case of a predetermined address specified in the first packet as the destination address, and a first judgment unit for forming a judgment as to whether or not a user transmitting the first packet is an authorized user.

14 Claims, 59 Drawing Sheets

| Entry# | IP address (Source) | Open-network time | Blocked-network time |
|---|---|---|---|
| 1 | 139.40.0.0/16 | 21:00 | 6:00 |
| | | | |
| ⋮ | ⋮ | ⋮ | ⋮ |

| Entry# | IP address (Destination) | Distance * | ---------- |
|---|---|---|---|
| 1 | 204.70.0.0 | On | |
| | | | |
| ⋮ | ⋮ | ⋮ | ⋮ |

↑
134 #i

* On : Long distance
  Off : Short distance

FIG. 10

| Transmission-destination IP address | TOS | IHL | ---------- |
|---|---|---|---|
| 150.34.10.9 | 0 | 5 | |

↑
130#i

TOS ; Type of Service
IHL ; Internet Header Length

AS(Autonomous System) : Single management domain

FIG. 42

| Entry# | IP address (Source) | Open-network time | Blocked-network time | Predetermined packet count | The number of transmitted packets |
|---|---|---|---|---|---|
| 1 | 139.40.0.0/16 | 21:00 | 6:00 | | |
| ------- | ------- | ------- | ------- | ------- | ------- |

| Transmission-destination IP address | TOS | IHL | ------- | |
|---|---|---|---|---|
| 150.34.10.9 | 0 | 5 | | } Boundary router A |
| 151.24.15.3 | 0 | 5 | | } Boundary router C |
| ⋮ | ⋮ | ⋮ | | |

| Boundary-router IP address | ACT/NON-ACT | |
|---|---|---|
| 150.34.10.9 | | } Boundary router A |
| 151.24.15.3 | | } Boundary router C |
| ⋮ | ⋮ | |
| ⋮ | ⋮ | |

| Entry# | IP address (Source) | User category | Open-network time | Blocked-network time |
|---|---|---|---|---|
| 1 | 139.40.0.0/16 | Preferential treated | — | — |
| 2 | 139.40.0.0/16 | Ordinary | 21:00 | 6:00 |
| ------- | ------------------- | ------------- | ----------------- | -------------------- |

400 #i

ROUTER AND IP-PACKET-TRANSFERRING METHOD

BACKGROUND OF THE INVENTION

1. Field of the Invention

The present invention relates to a node and a method, which are used for transferring packets. More particularly, the present invention relates to a node and a method, which are used for transferring IP packets.

2. Description of the Related Art

At the present time, the Internet is becoming popular in the world very fast. By virtue of the Internet, people in the world are capable of communicating with each other, and the Internet also provides an environment allowing most recent information on the world. In addition, by building a network based on a technology taking advantage of the merits of the Internet within a corporation, employees of the corporation are capable of communicating with each other with a high degree of freedom. Such a network in a corporation is also useful to efforts made to share information. Moreover, operations carried out by the user to use such a network are all but the same as the operations performed to utilize the Internet. Thus, such a network offers big merits such as simple operations and a low cost to build a system. Furthermore, in order to protect the confidentiality of the corporation's internal information, the network is provided with a boundary router or a fire wall for protecting the network against an illegal access made by an outsider in an attempt to illegally obtain the information or illegally falsify the information. Such a network is known as an intranet which draws much attention nowadays. Traditionally, each corporation except a service provider designs an intranet capable of rejecting an access made by a third person having nothing to do with employees of the corporation. Also from the band point of view, the contemporary intranet has a network configuration with a high speed and, in general, is used during day times or office hours of corporations in most cases but almost not used at nights except for periodical preventive maintenance purposes. However, dedicated lines and network equipment which make accesses to an intranet operate for 24 hours a day with the power supplies thereof supplying power all the time. Thus, communication costs are wasted.

SUMMARY OF THE INVENTION

It is therefore an object of the present invention addressing the problems described above to provide a router and a communication network, which allow general users not working for a corporation to use an intranet of the corporation with a high degree of efficiency.

In accordance with an aspect of the present invention, there is provided a router placed on a boundary between the Internet and an intranet and used for receiving an incoming first packet and then passing on the first packet to a destination router indicated by a destination address of the first packet. The router is characterized in that the router comprises: a decapsulation unit for carrying out a process of decapsulating the first packet into a second packet in the case of the first packet including a predetermined address specified as the destination address; a first judgment unit for forming a judgment as to whether or not a user transmitting the first packet is an authorized user; a second judgment unit for forming a judgment as to whether or not the present time is within a time range allowed for the user transmitting the first packet; and a third judgment unit for forming a judgment as to whether or not the second packet obtained as a result of the process of decapsulating the first packet is allowed to pass through the intranet on the basis of a result of the judgment formed by the first judgment unit and a result of the judgment formed by the second judgment unit.

In accordance with another aspect of the present invention, there is provided a router used for receiving an incoming packet and then passing on the packet to a destination router indicated by a destination address of the packet. The router is characterized in that the router comprises: a first judgment unit for forming a judgment as to whether or not the present time is within a time range open to a user transmitting the packet; a second judgment unit for comparing a distance to the destination address along a route to be traveled by the packet by way of a predetermined network with a distance to the destination address along the route to be traveled by the packet by way of the Internet only without passing through the network; a third judgment unit for forming a judgment as to whether to pass on the packet to the destination address along the route passing through the network or a route by way of the Internet only without passing through the network on the basis of a result of the judgment formed by the first judgment unit and a result of the judgment formed by the second judgment unit; and an encapsulation unit which is used for creating an encapsulated packet by adding an encapsulation header destined for the predetermined network to the packet in case a result of the judgment formed by the third judgment unit indicates that the packet is to be passed on to the destination address by way of the predetermined network.

The above and other objects, features and advantages of the present invention as well as the manner of realizing them will become more apparent whereas the invention itself will be best understood from a careful study of the following description and appended claims with reference to attached drawings showing some preferred embodiments of the invention.

BRIEF DESCRIPTION OF THE DRAWINGS

FIG. 9 is a diagram showing the structure of a data management table used in the filtering unit shown in FIG. 8;

FIG. 10 is a diagram showing the structure of a data management table used in the filtering unit shown in FIG. 8;

FIG. 42 is a diagram showing the structure of a filtering management table used in the filtering unit shown in FIG. 41;

FIG. 51 is a diagram showing the structure of a data management table used in the filtering unit shown in FIG. 50;

FIG. 52 is a diagram showing the structure of a boundary-router-operation verification table used in the filtering unit shown in FIG. 50;

FIG. 60 is a diagram showing the structure of a filtering management table used in the filtering unit shown in FIG. 59;

DETAILED DESCRIPTION OF THE PREFERRED EMBODIMENTS

Figure 1:
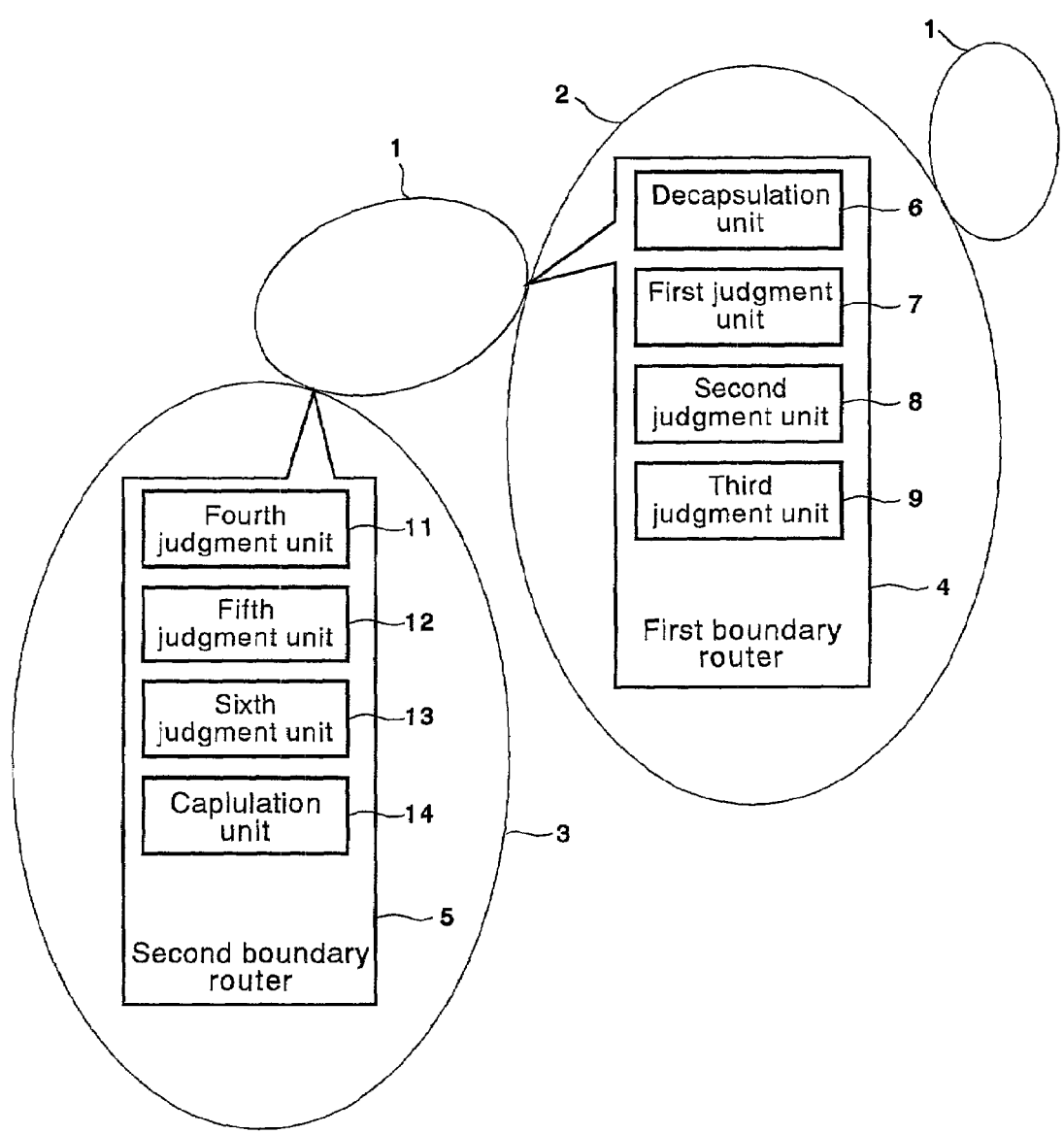
FIG. 1 is a diagram showing the principle of the present invention.

Prior to explanation of preferred embodiments provided by the present invention, the principle of the invention is described. FIG. 1 is a diagram showing the principle of the present invention. As shown in FIG. 1, a communication network provided by the present invention comprises the Internet 1, an intranet 2 and a user network 3. The intranet 2 includes a first boundary router 4. On the other hand, the user network 3 includes a second boundary router 5. The first boundary router 4 has a decapsulation unit 6, a first judgment unit 7, a second judgment unit 8 and a third judgment unit 9. On the other hand, the second boundary router 5 has an encapsulation unit 14, a fourth judgment unit 11, a fifth judgment unit 12 and a sixth judgment unit 13. The fourth judgment unit 11 employed in the second boundary router 5 forms a judgment as to whether or not the present time is within a time range open to a received packet. A time range open to a received packet is a time range during which the use of the intranet 2 is permitted for the received packet. The fifth judgment unit 12 compares a distance to a destination address of a received packet along a route to be traveled by the packet by way of the intranet 2 with a distance to the destination address along a route to be traveled by the packet by way of the Internet 1 only without passing through the intranet 2. The sixth judgment unit 13 forms a judgment as to whether to pass on a received packet to the destination address of the packet along the route passing through the intranet 2 or a route by way of the Internet 1 only without passing through the intranet 2 on the basis of a result of the judgment formed by the fourth judgment unit 11 on the packet and a result of the judgment formed by the fifth judgment unit 12 on the packet. If the present time is within the time range open to a received packet and a route through the intranet 2 is found shorter for transmitting the packet to the destination address thereof, for example, the sixth judgment unit 13 makes a decision to pass on the packet to the destination address along the route passing through the intranet 2. The encapsulation unit 14 generates an encapsulated packet if the result of the judgment formed by the sixth judgment unit 13 indicates that a received packet is to be passed on to the address destination thereof by way of the intranet 2. An encapsulated packet is created from a received packet by adding an encapsulation header destined for the first boundary router 4 to the received packet. The second boundary router 5 transmits an encapsulated packet to the first boundary router 4. The encapsulated packet is transmitted to the first boundary router 4 by way of the Internet 1.

The decapsulation unit 6 employed in the first boundary router 4 decapsulates a received packet into a second packet if the destination address of the received packet matches the address of the first boundary router 4. The first judgment unit 7 forms a judgment as to whether or not a user transmitting a received packet is an authorized user. The second judgment unit 8 forms a judgment as to whether or not the present time is within a time range allowed for a user transmitting a received packet. The third judgment unit 9 forms a judgment as to whether or not the second packet is allowed to pass through the intranet 2 on the basis of a result of the judgment formed by the first judgment unit 7 and a result of the judgment formed by the second judgment unit 8. Assume for example that a user transmitting a received packet is an authorized user and the present time is within a time range allowed for the user. In this case, the third judgment unit 9 makes a decision to let the second packet pass through the intranet 2. In accordance with this decision, the first boundary router 4 lets the second packet pass through the intranet 2. In this way, the general user is capable of using the intranet 2 effectively.

First Embodiment

Figure 2:
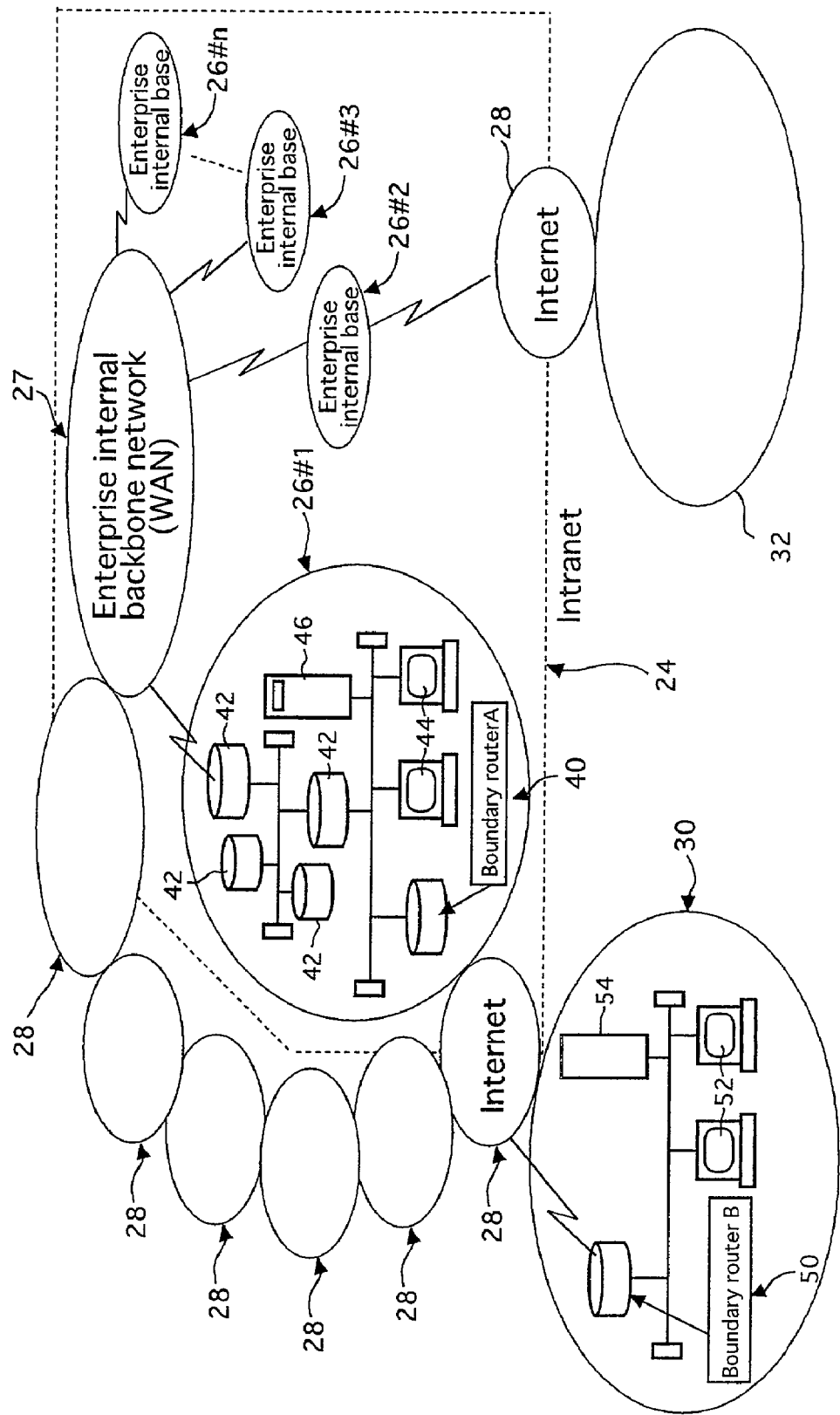
FIG. 2 is a diagram showing a communication network implemented by a first embodiment of the present invention.

FIG. 2 is a diagram showing a communication network implemented by a first embodiment of the present invention. As shown in FIG. 2, the communication network comprises the Internet 28, an intranet 24 and a general-user network 30. The intranet 24 is typically built for an enterprise which can be located at any place in the world. The intranet 24 comprises a plurality of enterprise internal bases 26#i in the enterprise where i=1 to n and an enterprise internal backbone network 27. The enterprise internal bases 26#i are provided at different sites of the enterprise. The enterprise internal bases 26#i are each a network built at a factory or a branch office inside the enterprise. An enterprise internal base 26#i communicates with another internal base 26#j where j≠i in the same enterprise through the enterprise internal backbone network 27. Each of the enterprise internal bases 26#i comprises a plurality of terminals, a server such as a database server, a router, and a boundary router. The number of terminals depends on the size of the enterprise internal base 26#i. For example, an enterprise internal base 26#1 comprises a boundary router A40, a plurality of routers 42, a plurality of terminals 44 and a database server 46.

The boundary router A40 is a router placed in the enterprise internal base 26#i of the intranet 24 on the boundary between the intranet 24 and the Internet 28. The boundary router A40 is also referred to as an edge node. The boundary router A40 allows a packet received from a particular user to pass through the intranet 24 during a time range open to the user. A time range open to a specific user is a time range during which the specific user is allowed to utilize the intranet 24. In general, a time range open to a specific user is a time range during which the enterprise is not using the intranet 24. An example of such a time range is a period of time at night. A specific user is a user allowed to use an intranet 24 in accordance with a contract made by the user with an enterprise owning the intranet 24. A router 42 allocates a route to a packet. The enterprise internal backbone network 27 is a main network connecting the enterprise internal bases 26#i where i=1 to n to each other. The enterprise internal backbone network 27 is a high-speed network such as an SDH network or an ATM network. The so-called Internet 28 is a network comprising a plurality of ISPs (Internet Service Providers) and IXCs (Internet Exchange Carriers). The Internet 28 allows the intranets 24 and the general-user networks 30 to communicate with each other.

The general-user networks 30 and 32 are each a service provider or a small-scale network for accommodating terminals of users utilizing an intranet 24. For example, the general-user network 30 comprises a boundary router B50, a plurality of terminals 52 each implemented by typically a personal computer and a database server 54. The boundary router B50 is a router placed in the general-user network 30 on the boundary between the general-user network 30 and the Internet 28. The boundary router B50 is thus also an edge node. An access to an object at a long distance during an open-network time range of an intranet 24 is made as an encapsulated packet including the address of a boundary router A40 as a destination address. The packet is then output to the Internet 28, being transmitted through a route leading to an intranet 24 including the boundary router A40. The "long distance" here indicates that, with respect to a distance (the number of domains) to the destination address, the distance to be traveled by a packet by way of the Internet 28 only is longer than the distance to be traveled by a packet by way of the Internet 28 and an intranet 24. A merit for a user making use of an intranet 24 is a capability of communicating with a destination address at a speed higher than a communication through the Internet 28 only. In the case of a long distance, the enjoyment of this merit is expected particularly. In an access to an object at a short distance or an access during a blocked-network time range of an intranet 24, the accessing packet is output to the Internet 28, being transmitted through a route passing through the Internet 28 only.

Figure 3:
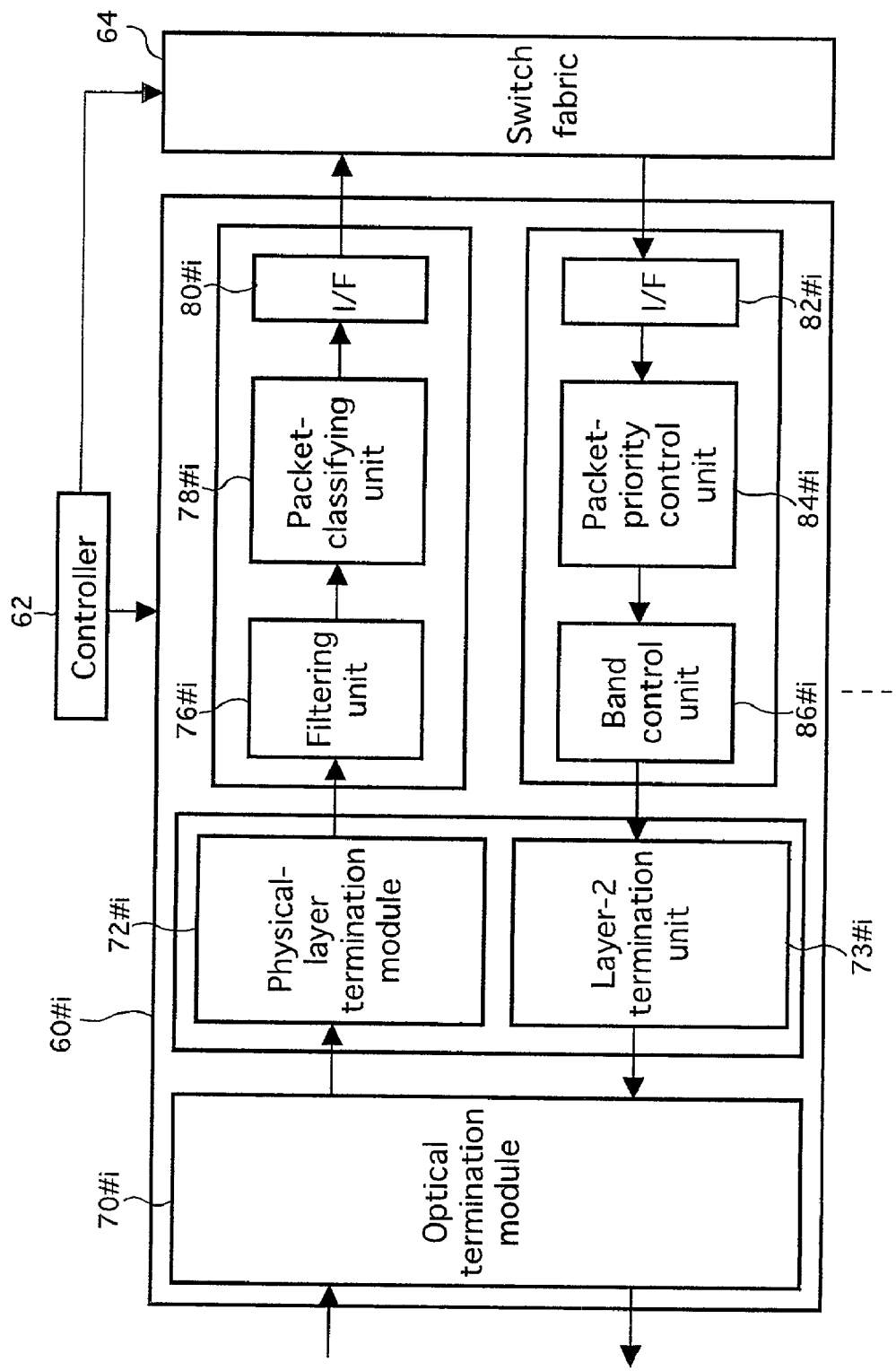
FIG. 3 is a diagram showing the configuration of boundary router A employed in the communication network shown in FIG. 2.

FIG. 3 is a diagram showing the configuration of the boundary router A40 employed in the communication network shown in FIG. 2. As shown in FIG. 3, the boundary router A40 comprises a plurality of IO port cards 60#k where k=1 to m, a controller 62 and a switch fabric 64. Each of the IO port cards 60#k is plugged into a card slot of the boundary router A40 and interfaces with the switch fabric 64 through transmission lines of layers 1 and 2. The IO port card 60#k has a function for layer 1 different from a function thereof for layer 2. In this embodiment, an IO port card 60#k interfacing with the Internet 28 is different from that of the conventional apparatus. For this reason, reference numeral 60#i is deliberately used for denoting the IO port card. The IO port card 60#i is explained as follows.

The IO port card 60#i comprises an optical termination module 70#i, a physical-layer termination module 72#i, a layer-2 termination module 73#i, a filtering unit 76#i, a packet-classifying unit 78#i, I/F units 80#i and 82#i, a packet-priority control unit 84#i and a band control unit 86#i. The optical termination module 70#i carries out optoelectrical conversion and electro-optical conversion. The physical-layer termination module 72#i terminates a physical layer. The layer-2 termination unit 73#i terminates layer 2. The filtering unit 76#i executes control as to whether or not a packet is allowed to pass through the intranet 24. A user packet is allowed to pass through the intranet 24 typically if the packet is transmitted by an authenticated specific user during a time range open to the user and for making no access to the intranet 24. An open-network time range of an intranet 24 is set for specific users in order to effectively utilize resources of the intranet 24 of an enterprise and to avoid an illegal access. A user transmitting a packet is authenticated typically from a transmission address included in the packet. The open-network time range is typically cataloged in advance in a table. The present time can then be compared with the open-network time range in order to form a judgment as to whether the present time falls within the range.

Figure 4:
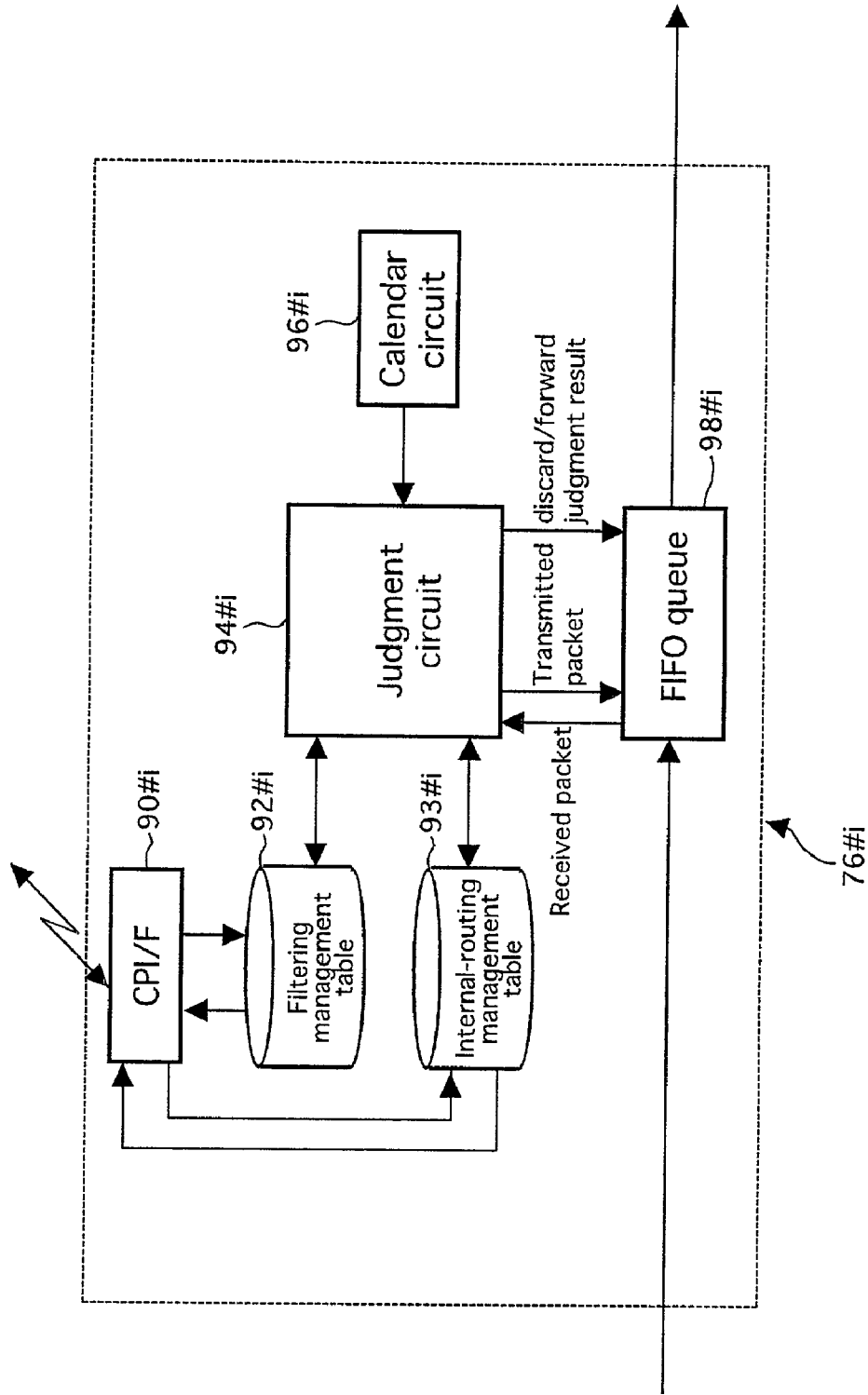
FIG. 4 is a diagram showing the configuration of a filtering unit employed in boundary router A shown in FIG. 3.

FIG. 4 is a diagram showing the configuration of the filtering unit 76#i employed in the boundary router A40 shown in FIG. 3. As shown in FIG. 4, the filtering unit 76#i comprises a CPI/F 90#i, a filtering management table 92#i, an internal routing management table 93#i, a judgment circuit 94#i, a calendar circuit 96#i and a FIFO queue 98#i. The CPI/F 90#i is an interface with the controller 62.

Figures 5, 6:
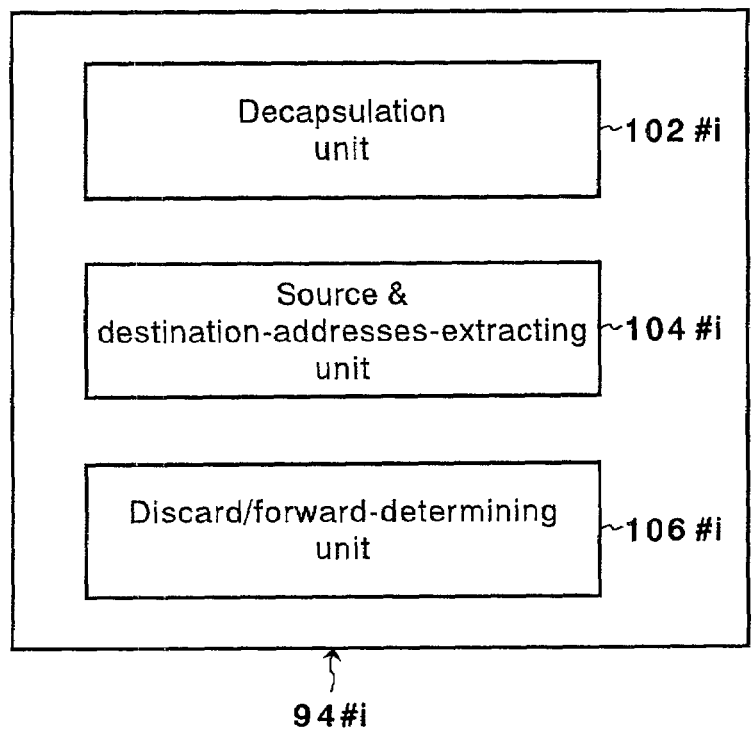
FIG. 5 is a diagram showing the structure of a filtering management table used in the filtering unit shown in FIG. 4.
FIG. 6 is a diagram showing the configuration of a judgment circuit employed in the filtering unit shown in FIG. 4.

FIG. 5 is a diagram showing the structure of the filtering management table 92#i used in the filtering unit 76#i shown in FIG. 4. The filtering management table 92#i shown in FIG. 5 is created by the controller 62 to include information supplied by a person in charge of maintenance via input means such as a keyboard not shown in the figure through the CPI/F 90#i. As shown in the figure, for each source IP address, an open time and a blocking time are cataloged in the filtering management table 92#i. A source IP address is the IP address of a user authorized to use the intranet 24. Authorization can be set for each user or for each network. If authorization is set for each network, the address of a network is cataloged as an IP address. An open time for a user is a time at which the intranet 24 is opened for use by the user. An example of the open time is 21:00. A block time for a user is a time at which the intranet 24 is blocked against use by the user. An example of the open time is 6:00.

The internal routing management table 93#i is a table used for forming a judgment as to whether or not a destination address is the address of the intranet 24 including the table 93#i. The internal routing management table 93#i is also created by the controller 62 on the basis of information supplied by a person in charge of maintenance via input means such as a keyboard not shown in the figure through the CPI/F 90#i. The internal routing management table 93#i includes information on whether a destination address is an address within or outside the intranet 24 and routing information.

FIG. 6 is a diagram showing the configuration of the judgment circuit 94#i employed in the filtering unit 76#i shown in FIG. 4. The judgment circuit 94#i is a circuit for forming a judgment as to whether or not a received packet is allowed to pass through the intranet 24. As shown in FIG. 6, the judgment circuit 94#i comprises a decapsulation unit 102#i, a source & destination addresses-extracting unit 104#i and a discard/forward-determining unit 106#i. The decapsulation unit 102#i executes the following functions: 1) Form a judgment as to whether or not a destination address is the address of the boundary router A40 including the decapsulation unit 102#i. 2) Decapsulate a received packet if the packet is destined for the boundary router A40 including the decapsulation unit 102#i. A received packet destined for the boundary router A40 has been encapsulated by the boundary router B50 as will be described later. 3) Make a request to discard a received packet if the packet is not destined for the boundary router A40 in order to avoid an illegal access.

The source & destination-addresses-extracting unit 104#i extracts a source address and a destination address from a decapsulated packet header. The discard/forward-determining unit 106#i executes the following functions: 1) Search the filtering management table 92#i for an address matching the source address of a received packet to form a judgment as to whether or not the source address is the address of an authorized user. 2) Make a request to discard a received packet if the source address is not the address of an authorized user. 3) Acquire a present time from the calendar circuit 96#i to form a judgment as to whether or not the present time is within the open-network time range if the source address is the address of an authorized user. Make a request to pass on the receive packet if the present time is within the open-network time range. Make a request to discard a received packet if the present time is not within the open-network time range.

The calendar circuit 96#i is a clock for generating the present time. The FIFO queue 98#i executes the following functions: 1) Store a received packet on a first-in-first-out (FIFO) stored basis. 2) Supply a stored packet to the judgment circuit 94#i on a FIFO (First In First Out) basis. 3) Discard a stored received packet or pass on a decapsulated packet in accordance with the result of the judgment formed by the judgment circuit 94#i to determine whether a received packet is to be discarded or passed on. A decapsulated packet to be passed on is output from the judgment circuit 94#i through the FIFO queue 98#i as shown in FIG. 4. It should be noted that, if the result of the judgment indicates that a packet is to be discarded, the packet can also be output from the IO port card 60#i to the switch fabric 64 as shown in FIG. 3 instead of being discarded. In this way, a packet incorrectly transmitted to the boundary router A40 is passed on to the destination address thereof through the Internet 28 only.

The packet-classifying unit 78#i shown in FIG. 3 controls a QoS of a packet. The I/F units 80#i and 82#i are each an interface between the IO port card 60#i and the switch fabric 64#i. The packet-priority control unit 84#i controls priorities of packets. The band control unit 86#i controls a transmission band in accordance with setting. The controller 62 executes the following functions: 1) Create a routing table and execute routing control based on the table. 2) Generate the filtering management table 92#i and the internal routing management table 93#i in the filtering unit 76#i.

The controller 62 is capable of creating the filtering management table 92#i and the internal routing management table 93#i since the controller 62 is a processor which creates a routing table and is capable of communicating with the input means such as a keyboard. The switch fabric 64 receives a packet and passes on the packet to the IO port card.

Figure 7:
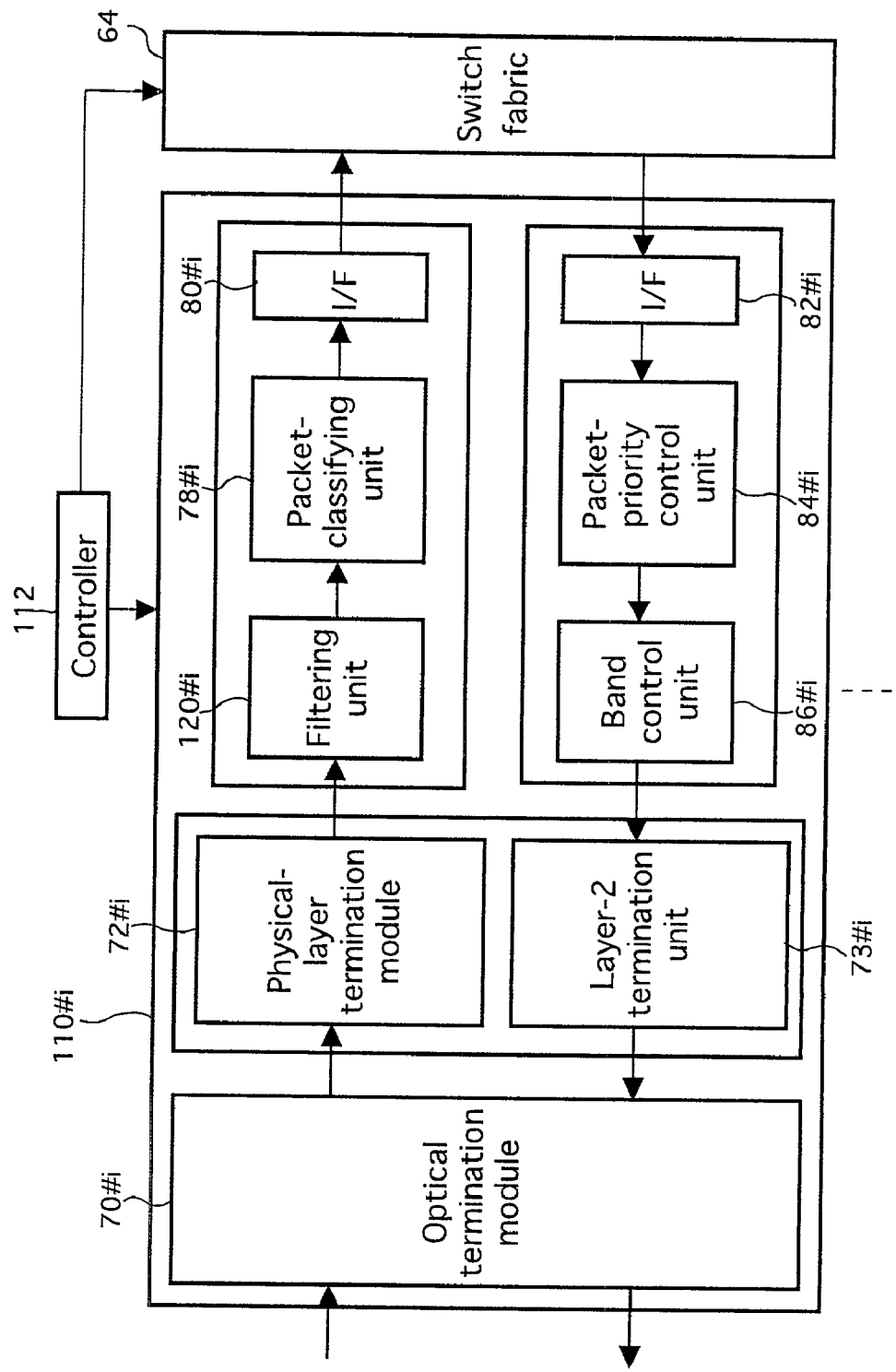
FIG. 7 is a diagram showing the configuration of boundary router B employed in the communication network shown in FIG. 2.

FIG. 7 is a diagram showing the configuration of the boundary router B50 employed in the communication network shown in FIG. 2. Configuration elements of the boundary router B50 which are virtually identical with those employed in the boundary router A40 shown in FIG. 3 are denoted by the same reference numerals as the latter. As shown in FIG. 7, the boundary router B50 comprises a plurality of IO port cards 110#k where k=1 to m, a controller 112 and the switch fabric 64. Each of the IO port cards 110#k is plugged into a card slot of the boundary router B50 and interfaces with the switch fabric 64 through transmission lines of layers 1 and 2. In this embodiment, the IO port card 110#k interfacing with a transmission line accommodating the terminals 52 of the general-user network 30 is different from that of the conventional apparatus. Deliberately denoted by reference numeral 110#i for this reason, the IO port card is explained as follows. The controller 112 executes the following functions: 1) Create a routing table and control routing based on the table. 2) Create a table to be described later in the filtering unit 120#i.

Figure 8:
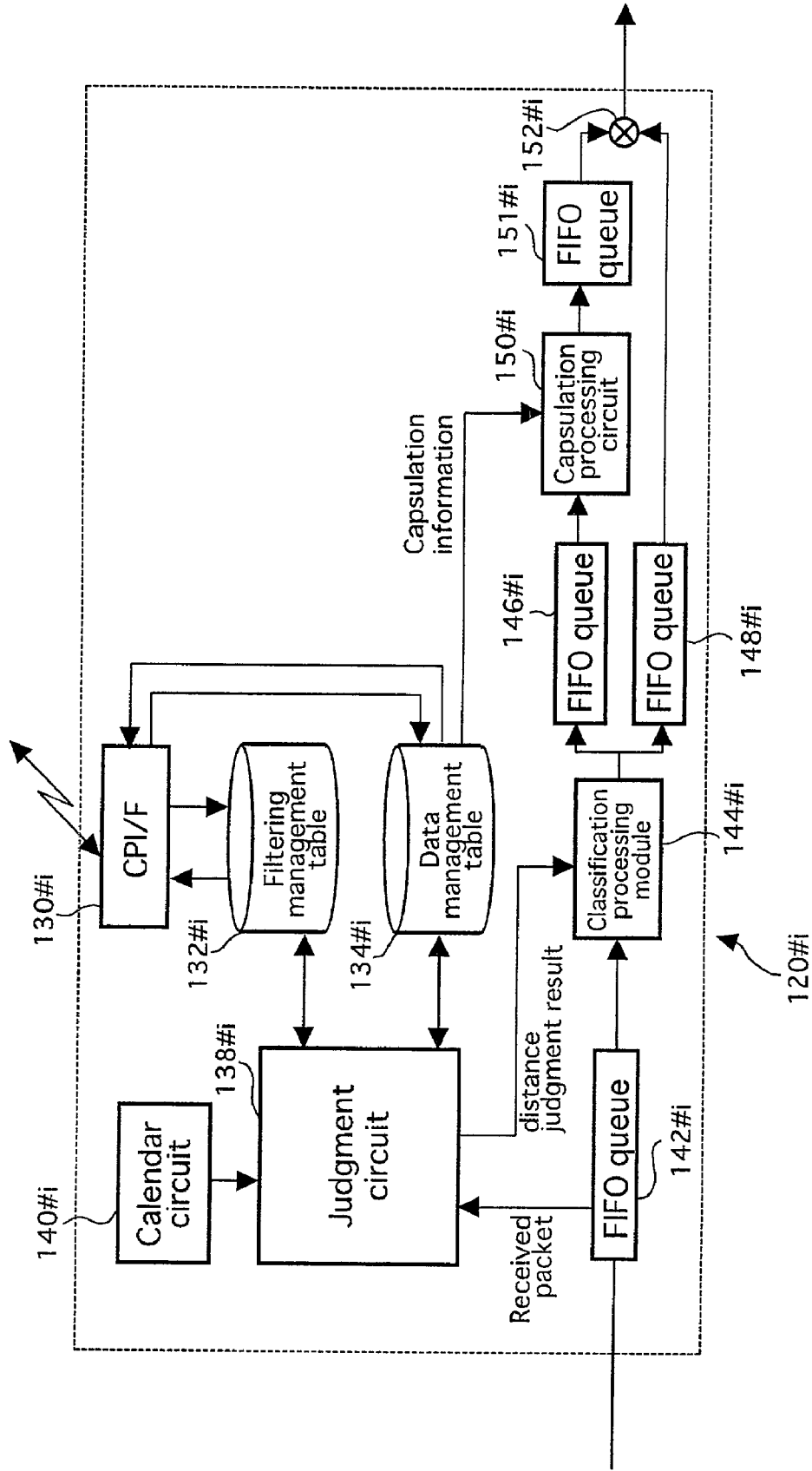
FIG. 8 is a diagram showing the configuration of a filtering unit included in boundary router B shown in FIG. 7.

FIG. 8 is a diagram showing the configuration of the filtering unit 120#i included in boundary router B50 shown in FIG. 7. As shown in FIG. 8, the filtering unit 120#i comprises a CPI/F unit 130#i, a filtering management table 132#i, a routing management table 134#i, a data management table 136#i, a judgment circuit 138#i, a calendar circuit 140#i, a input FIFO queue 142#i, a classification processing module 144#i, a encapsulation FIFO queue 146#i, a no-encapsulation FIFO queue 148#i, an encapsulation processing circuit 150#i, an output FIFO queue 151#i and a synthesis unit 152#i. The CPI/F unit 130#i receives data from the controller 112, downloading the data into the filtering management table 132#i and the data management table 134#i. The filtering management table 132#i is virtually identical with the filtering management table 92#i shown in FIG. 5. That is to say, for the source IP address of each user utilizing the general-user network 30, an open time and a blocking time are cataloged in the filtering management table 132#i.

FIG. 9 is a diagram showing the structure of the data management table 134#i used in the filtering unit 120#i shown in FIG. 8 for routing. As shown in FIG. 9, for each destination address, distance information indicating a long distance (On) or a short distance (Off) is cataloged. As described above, the "long distance" means that, with respect to a distance to the destination, the distance to be traveled by a packet by way of the Internet 28 only is longer than the distance to be traveled by a packet by way of the Internet 28 and an intranet 24. The information on a distance is set by a person in charge of maintenance in this embodiment.

FIG. 10 is a diagram showing the structure of the data management table 134#i used in the filtering unit 120#i shown in FIG. 8 for encapsulation. As shown in FIG. 10, the data management table 134#i is used for storing pieces of information to be set in an encapsulation header in encapsulation of a packet. Encapsulation is a process of adding an encapsulation header to a packet to destine the packet to the boundary router A40. An encapsulation header is the header of a capsule obtained as a result of encapsulation. Without an encapsulation header, a received packet is delivered to a terminal indicated by the destination address of the packet by way of the Internet 28 only. That is to say, it is impossible to deliver a received packet without an encapsulation header to a terminal indicated by the destination address of the packet by way of the Internet 28 and an intranet 24.

The pieces of encapsulation information include the address of the boundary router A40 for the transmission destination (or the IP address of the transmission destination), a TOS (Type of Service) and an IHL (Internet Header Length). The TOS is information on priority control to be executed till the packet is delivered to the boundary router A40. The TOS can have a fixed value or a value set in the received packet. In the example shown in FIG. 10, the TOS is set at a fixed value of 0. It should be noted that, if the TOS has a value set in the received packet, the same priority control as the packet is executed till the packet is delivered to the boundary router A40. The IHL is the length of the encapsulation header. The IHL is set at 5 indicating the sum of 4 address bytes and 1 TOS byte. It should be noted that, if there is a plurality of available intranets 24, the address of a transmission destination, a TOS and an IHL are cataloged for each destination address. In this case, a received packet is encapsulated in accordance with one of the destination addresses.

Figure 11:
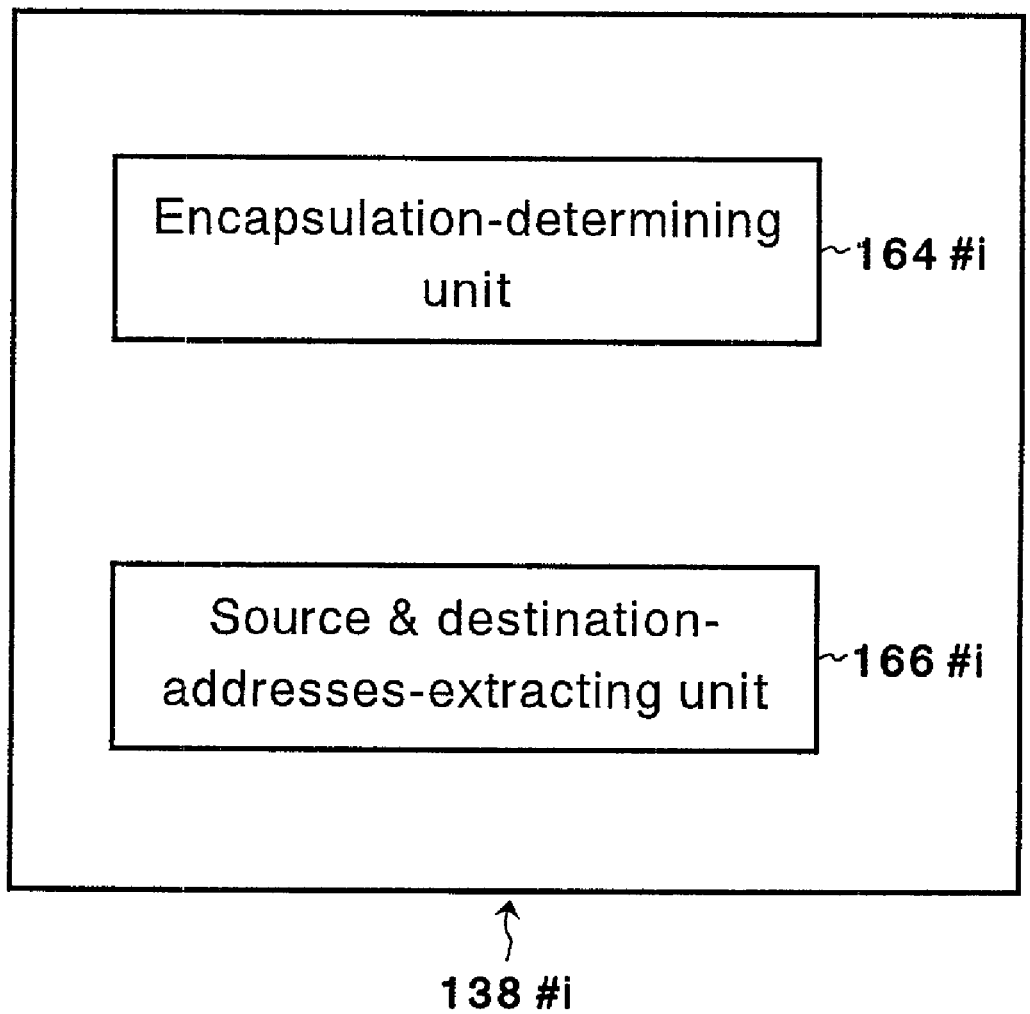
FIG. 11 is a diagram showing the configuration of a judgment circuit employed in the filtering unit shown in FIG. 8.

FIG. 11 is a diagram showing the configuration of the judgment circuit 138#i employed in the filtering unit 120#i shown in FIG. 8. As shown in FIG. 11, the judgment circuit 138#i comprises a source & destination-addresses-extracting unit 164#i and an encapsulation-determining unit 166#i. The source & destination-addresses-extracting unit 164#i reads out a received packet from the input FIFO queue 142#i and then extracts a source address as well as a destination address from the packet. The encapsulation-determining unit 166#i executes the following functions: 1) Search the filtering management table 132#i for an address matching the source address of a received packet to form a judgment as to whether or not the present time is within the open-network time range for the address. 2) If the present time is within a blocked-network time range, inform the classification processing module 144#i of a result of a judgment on a distance indicating that the distance is a short distance to be traveled through the Internet 28 only. 3) Search the data management table 134#i for filtering for information on a distance cataloged for the destination address included in a received packet. 4) If the present time is within a blocked-network time range and the information on a distance is set at off status to indicate a short distance, inform the classification processing module 144#i of the result of a judgment on a distance indicating that the distance is a short distance to be traveled through the Internet 28 only. 5) If the information on a distance is set at on status to indicate a long distance, inform the classification processing module 144#i of a result of a judgment on a distance indicating that the distance is a long distance to be traveled through the Internet 28 and an intranet 24.

The input FIFO queue 142#i shown in FIG. 8 is a FIFO buffer for storing received packets. The classification processing module 144#i executes the following functions: 1) Read out a received packet from the input FIFO queue 142#i. 2) If the result of a judgment formed by the judgment circuit 138#i indicates a long distance, write the received packet into the encapsulation FIFO queue 146#i. 3) If the result of a judgment formed by the judgment circuit 138#i indicates a short distance, write the received packet into the no-encapsulation FIFO queue 148#i.

The encapsulation FIFO queue 146#i is a FIFO buffer for storing received packets to be encapsulated. On the other hand, the no-encapsulation FIFO queue 148#i is a FIFO buffer for storing received packets other than received packets to be encapsulated.

The encapsulation unit 150#i executes the following functions: 1) Read out a received packet from the encapsulation FIFO queue 146#i. 2) Read out an encapsulation header from the data management table 136#i. 3) Add the encapsulation header to the received packet and store the received packet as well as the encapsulation header into the output FIFO queue 151#i.

The synthesis unit 152#i reads out an encapsulated packet from the output FIFO queue 151#i and an uncapsulated packet from the no-encapsulation FIFO queue 148#i, merging both the packets with each other.

Figure 12:
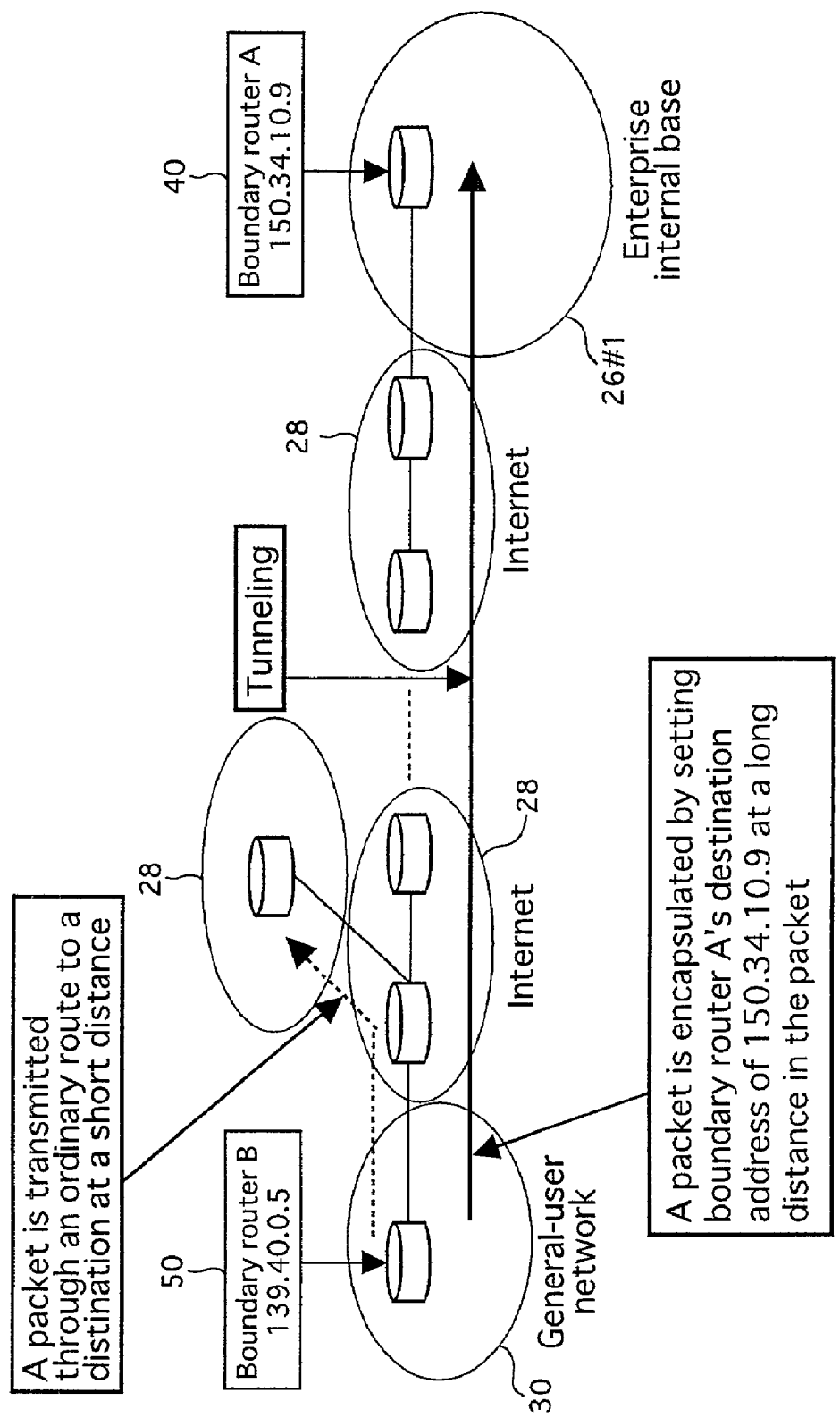
FIG. 12 is an explanatory diagram showing the operation of the communication network shown in FIG. 2.
Figure 13:
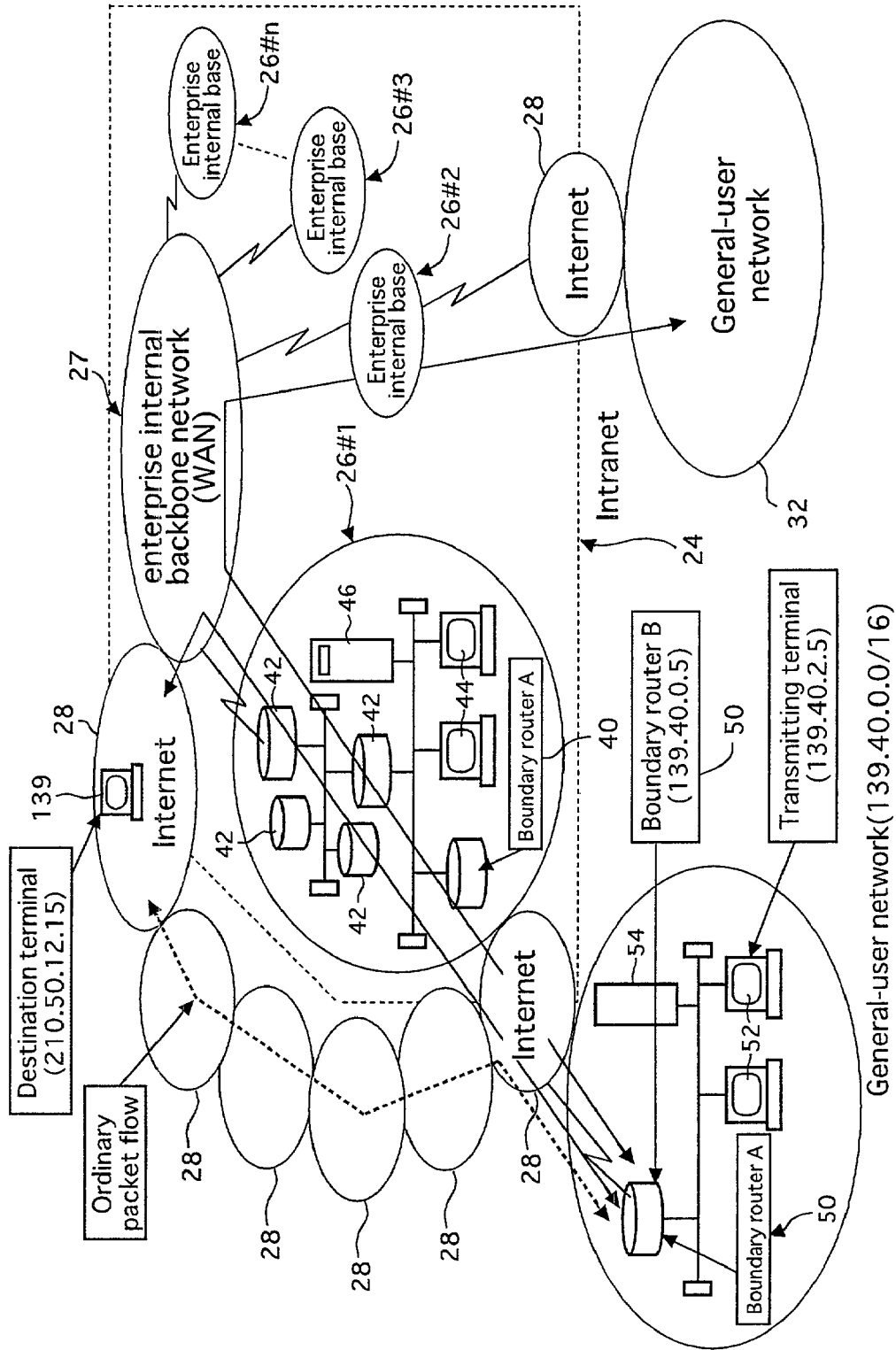
FIG. 13 is another explanatory diagram showing the operation of the communication network shown in FIG. 2.

FIGS. 12 and 13 are each an explanatory diagram showing the operation of the communication network shown in FIG. 2. The operation of the communication network shown in FIG. 2 is explained by referring to FIGS. 12 and 13 as follows.

1: Boundary Router B50

As an example, the following description explains a case in which a terminal 52 connected to the general-user network 30 transmits a packet to a terminal or the like connected to the Internet 28 other than the intranets 24. The terminal 52 sets a destination address, that is, the address of the terminal on the Internet 28, in the header of the packet prior to transmission of the packet through a transmission line. The optical termination module 70#i employed in the IO port card 110#i of the boundary router B50 accommodating the terminal 52 converts a packet signal from an optical signal into an electrical one. The layer-2 termination unit 73#i terminates a physical layer, outputting a packet to the filtering unit 120#i.

Figure 14:
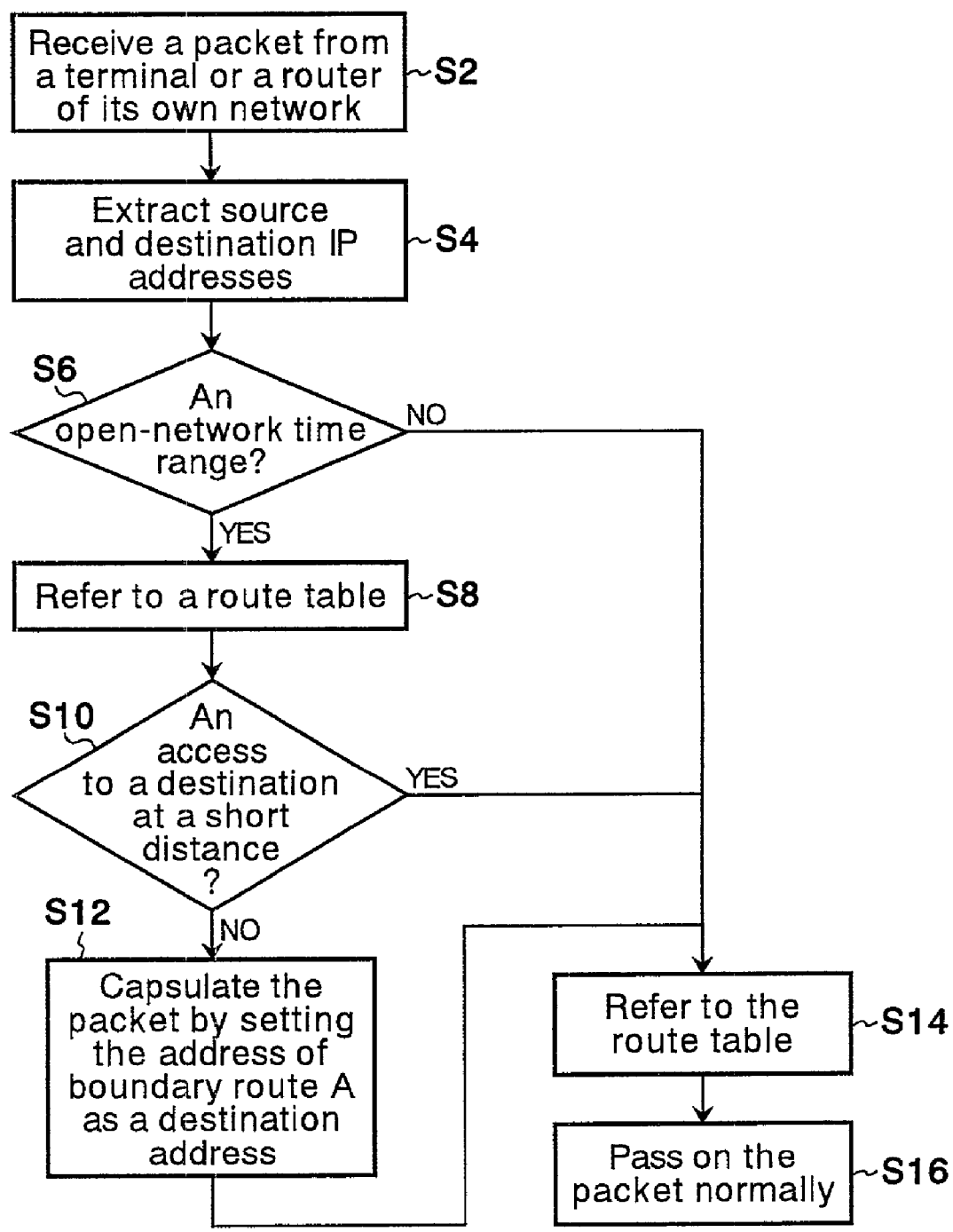
FIG. 14 is a flowchart representing packet control executed by boundary router B.

FIG. 14 is a flowchart representing packet control executed by the boundary router B50. As shown in the figure, the flowchart begins with a step S2 at which the input FIFO queue 142#i stores a received packet in the FIFO buffer thereof. At the next step S4, the judgment circuit 138#i reads out a received packet from the input FIFO queue 142#i and extracts a source IP address and a destination IP address from the packet. At the next step S6, the judgment circuit 138#i acquires a present time from the calendar circuit 140#i and searches the filtering management table 132#i for an open-network time range for the source IP address. The judgment circuit 138#i then forms a judgment as to whether or not the present time is within the open-network time range. If the present time is found to be within the open-network time range, the flow of the control goes on to a step S8. If the present time is found to be outside the open-network time range, on the other hand, the classification processing module 144#i is informed of a result of the judgment indicating a short distance. The flow of the control then goes on to a step S14.

At the step S8, the judgment circuit 138#i searches the routing management table 134#i for distance information associated with the destination IP address. At the next step S10, the judgment unit 138#i forms a judgment as to whether or not the destination IP address of the packet is an address at a short distance. If the destination IP address of the packet is found to be an address at a short distance, the classification processing module 144#i is informed of a result of the judgment indicating a short distance. In this case, the classification processing module 144#i stores the packet into the no-encapsulation FIFO queue 148#i for storing packets destined for a destination at a short distance. The flow of the control then goes on to a step S14. If the destination IP address of the packet is found to be an address at a long distance, on the other hand, the classification processing module 144#i is informed of a result of the judgment indicating a long distance. The flow of the control then goes on to a step S12. At the step S12, the classification processing module 144#i stores the received packet into the encapsulation FIFO queue 146#i since the result of the judgment indicates a long distance. The encapsulation unit 150#i reads out a packet from the encapsulation FIFO queue 146#i. The encapsulation unit 150#i then acquires an encapsulation header for the packet from the routing management table 134#i. For example, the encapsulation header acquired from the routing management table 134#i comprises an address of 150.34.10.9 assigned to the boundary router A40, a TOS of 0 and an IHL of 5. The encapsulation header is added to the packet to result in an encapsulated packet which is then written into the output FIFO queue 151#i.

The synthesis unit 152#i reads out an encapsulated packet from the output FIFO queue 151#i and an uncapsulated packet from the no-encapsulation FIFO queue 148#i, multiplexing the packets with each other without regard to whether the result of the judgment formed at the step S10 indicates a short distance or a long distance. The packet-classifying unit 78#i executes QoS control on the multiplexed packets and supplies the multiplexed packets to the switch fabric 64 by way of the I/F unit 80#i.

At the step S14, the switch fabric 64 searches a route table for a route to the destination address of a packet, and outputs the packet to an IF unit 82#j connected to the route where j≠i at the next step S16. Typically, the packet is subjected to priority control executed by the packet-priority control unit 84#i and band control executed by the band control unit 86#i before being output to an optical transmission line by way of the layer-2 termination module 73#j, the physical-layer termination module 72#j and the optical termination module 70#j. For example, a packet destined for an area at a short distance is transmitted to the area through an ordinary route of the Internet 28 only as shown by a dashed line in FIG. 12. On the other hand, a packet destined for an area at a long distance is transmitted to the boundary router A40 with a destination address of 150.34.10.9 by way of the Internet 28 in accordance with a normal routing protocol as shown by a solid line in FIG. 12.

2: Boundary Router A40

Figure 15:
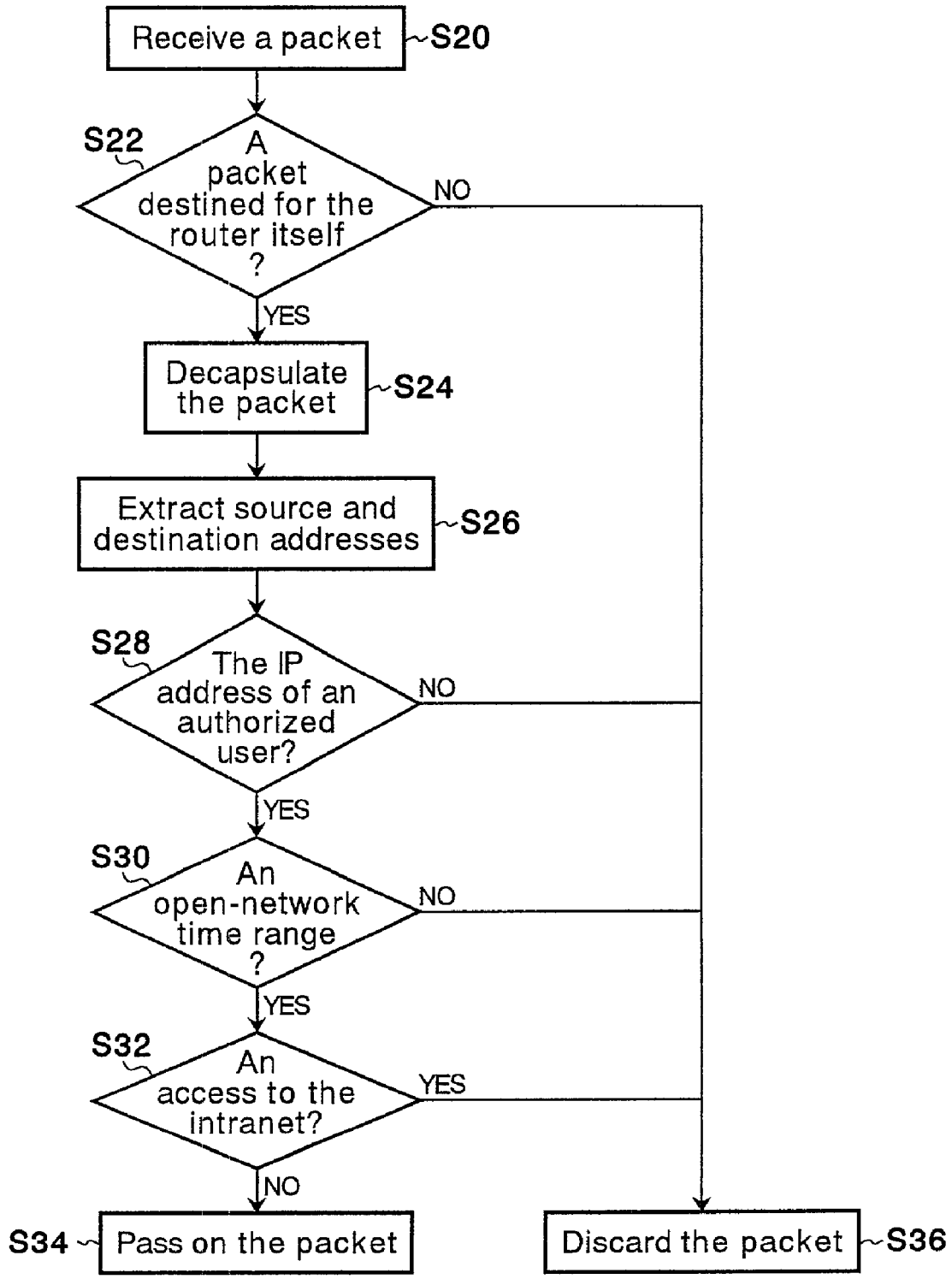
FIG. 15 is a flowchart representing packet control executed by boundary router A.

FIG. 15 is a flowchart representing packet control executed by the boundary router A40 shown in FIG. 3. As shown in the figure, the flowchart begins with a step S20 at which the appropriate IO port card 60#i employed in the boundary router A40 receives a packet transmitted by the boundary router B50 by way of the Internet 28 and then stores the packet into the FIFO queue 98#i. At the next step S22, the judgment circuit 94#i reads out a received packet from the FIFO queue 98#i and then forms a judgment as to whether or not the destination address of the packet matches the address of the boundary router A40, that is, whether or not the packet is destined for the router itself. If the packet is found destined for the router itself, the flow of the control goes on to a step S24. If the packet is not destined for the router itself, on the other hand, the FIFO queue 98#i is informed of a result of the judgment indicating that the packet is to be discarded. Then, the flow of the control goes on to a step S36.

At the step S24, the judgment circuit 94#i decapsulates the packet, that is, removes the encapsulation header from the packet. At the next step S26, the judgment circuit 94#i extracts the destination address and the source address from the decapsulated packet. At the next step S28, the judgment circuit 94#i searches the filtering management table 92#i for an address matching the source address to form a judgment as to whether or not the source address is the IP address of an authorized user. If the source address is found to be the IP address of an authorized user, the flow of the control goes on to a step S30. If the source address is found to be not the IP address of an authorized user, on the other hand, the FIFO queue 98#i is informed of a result of the judgment indicating that the packet is to be discarded. The flow of the control then goes on to a step S36. At the step S30, the judgment circuit 94#i acquires a present time from the calendar circuit 96#i and forms a judgment as to whether or not the present time is within an open-network time range by referring to the filtering management table 92#i. If the present time is found to be within an open-network time range, the flow of the control goes on to a step S32. If the present time is found to be outside the open-network time range, on the other hand, the flow of the control goes on to the step S36.

At the step S32, the judgment circuit 94#i forms a judgment as to whether or not the destination IP address is an address of an access to the intranet 24, that is, whether or not a terminal or the like indicated by the destination IP address is connected to the intranet 24. If the destination IP address is found to be an address of an access to a destination within the intranet 24, the FIFO queue 98#i is informed that the packet is to be passed on. The flow of the control then goes on to a step S34. If the destination IP address is found to be an address of an access to a destination outside the intranet 24, on the other hand, the FIFO queue 98#i is informed that the packet is to be discarded. The flow of the control then goes on to the step S36. It should be noted that, instead of being discarded at the step S36, the decapsulated packet can also be output to the switch fabric 64. In this way, the packet is transmitted to the destination outside the intranet 24 through the Internet 28 in accordance with the normal routing protocol.

At the step S34, the FIFO queue 98#i outputs a packet to be passed on in accordance with the result of the judgment formed at the step S32 to the switch fabric 64 by way of the packet-classifying unit 78#i and the I/F unit 80#i. At the step S36, on the other hand, the FIFO queue 98#i disposes a packet to be discarded in accordance with the result of the judgment formed at the step S32. The FIFO queue 98#i always outputs or discards a packet that was stored in the FIFO buffer thereof least recently and updates the address of a packet to be output or discarded next from the FIFO buffer.

The switch fabric 64 outputs a packet supplied thereto to a transmission line by way of an IO port card 60#i corresponding to the destination address included in the packet.

3: Interior of the Intranet 24

In the intranet 24, an incoming packet is passed on to another boundary router by way of the first boundary router 42 and the enterprise internal backbone network 27. The other boundary router may then deliver the packet to a terminal or the like indicated by the destination address by way of the Internet 28 corresponding to the destination address. It should be noted that, if a to-be-forwarded packet from the general-user network 30 requires that a path for propagating through the enterprise internal backbone network 27 be set, such a path is set in advance. In addition, a path may be set for a time range occupied by the enterprise separately from a path set for a time range open to use of the intranet 24 by outsiders. Assume that the enterprise internal backbone network 27 is an SDH network. In this case, a time slot is allocated to an authorized user. If the enterprise internal backbone network 27 is an ATM network, on the other hand, a connection is allocated.

Let an authorized user transmit a packet with a destination address of 210.50.12.15 at a long distance during an open-network time range. To put it concretely, the packet is transmitted to a terminal 139 of the Internet 28 by way of an intranet 24 as shown in FIG. 13. Likewise, a packet satisfying similar conditions may be transmitted to the general-user network 32 by way of the Internet 28 and the intranet 24.

In accordance with the embodiment described above, by making resources of the intranet 24 for use by general users at nights or the like, the resources can be utilized effectively during non-office hours. The resources include a dedicated line and intra-equipment such as network equipment. The general users are also known as third-party Internet users. In this way, the enterprise is capable of partially recovering the operating cost of the network without disturbing normal businesses of employees. In addition, a number of night users is dial-up connection users. Thus, by making the high-speed network of an enterprise directly usable to night users and ISPs (Internet Service Providers) rendering services to such users particularly at congested night times, the users are allowed to enjoy delightful services using the high-speed network inside the enterprise.

Second Embodiment

Figure 16:
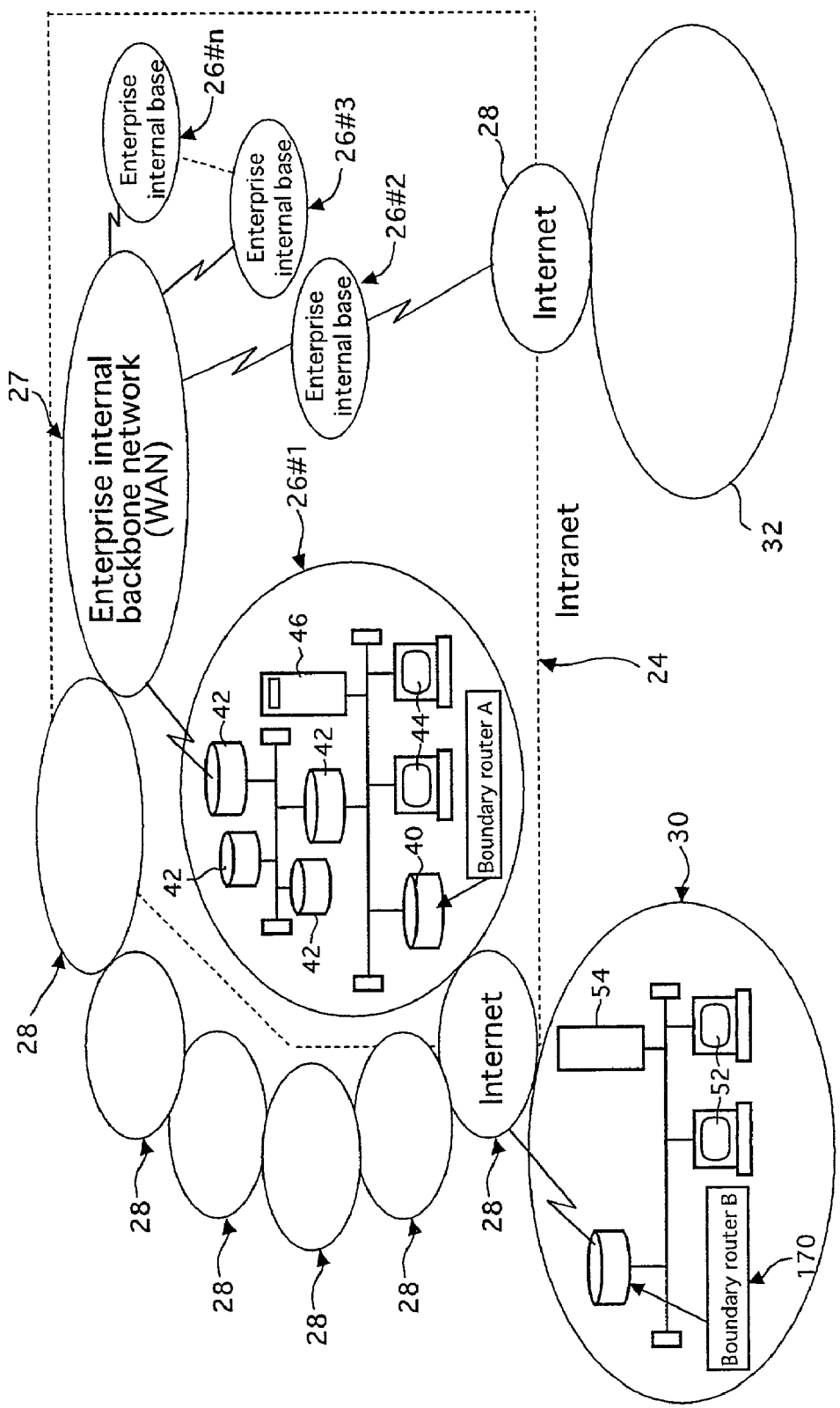
FIG. 16 is a diagram showing a communication network implemented by a second embodiment of the present invention.

FIG. 16 is a diagram showing a communication network implemented by a second embodiment of the present invention. Configuration elements of the second embodiment which are virtually identical with those employed in the first embodiment shown in FIG. 2 are denoted by the same reference numerals as the latter. In the case of the first embodiment, the information on a distance is set in the boundary router B50 by a person in charge of maintenance by inputting data via typically a keyboard. In the case of the second embodiment, on the other hand, a boundary router B170 shown in FIG. 16 automatically generates information on a distance in a way different from the first one.

As described above, the controller 112 employed in the first embodiment executes the following functions: 1) Generate a routing table and execute routing control based on the table. 2) Generate a table to be described later in a filtering unit 120#i.

Figure 17:
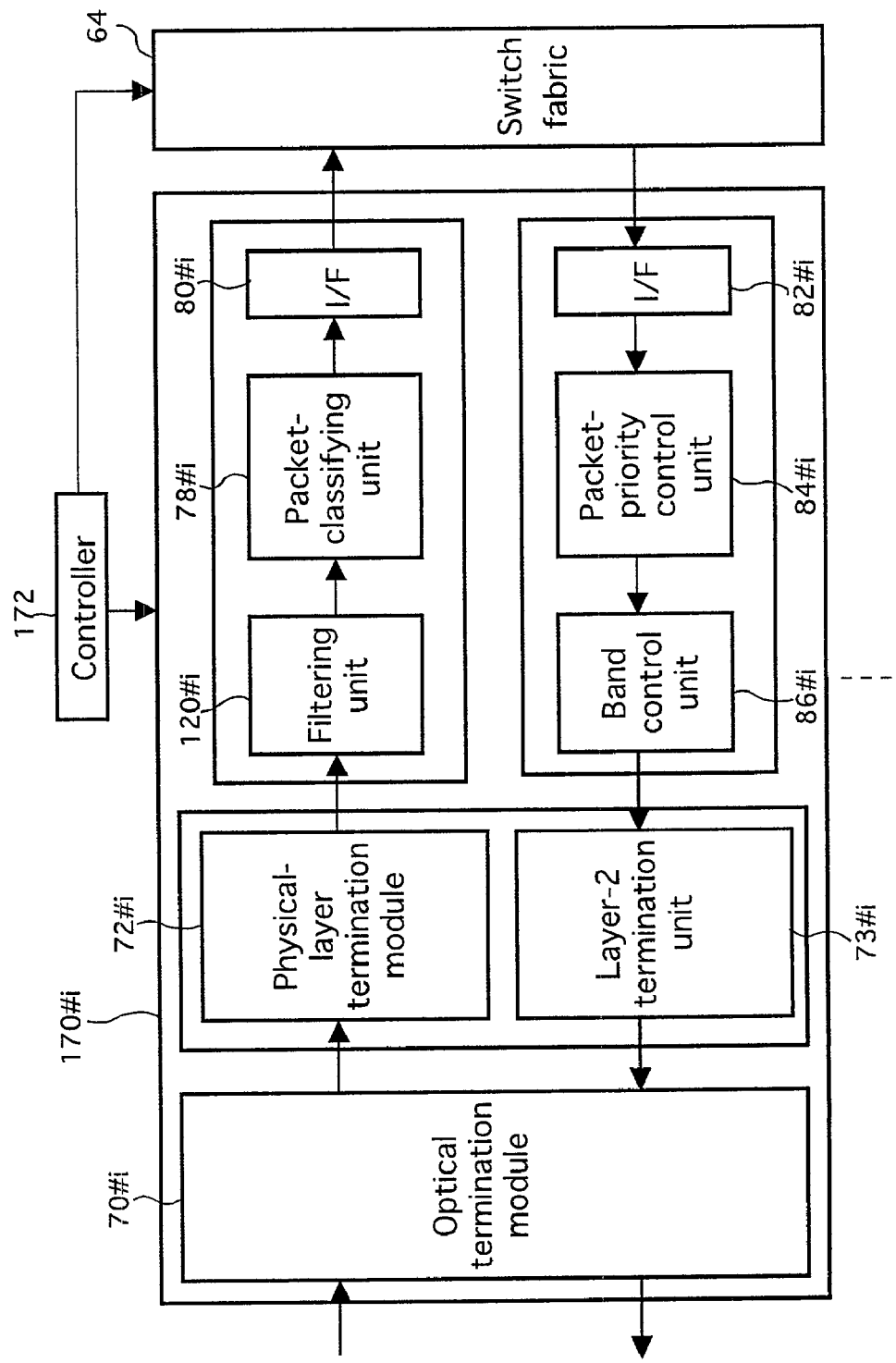
FIG. 17 is a diagram showing the configuration of boundary router B employed in the communication network shown in FIG. 16.

FIG. 17 is a diagram showing the configuration of the boundary router B170 employed in the communication network shown in FIG. 16. Configuration elements of the boundary router B170 which are virtually identical with those employed in the boundary router B50 shown in FIG. 7 are denoted by the same reference numerals as the latter. As shown in FIG. 17, the boundary router B170 comprises a plurality of IO port cards 110#k where k=1 to m, a controller 172 and the switch fabric 64. The controller 172 executes the following functions: 1) Acquire a distance to a destination IP address from a route table. The controller 172 creates typically a BGP4 route table in advance for control of routing. This route table typically includes parameters such as AS_SEQUENCE and AS_SET of ASPATH attributes. The number of single domains leading to the destination IP address, that is, the number of AS' (Autonomous Systems), is extracted from these parameters. 2) For the destination IP address, compare the extracted number of AS' with the number of AS' for the boundary router A40 to be passed through to reach the destination IP address by referring to a route table 176#i. 3) If the extracted number of AS' for the destination IP address is found greater than the number of AS' for the boundary router A40, treat the destination IP address as an address at a long distance. In this case, store the destination IP address and the long distance in the routing management table 134#i through a CPI/F unit 175#i. 4) If the extracted number of AS' for the destination IP address is found equal to or smaller than the number of AS' for the boundary router A40, on the other hand, treat the destination IP address as an address at a short distance. In this case, store the destination IP address and the short distance in the routing management table 134#i through the CPI/F unit 175#i.

Figure 18:
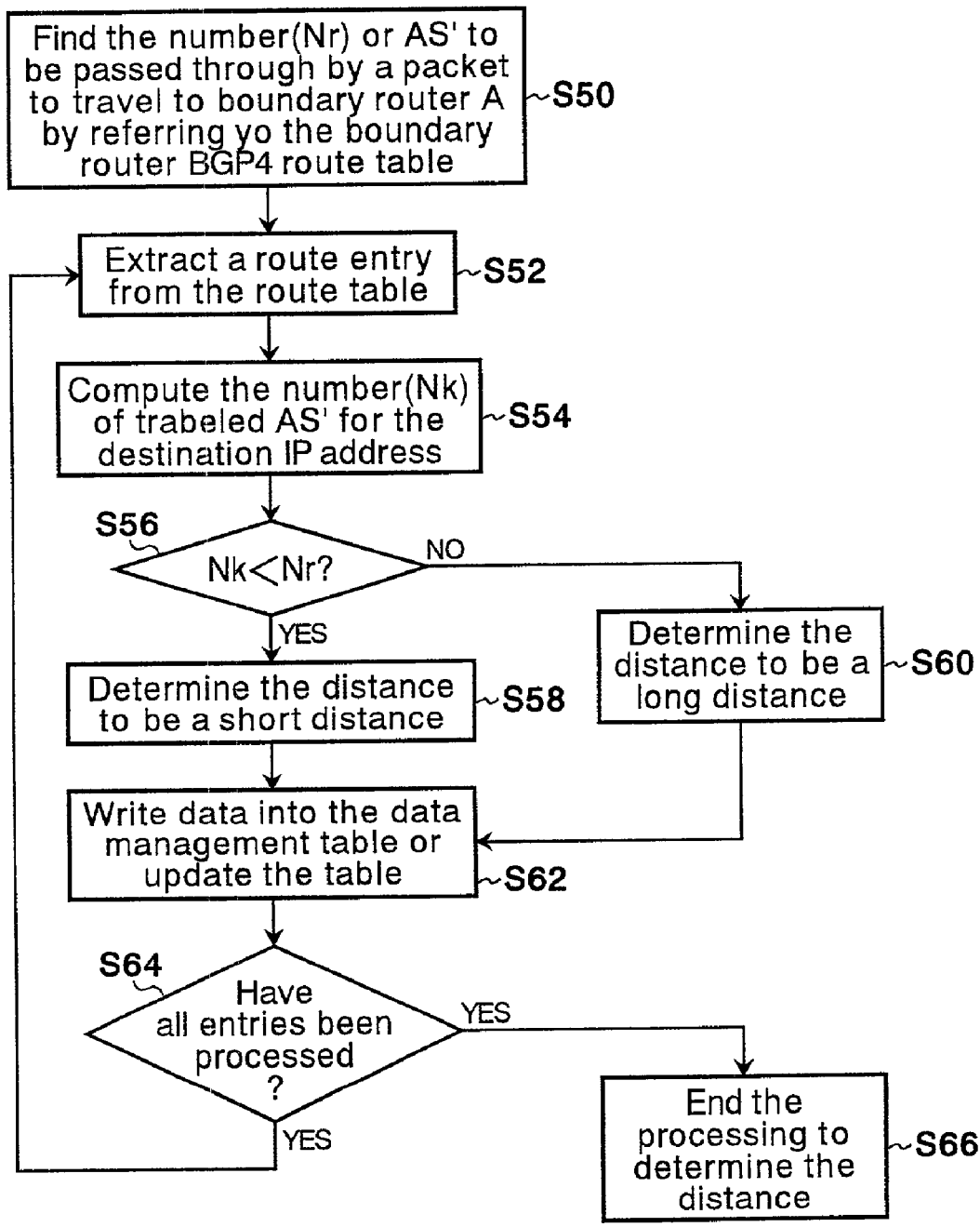
FIG. 18 is a flowchart representing creation of a data management table.

FIG. 18 is a flowchart representing creation of the routing management table 134#i. As shown in the figure, the flowchart begins with a step S50 to find the number of AS' to be passed through by a packet to travel to the boundary router A40. The number of AS' denoted by reference notation Nr is found by searching the boundary router BGP4 route table 176#i for a value associated with the IP address of the boundary router A40. At the next step S52, the destination IP address of a route entry is extracted from the route table 176#i. At the next step S54, the number (Nk) of traveled AS' for the destination IP address is computed. At the next step S56, Nr is compared with Nk to determine whether Nk<Nr. If Nk<Nr, the flow of the table creation goes on to a step S58. If Nk≧Nr, on the other hand, the flow of the table creation goes on to a step S60. At the step S58, the distance to the destination IP address through the Internet 28 only is determined to be shorter than the distance to the destination IP address through the Internet 28 and the intranet 24. At the step S60, on the other hand, the distance to the destination IP address through the Internet 28 only is determined to be longer than the distance to the destination IP address through the Internet 28 and the intranet 24.

The flow of the table creation goes on from the step S58 or the step S60 to a step S62 at which the destination IP address and information indicating a short distance or a long distance are cataloged in or used for updating the routing management table 134#i by way of the CPI/F 175#i. At the next step S64, route entries are examined to determine whether all entries have been checked. If all entries have been checked, the flow of the table creation goes on to a step S66 at which the distance determination process is ended. If all entries have not been checked, on the other hand, the flow of the table creation goes back to the step S52.

In accordance with the second embodiment described above, information on a distance is automatically generated in addition to the effects exhibited by the first embodiment. Thus, it is not necessary for a person in charge of maintenance to enter information on a distance. In addition, most recent information on a distance can be obtained even if a route is changed due to a modification of the network configuration or a failure occurring in network equipment.

Third Embodiment

Figure 19:
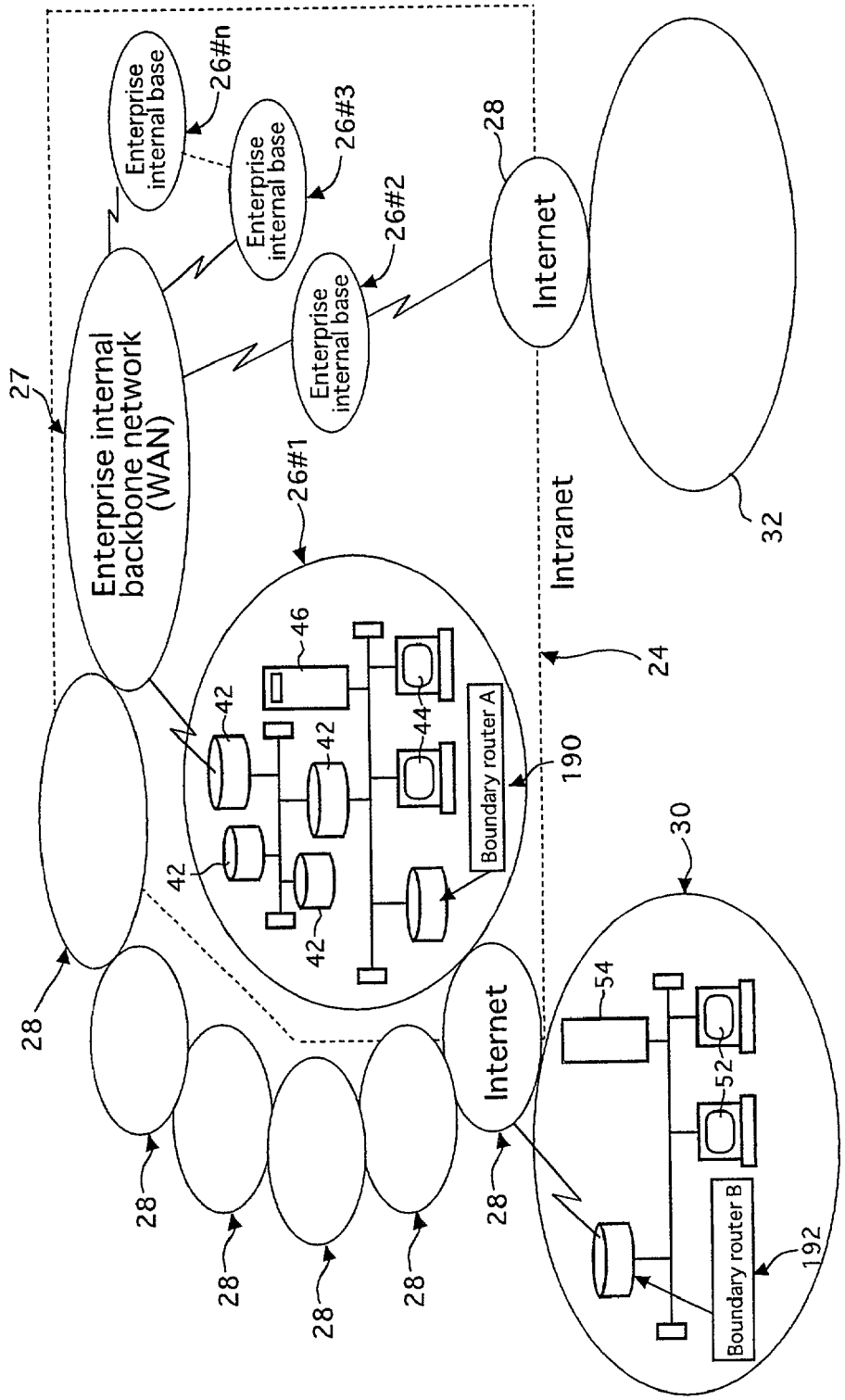
FIG. 19 is a diagram showing a communication network implemented by a third embodiment of the present invention.

FIG. 19 is a diagram showing a communication network implemented by a third embodiment of the present invention. Configuration elements of the third embodiment which are virtually identical with those employed in the first embodiment shown in FIG. 2 are denoted by the same reference numerals as the latter. In the case of the first embodiment, the boundary router B50 encapsulates a packet transmitted during an open-network time range to a destination at a long distance, unconditionally destining the encapsulated packet for the boundary router A40. The third embodiment is different from the first embodiment in that, in the case of the third embodiment, a boundary router A190 in an intranet 24 transmits an open-network start message to a boundary router B192 in a general-user network 30. Triggered by the open-network start message, the boundary router B192 encapsulates a received message and transmits the encapsulated packet to the boundary router A190.

Figure 20:
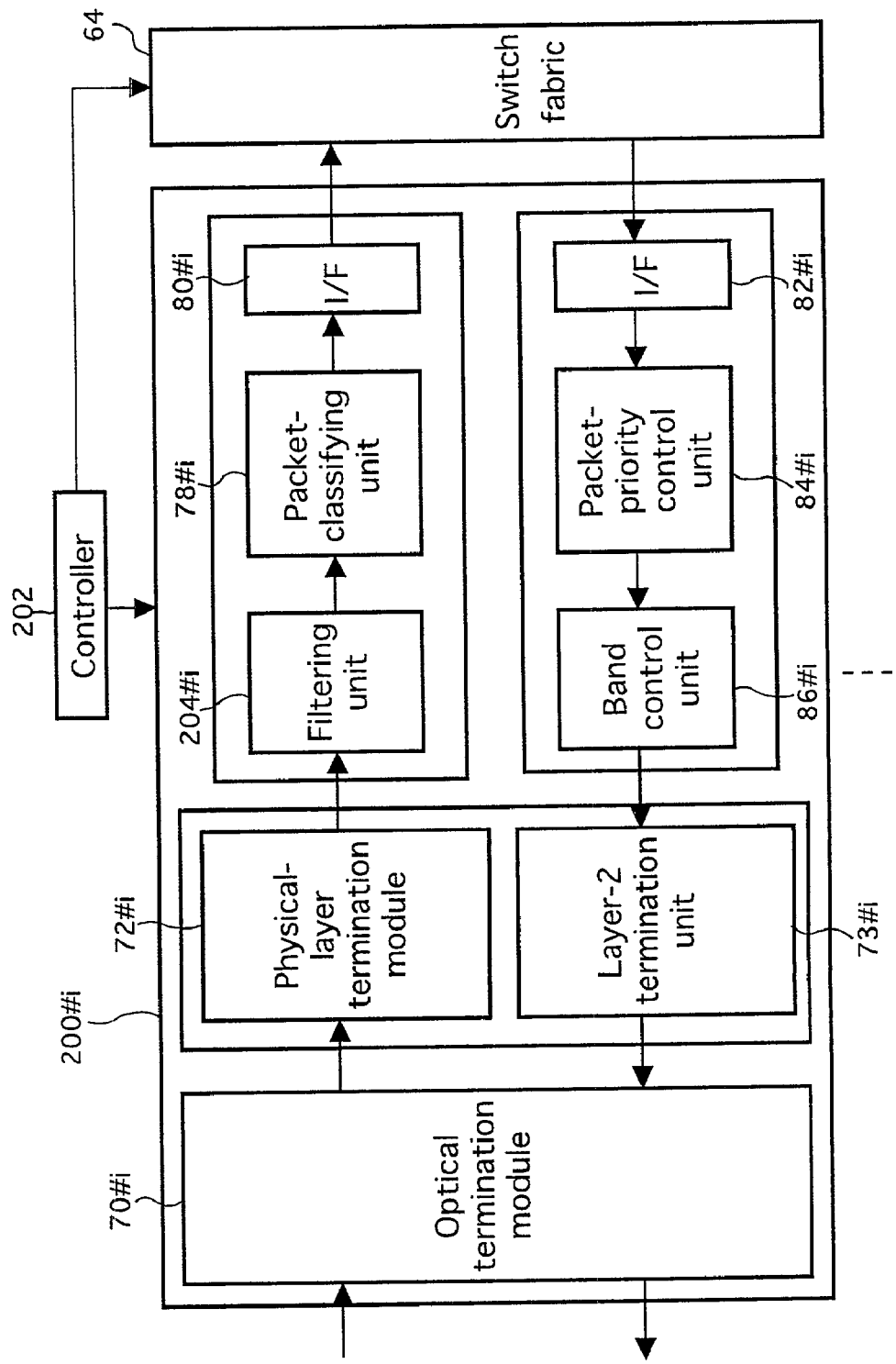
FIG. 20 is a diagram showing the configuration of boundary router A employed in the communication network shown in FIG. 19.

FIG. 20 is a diagram showing the configuration of the boundary router A190 employed in the communication network shown in FIG. 19. Configuration elements of the boundary router A190 which are virtually identical with those employed in the boundary router A40 shown in FIG. 3 are denoted by the same reference numerals as the latter. As shown in FIG. 20, the boundary router A190 comprises a plurality of IO port cards 200#k where k=1 to m, a controller 202 and a switch fabric 64. In the case of the third embodiment, since the IO port card interfacing with the Internet 28 is different from the conventional one, the card is denoted by reference numeral 200#i in the following description.

Figure 21:
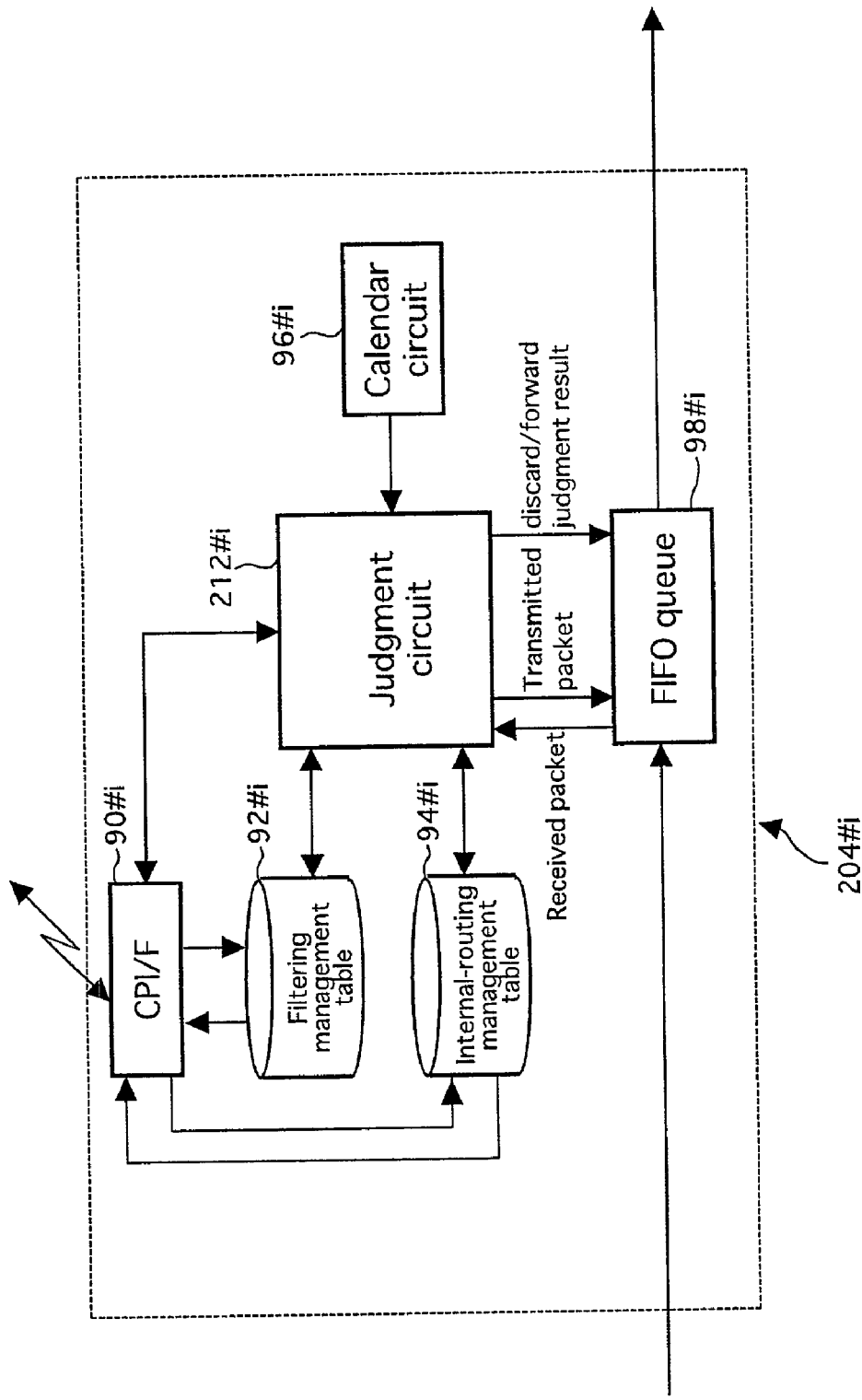
FIG. 21 is a diagram showing the configuration of a filtering unit employed in boundary router A shown in FIG. 20.

FIG. 21 is a diagram showing the configuration of a filtering unit 204#i employed in the boundary router A190 shown in FIG. 20. Configuration elements of the filtering unit 204#i which are virtually identical with those employed in the filtering unit 76#i shown in FIG. 4 are denoted by the same reference numerals as the latter. The filtering unit 204#i is different from the filtering unit 76#i shown in FIG. 4 in that, unlike the judgment circuit 94#i employed in the filtering unit 76#i, triggered by a transmission start message received from the boundary router B192, a judgment circuit 212#i employed in the filtering unit 204#i executes control to start allowing the use of the intranet 24.

Figure 22:
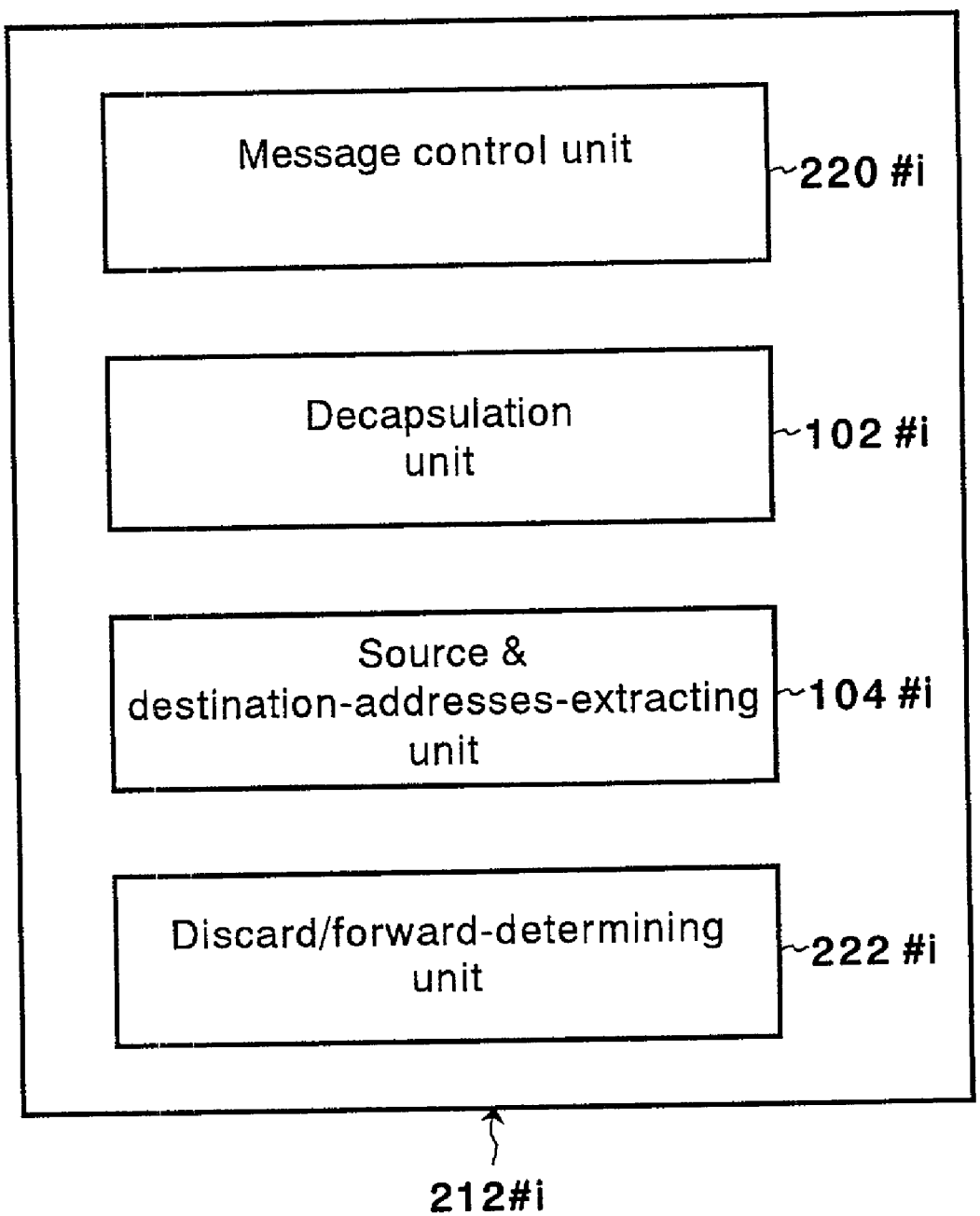
FIG. 22 is a diagram showing the configuration of a judgment circuit employed in the filtering unit shown in FIG. 21.

FIG. 22 is a diagram showing the configuration of the judgment circuit 212#i employed in the filtering unit 204#i shown in FIG. 21. Configuration elements of the judgment circuit 212#i which are virtually identical with those employed in the judgment circuit 94#i shown in FIG. 6 are denoted by the same reference numerals as the latter. As shown in FIG. 22, the judgment circuit 212#i comprises a message control unit 220#i, a decapsulation unit 102#i, a source & destination-addresses-extracting unit 104#i and a discard/forward-determining unit 222#i. The message control unit 220#i executes the following functions: 1) Control transmission of messages to the boundary router B192 in accordance with a command issued by the controller 202. An open-network start message transmitted from the boundary router A190 to the boundary router B192 includes, among other information, the address of the boundary router B192 as a transmission address, the address of the boundary router A190 as a source address and a message code. An open-network start message is a message notifying the boundary router B192 that the intranet 24 is open. The intranet 24 may become unable to communicate information even during an open-network time range due to a failure or the like. In such a state, a packet destined for the boundary router A190 cannot be delivered to the destination address. When the intranet 24 is recovered, an open-network start message is transmitted to the boundary router B192 to inform the boundary router B192 of the communication recovery allowing a packet to be delivered to the destination address through the intranet 24 with a high degree of reliability. It should be noted that a message destined for the boundary router B192 is transmitted by directly outputting the message from the controller 202 to the switch fabric 64. 2) Inform the controller 202 of a message received from the boundary router B192 upon reception of the message. It should be noted that the received message can be supplied to the controller 202 by way of the switch fabric 64. A packet destined for the boundary router A190 from the boundary router B192 can be such a received message or an encapsulated packet. It is thus necessary to notify the controller 202 of such a received message in order to distinguish the message from an encapsulated packet.

The discard/forward-determining unit 222#i executes the following functions: 1) Discard a received packet till a command making a request to start of reception of packets transmitted by the boundary router B192 is received from the controller 202. 2) Form a judgment as to whether a received packet is to be discarded or passed on in the same way as the discard/forward-determining unit 106#i employed in the judgment circuit 94#i shown in FIG. 6 in accordance with a command issued by the controller 202 to make a request that reception of packets transmitted by the boundary router B192 be started.

In addition to the functions of the controller 62 shown in FIG. 4, the controller 202 executes the following functions: 1) Give a command to the filtering unit 204#i to transmit an open-network start message in accordance with a command issued by typically a person in charge of maintenance. Give a command to the filtering unit 204#i to retransmit another open-network start message in case a message acknowledging the open-network start message transmitted earlier is not received within a predetermined period of time. 2) Give a command to the filtering unit 204#i to start reception of packets transmitted by the boundary router B192 upon reception of a message indicating that transmission by the boundary router B192 is started.

Figure 23:
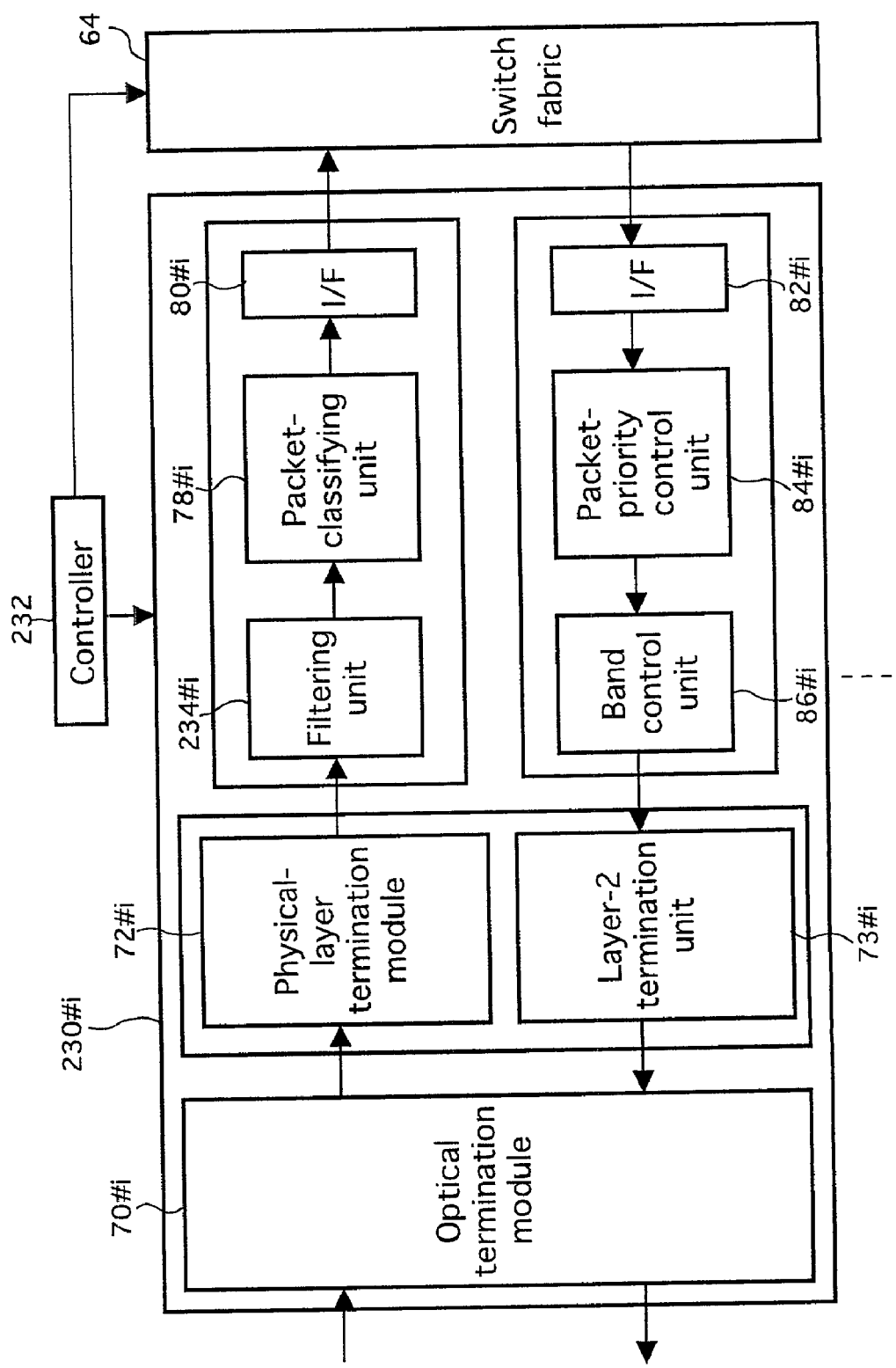
FIG. 23 is a diagram showing the configuration of boundary router B employed in the communication network shown in FIG. 19.

FIG. 23 is a diagram showing the configuration of the boundary router B192 employed in the communication network shown in FIG. 19. Configuration elements of the boundary router B192 which are virtually identical with those employed in the boundary router B50 shown in FIG. 7 are denoted by the same reference numerals as the latter. As shown in FIG. 23, the boundary router B192 comprises a plurality of IO port cards 230#k where k=1 to m, a controller 232 and the switch fabric 64. In this embodiment, an IO port card for interfacing with a transmission line connected to the Internet 28 to which a message is transmitted from the boundary router A190 and an IO port card for interfacing with a transmission line connected to a terminal 52 of the general-user network 30 are different from the conventional ones. For this reason, an IO port card for interfacing with a transmission line connected to the Internet 28 and an IO port card for interfacing with a transmission line connected to a terminal 52 are denoted by reference numerals 230#j and 230#i respectively in the following description. The IO port card 230#j executes functions different from those of the conventional one as follows: 1) Inform the controller 202 of an open-network start message from the boundary router A190 upon reception of the message. 2) Transmit a transmission start message and a reception-acknowledging message destined for the boundary router A190 in accordance with a command received from the controller 232.

Figure 24:
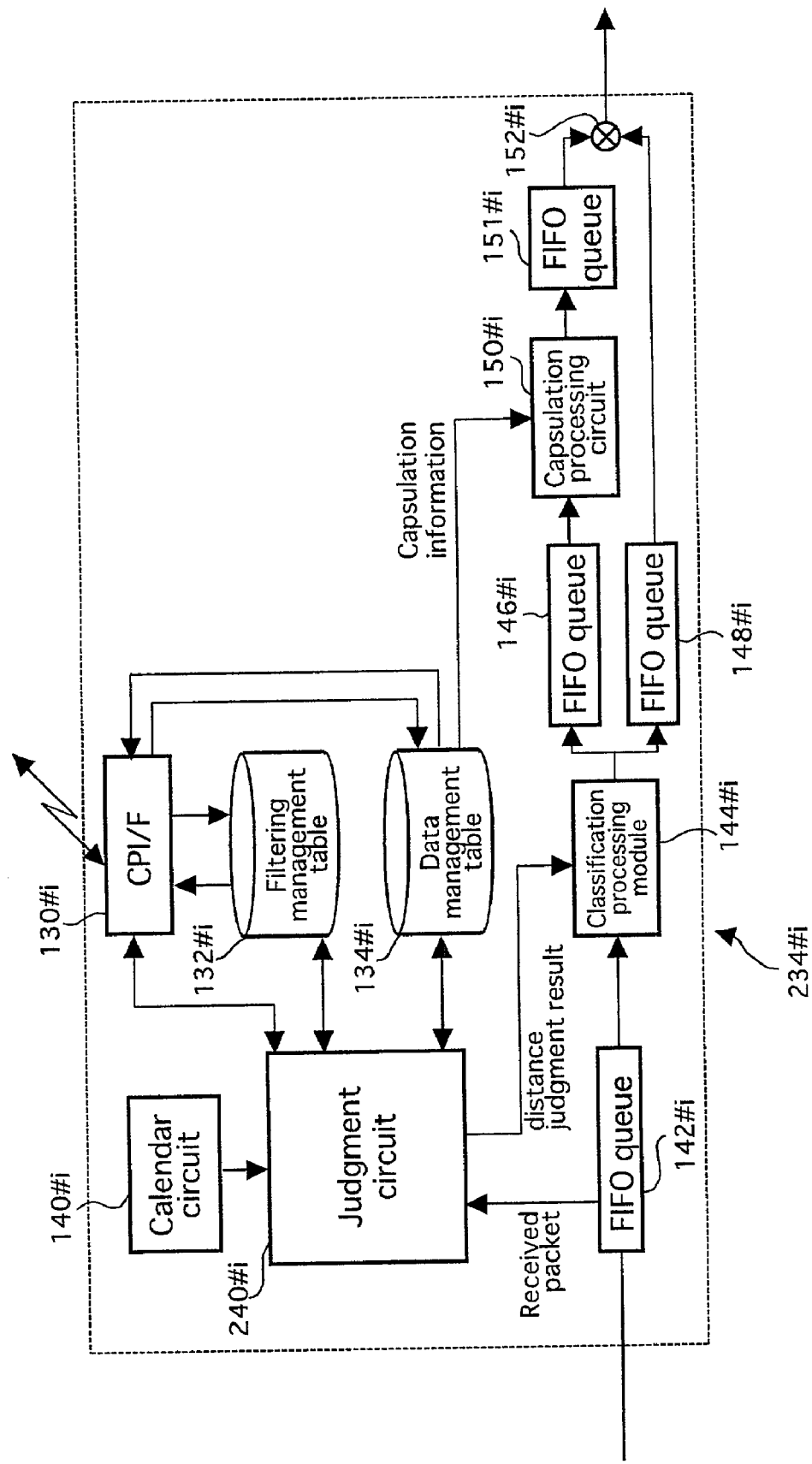
FIG. 24 is a diagram showing the configuration of a filtering unit employed in boundary router B shown in FIG. 23.

FIG. 24 is a diagram showing the configuration of a filtering unit 234#i employed in the boundary router B190 shown in FIG. 23. Configuration elements of the filtering unit 234#i which are virtually identical with those employed in the filtering unit 120#i shown in FIG. 8 are denoted by the same reference numerals as the latter. As shown in FIG. 24, the filtering unit 234#i includes a judgment circuit 240#i for executing the following functions: 1) Capsulate no received packet till a notice reporting completion of transmission of a transmission start message is received from the controller 232. 2) Capsulate a received packet in the same way as the filtering unit 120#i shown in FIG. 8 after a notice reporting completion of transmission of a transmission start message is received from the controller 232.

Figure 25:
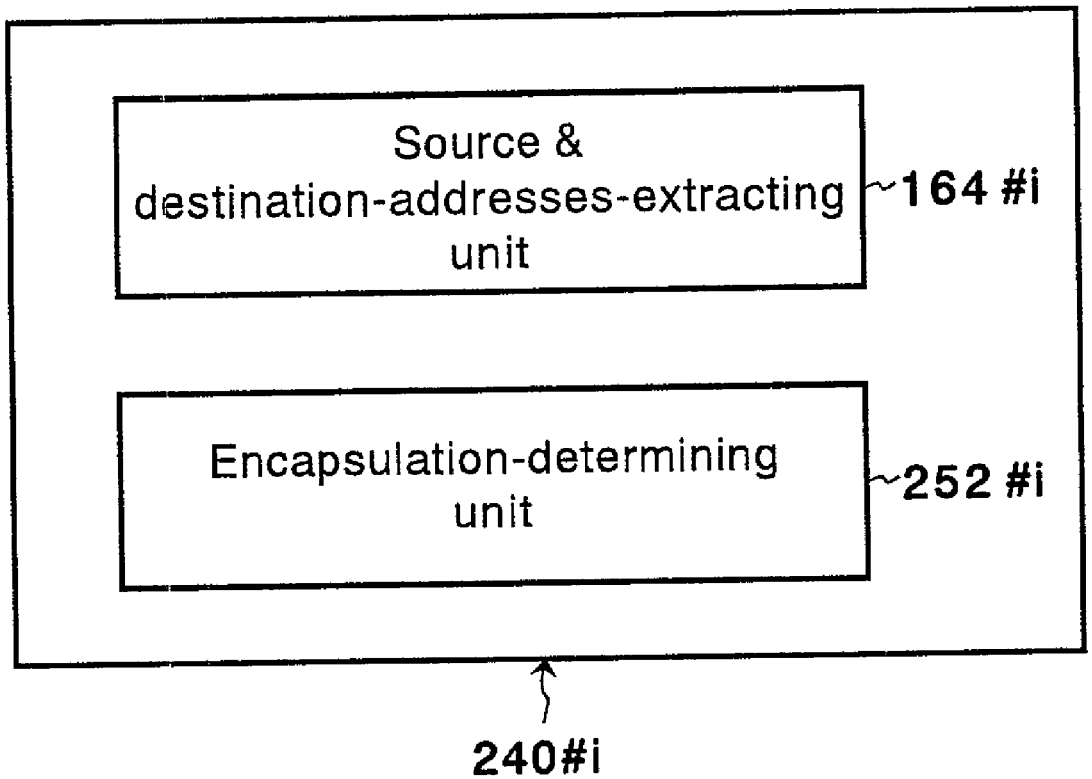
FIG. 25 is a diagram showing the configuration of a judgment circuit employed in the filtering unit shown in FIG. 24.

FIG. 25 is a diagram showing the configuration of the judgment circuit 240#i employed in the filtering unit 234#i shown in FIG. 24. Configuration elements of the judgment circuit 240#i which are virtually identical with those employed in the judgment circuit 138#i shown in FIG. 11 are denoted by the same reference numerals as the latter. As shown in FIG. 25, the judgment circuit 240#i comprises a source & destination-addresses-extracting unit 164#i and an encapsulation-determining unit 252#i. The encapsulation-determining unit 252#i executes the following functions: 1) Inform the classification processing module 144#i of a distance-judgment result indicating a short distance so as to encapsulate no received packet till a notice reporting completion of transmission of a transmission start message is received from the controller 232. 2) Inform the classification processing module 144#i of a distance-judgment result indicating a long distance or a short distance so as to or not to encapsulate a received packet in the same as the encapsulation-determining unit 166#i shown in FIG. 9 upon reception of a notice reporting completion of transmission of a transmission start message from the controller 232.

The operation of the communication network shown in FIG. 19 is explained as follows.

1: Start Control of the Intranet 24

Figure 26:
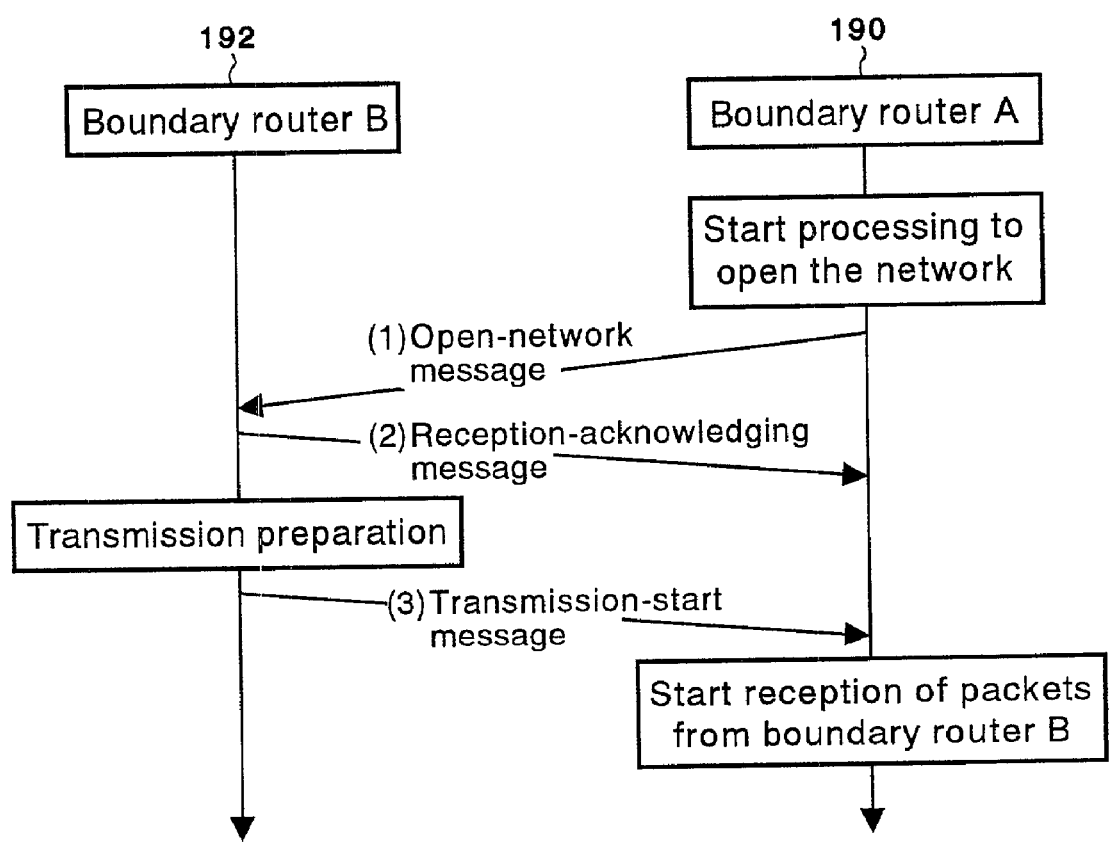
FIG. 26 is a diagram showing a sequence of processing to open an intranet.

FIG. 26 is a diagram showing a sequence of processing to open an intranet 24. In accordance with a network-opening command entered by typically a person in charge of maintenance, the boundary router A190 transmits an open-network start message by way of the IO port card 200#i to the boundary router B192 as shown by an arrow (1) in FIG. 26. The open-network start message is transmitted by way of the Internet 28 and the IO port card 230#j employed in the boundary router B192, being supplied to the controller 232. In response to the open-network start message, the controller 232 transmits a reception-acknowledging message to the boundary router A190 by way of the IO port card 230#j as shown by an arrow (2) in FIG. 26. The reception-acknowledging message is transmitted by way of the Internet 28 and the IO port card 200#i employed in the boundary router A190, being supplied to the controller 202. It should be noted that the boundary router A190 retransmits another open-network start message in case a reception-acknowledging message acknowledging the open-network start message transmitted earlier is not received within a predetermined period of time. When preparation for a transmission to the boundary router A190 is completed, the boundary router B192 transmits a transmission-start message to the boundary router A190 as shown by an arrow (3) in FIG. 26 in accordance with a command received from typically a person in charge of maintenance. The preparation of transmission includes generation of the routing management table 134#i. Then, the IO port card 230#i is informed of the completion of the transmission of the transmission-start message. The transmission-start message is transmitted by way of the Internet 28 and the IO port card 200#i employed in the boundary router A190, being supplied to the controller 202. The controller 202 notifies the filtering unit 204#i that a transmission-start message has been received.

2: Boundary Router B192

Figure 27:
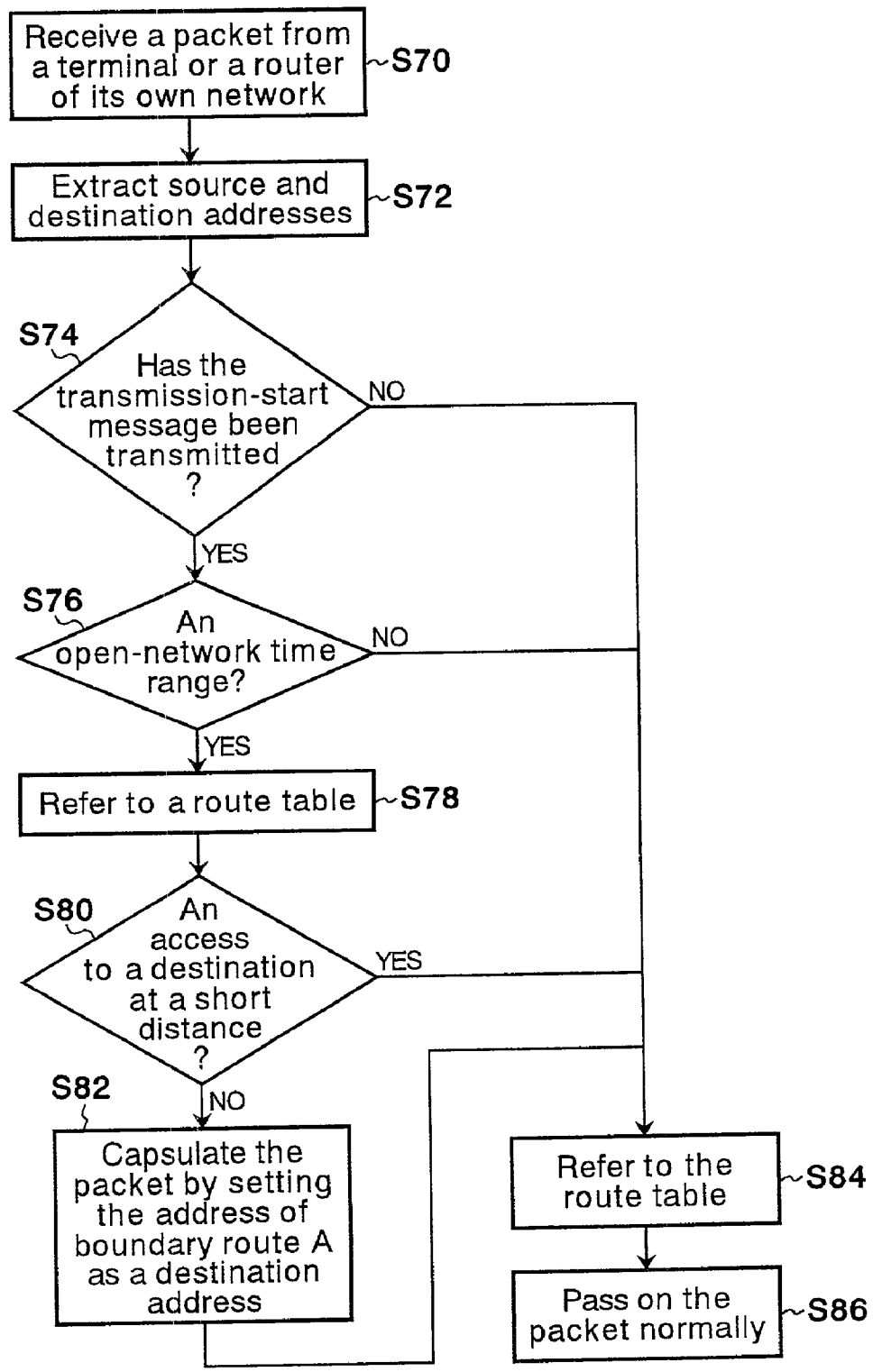
FIG. 27 is a flowchart representing packet control executed by boundary router B.

FIG. 27 is a flowchart representing packet control executed by the boundary router B192. As shown in the figure, the flowchart begins with a step S70 at which the IO port card 230#i employed in the boundary router B192 receives a packet from a router or a terminal of a network including the boundary router B192. At the next step S72, the IO port card 230#i extracts the source and destination addresses from the packet. At the next step S74, the IO port card 230#i forms a judgment as to whether or not transmission of a transmission-start message has been completed. If the transmission of a transmission-start message has been completed, the flow of the control goes on to a step S76. If the transmission of a transmission-start message has not been completed, on the other hand, the flow of the control goes on to a step S84. At the steps S76 to a step S86, the IO port card 230#i carries out the same pieces of processing as respectively the steps S6 to S16 of the flowchart shown in FIG. 14.

3: Boundary Router A190

Figure 28:
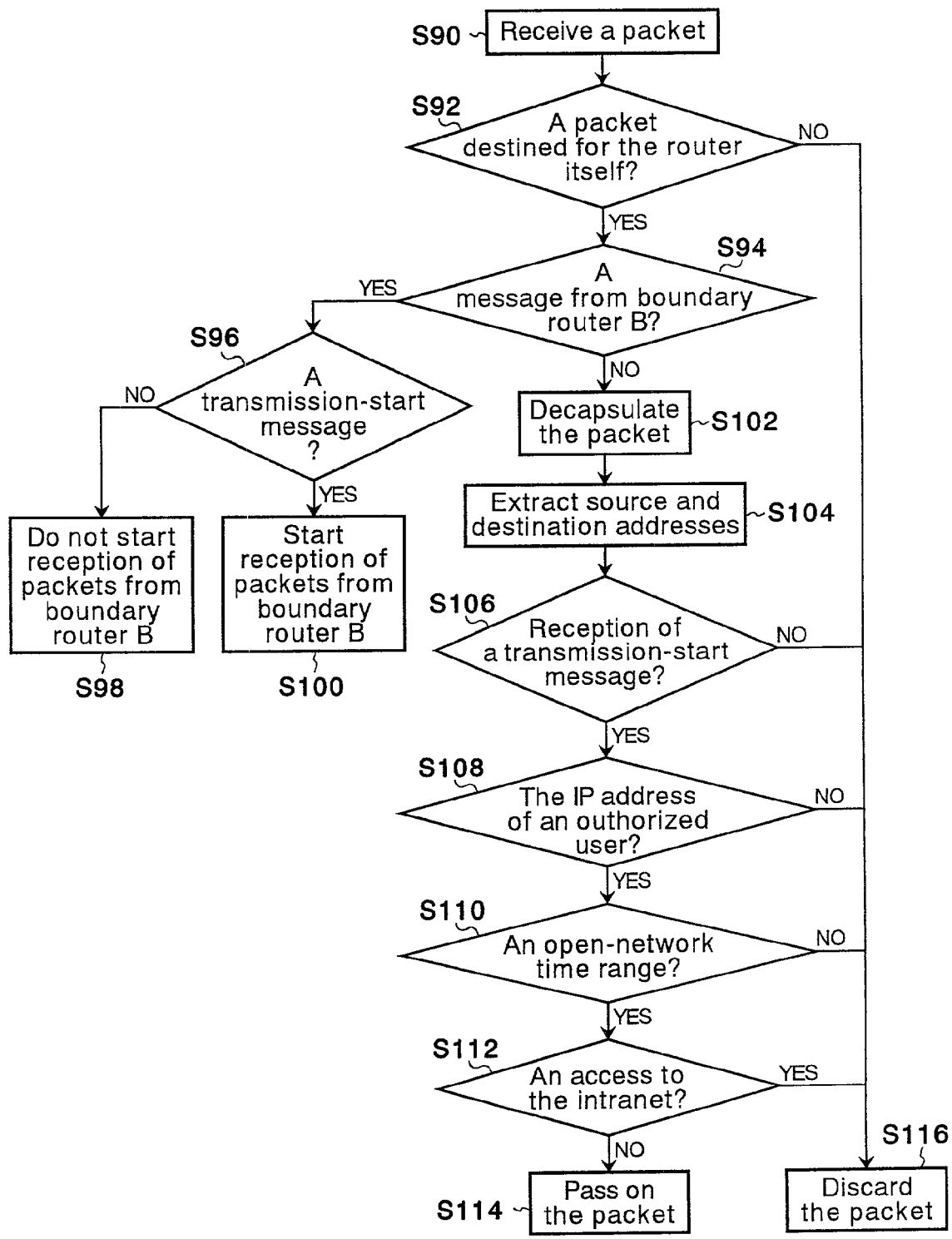
FIG. 28 is a flowchart representing packet control executed by boundary router A.

FIG. 28 is a flowchart representing packet control executed by the boundary router A190. As shown in the figure, the flowchart begins with a step S90 at which the IO port card 200#i employed in the boundary router A190 receives a packet. At the next step S92, the IO port card 200#i forms a judgment as to whether or not the received packet is destined for the boundary router A190. If the received packet is found destined for the boundary router A190, the flow of the control goes on to a step S94. If the received packet is found not destined for the boundary router A190, on the other hand, the flow of the control goes on to a step S116. At the step S94, the received packet is examined to determine whether or not the packet has been received from the boundary router B192. If the received packet is found to have been received from the boundary router B192, the flow of the control goes on to a step S96. If the received packet is found to have been received not from the boundary router B192, on the other hand, the flow of the control goes on to a step S102. At the step S96, the received packet is examined to determine whether or not the packet is a transmission-start message. If the received packet is found to be not a transmission-start message, the flow of the control goes on to a step S98. If the received packet is found to be a transmission-start message, on the other hand, the flow of the control goes on to a step S100. At the step S98, a decision is made to receive no packet from the boundary router B192. At the step S100, on the other hand, a decision is made to receive packets from the boundary router B192 from now on.

At the step S102, the IO port card 200#i decapsulates the received packet. At the next step S104, the source and destination IP addresses are extracted from the received packet. The flow of the control then goes on to a step S106 to form a judgment as to whether or not reception of a transmission-start message has already been completed. If the reception of a transmission-start message has already been completed, the flow of the control goes on to a step S108. If the reception of a transmission-start message has not been completed, on the other hand, the flow of the control goes on to a step S116. At a step S108 to the step S116, the IO port card 200#i carries out the same pieces of processing as respectively the steps S28 to S36 of the flowchart shown in FIG. 15.

In accordance with the third embodiment described above, by exchanging an open-network start message and a transmission-start message, it is possible to synchronize a timing to open the network between the boundary routers and to detect resumption of a service following suspension of services in addition to the effects exhibited by the first embodiment.

Fourth Embodiment

Figure 29:
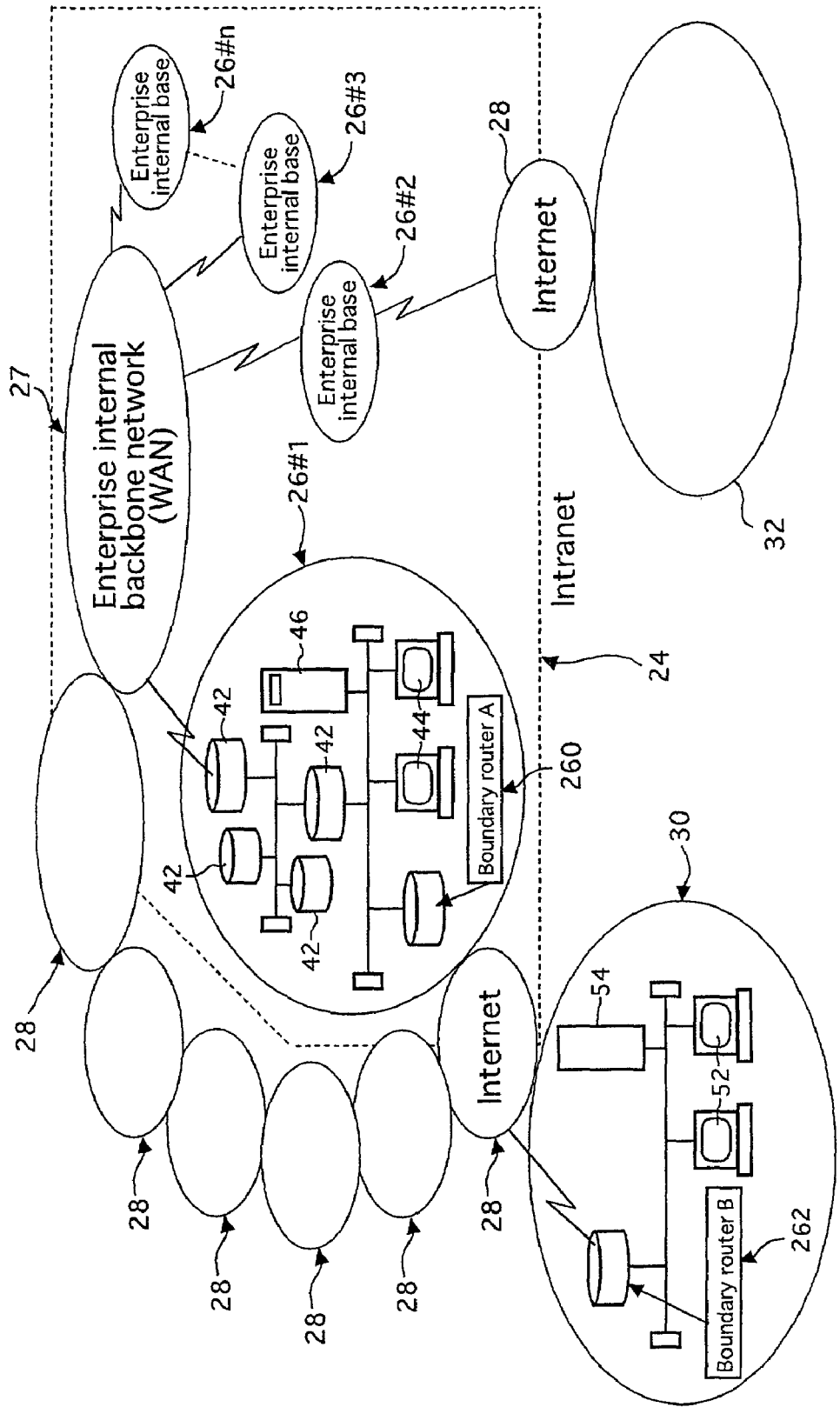
FIG. 29 is a diagram showing a communication network implemented by a fourth embodiment of the present invention.

FIG. 29 is a diagram showing a communication network implemented by a fourth embodiment of the present invention. Configuration elements of the fourth embodiment which are virtually identical with those employed in the first embodiment shown in FIG. 2 are denoted by the same reference numerals as the latter. In the case of the first embodiment, the boundary router B50 encapsulates a packet transmitted during an open-network time range to a destination at a long distance, unconditionally destining the encapsulated packet for the boundary router A40. The fourth embodiment is different from the first embodiment in that, in the case of the fourth embodiment, a boundary router A260 transmits a blocked-network start message to a boundary router B262 and, triggered by the blocked-network start message, the boundary router B262 transmits received packets to the boundary router A260 without encapsulating the packets.

Figure 30:
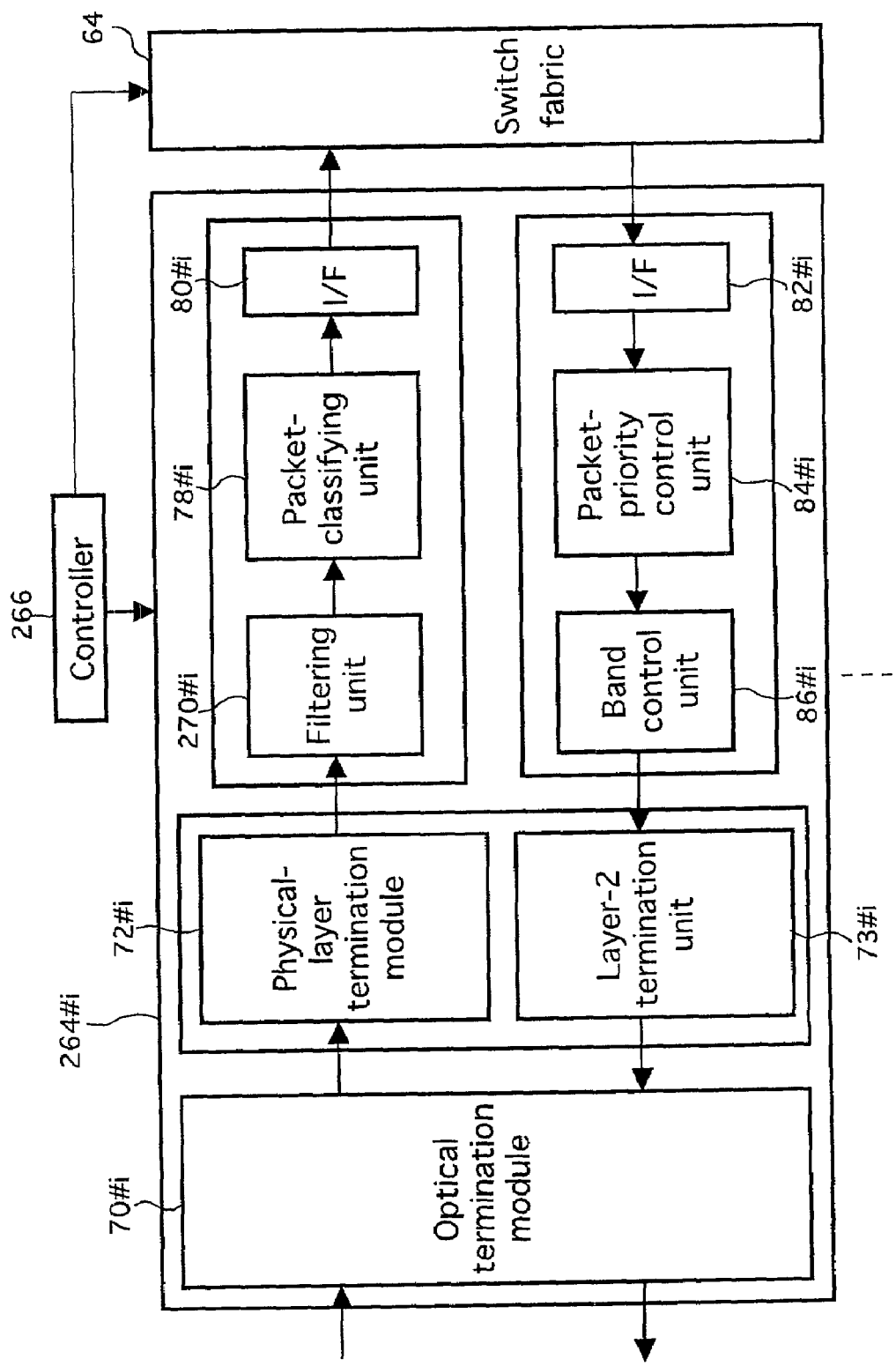
FIG. 30 is a diagram showing the configuration of boundary router A employed in the communication network shown in FIG. 29.

FIG. 30 is a diagram showing the configuration of the boundary router A260 employed in the communication network shown in FIG. 29. Configuration elements of the boundary router A260 which are virtually identical with those employed in the boundary router A40 shown in FIG. 3 are denoted by the same reference numerals as the latter. As shown in FIG. 30, the boundary router A260 comprises a plurality of IO port cards 264#k where k=1 to m, a controller 266 and a switch fabric 64. In the case of the fourth embodiment, since the IO port card interfacing with the Internet 28 is different from the conventional one, the card is denoted by reference numeral 264#i in the following description.

Figure 31:
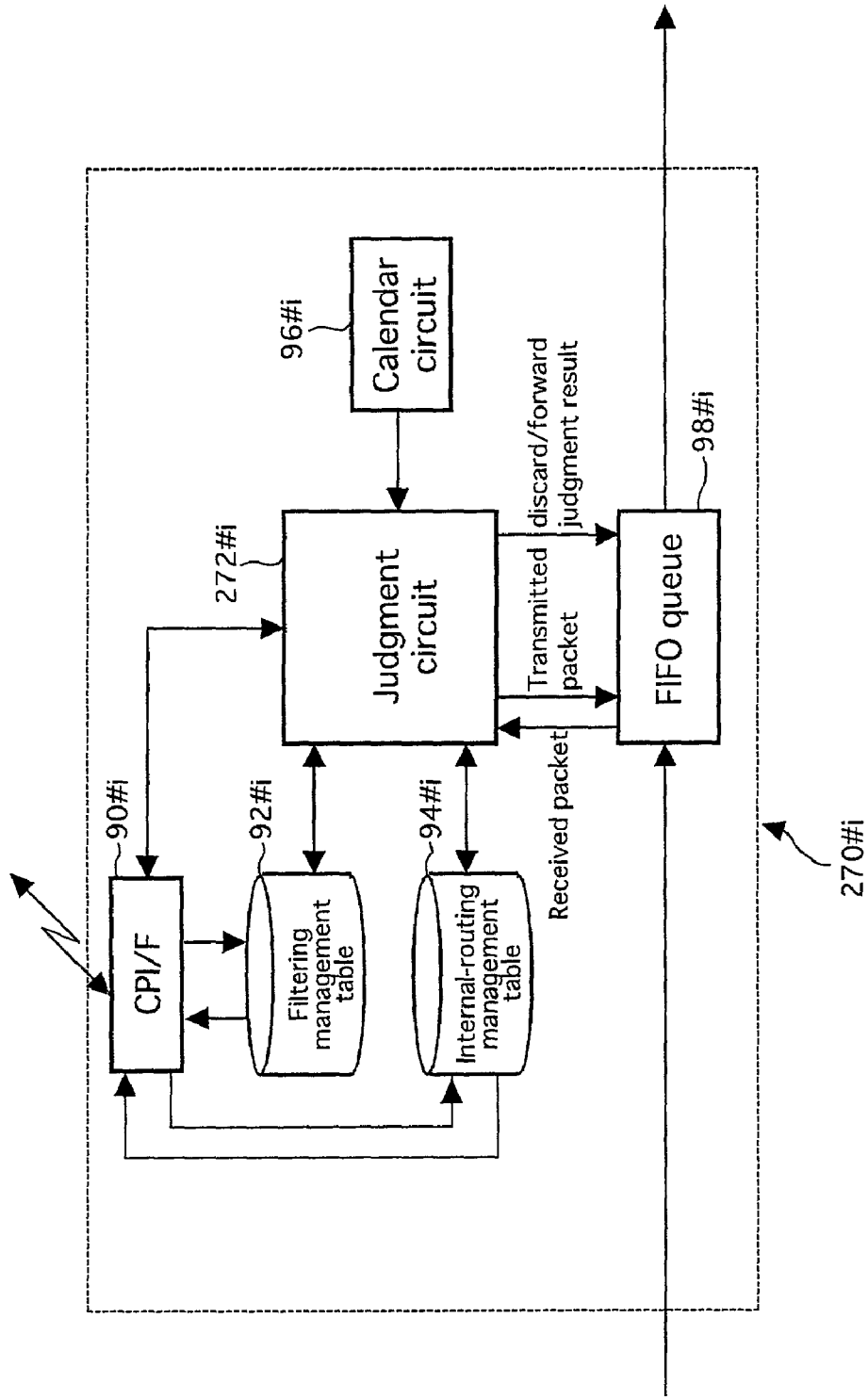
FIG. 31 is a diagram showing the configuration of a filtering unit employed in boundary router A shown in FIG. 30.

FIG. 31 is a diagram showing the configuration of a filtering unit 270#i employed in the boundary router A260 shown in FIG. 30. Configuration elements of the filtering unit 270#i which are virtually identical with those employed in the filtering unit 76#i shown in FIG. 4 are denoted by the same reference numerals as the latter. A judgment circuit 272#i employed in the fourth embodiment is different from the judgment circuit 94#i shown in FIG. 4 in that, triggered by a discard start message (blocking-start-OK message)

received from the boundary router B262, the judgment circuit 272#i executes control to start an operation of discarding packets received from the boundary router B262.

Figure 32:
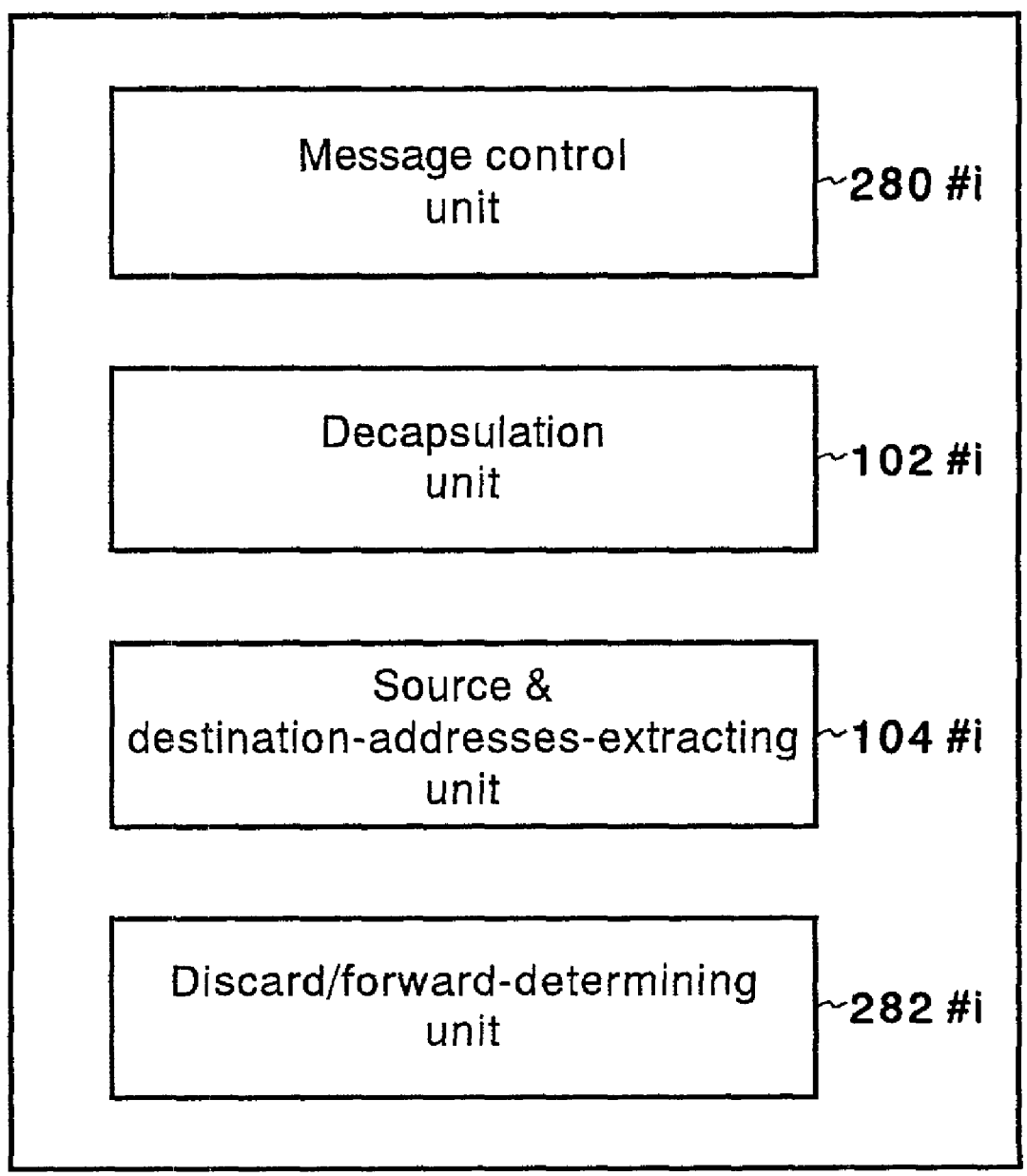
FIG. 32 is a diagram showing the configuration of a judgment circuit employed in the filtering unit shown in FIG. 31.

FIG. 32 is a diagram showing the configuration of the judgment circuit 272#i employed in the filtering unit 270#i shown in FIG. 31. Configuration elements of the judgment circuit 272#i which are virtually identical with those employed in the judgment circuit 94#i shown in FIG. 6 are denoted by the same reference numerals as the latter. As shown in FIG. 32, the judgment circuit 272#i comprises a message control unit 280#i, a decapsulation unit 102#i, a source & destination-addresses-extracting unit 104#i and a discard/forward-determining unit 282#i.

The message control unit 280#i executes the following functions: 1) Control transmission of messages to the boundary router B262 in accordance with a command issued by the controller 266. A message transmitted to the boundary router B262 may be a blocked-network start message. A blocked-network start message is a message informing the boundary router B262 that the blocking of the intranet 24 is started. With the intranet 24 blocked, messages transmitted by the boundary router B262 are discarded. Even during an open-network time range, the operation of the intranet equipment is halted for maintenance of the intranet 24 or other purposes. In such a state, a packet destined for the boundary router A260 cannot be delivered to the destination address. Thus, it is necessary to inform the boundary router B262 of the blocked state of the intranet 24 so that the boundary router B262 executes control to transmits packets by way of the Internet 28 only. 2) Notify the controller 266 that a message is received from the boundary router B262 upon reception of the message.

The discard/forward-determining unit 282#i executes the following functions: 1) Form a judgment as to whether a received packet is to be discarded or passed on in the same way as the discard/forward-determining unit 106#i employed in the judgment circuit 94#i shown in FIG. 6 till a command to start discarding packets received from the boundary router B262 is issued by the controller 266. 2) Discard a received packet even during an open-network time range upon reception of a command to start discarding packets transmitted by the boundary router B262 from the controller 266.

In addition to the functions of the controller 62 shown in FIG. 4, the controller 266 executes the following functions: 1) Give a command to the filtering unit 270#i to transmit a blocked-network start message in accordance with a command issued by typically a person in charge of maintenance. Give a command to the filtering unit 270#i to retransmit another blocked-network start message in case a message acknowledging the blocked-network start message transmitted earlier is not received within a predetermined period of time. 2) Give a command to the filtering unit 270#i to start an operation to block packets transmitted by the boundary router B262 upon reception of a blocking-start-OK message from the boundary router B262.

It should be noted that, after a blocking-start-OK message is received from the boundary router B262, work such as maintenance can be started.

Figure 33:
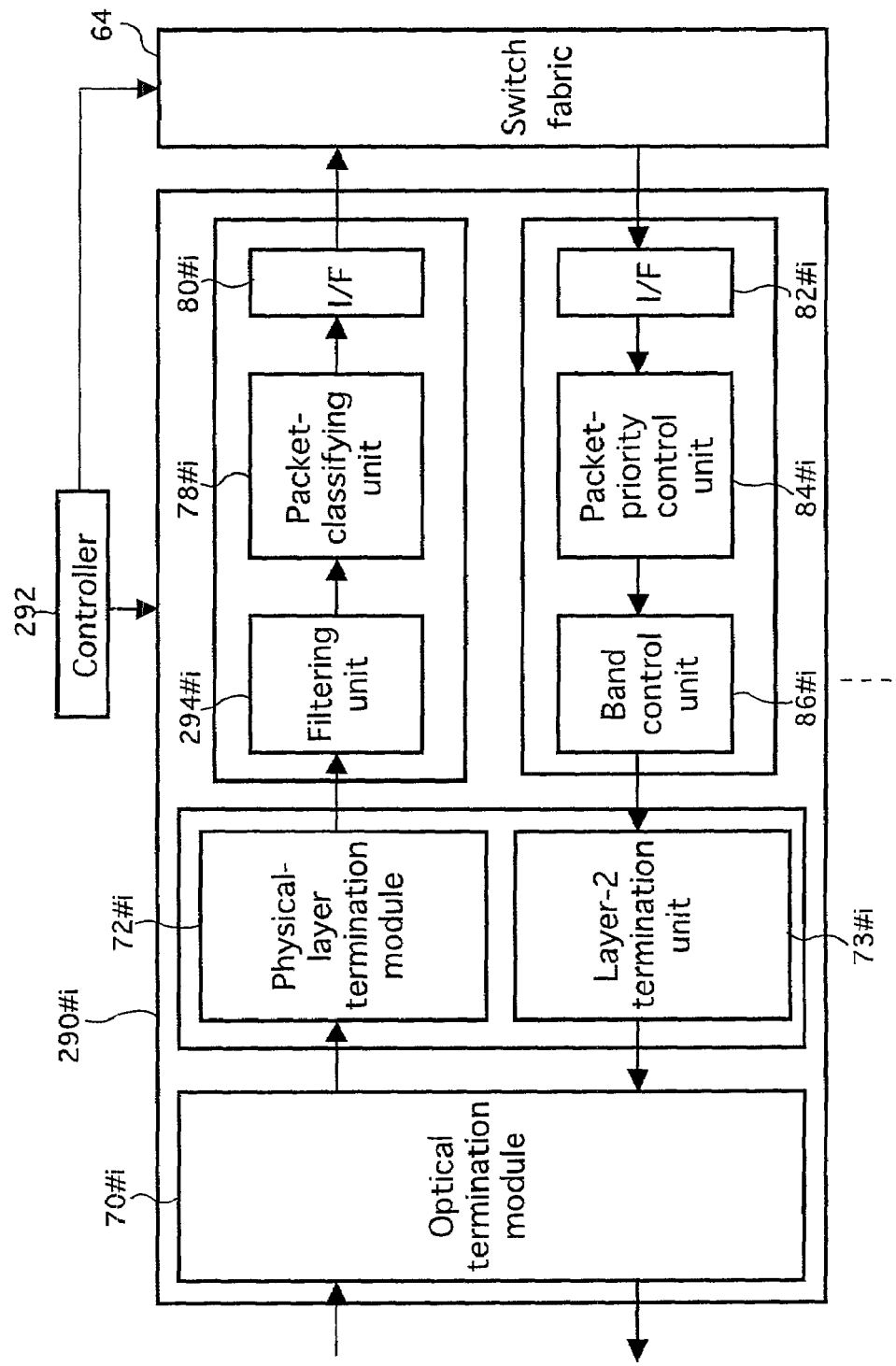
FIG. 33 is a diagram showing the configuration of boundary router B employed in the communication network shown in FIG. 29.

FIG. 33 is a diagram showing the configuration of the boundary router B262 employed in the communication network shown in FIG. 29. Configuration elements of the boundary router B262 which are virtually identical with those employed in the boundary router B50 shown in FIG. 7 are denoted by the same reference numerals as the latter. As shown in FIG. 33, the boundary router B262 comprises a plurality of IO port cards 290#k where k=1 to m, a controller 292 and the switch fabric 64. In this embodiment, an IO port card for interfacing with a transmission line connected to the Internet 28 to which a message is transmitted from the boundary router A260 and an IO port card for interfacing with a transmission line connected to a terminal 52 of the general-user network 30 are different from the conventional ones. For this reason, an IO port card for interfacing with a transmission line connected to the Internet 28 and an IO port card for interfacing with a transmission line connected to a terminal 52 are denoted by reference numerals 290#j and 290#i respectively in the following description. The IO port card 290#j executes functions different from those of the conventional one as follows: 1) Inform the controller 292 of a blocked-network start message from the boundary router A260 upon reception of the message. 2) Transmit a reception-acknowledging message and a blocking-start-OK message to the boundary router A260 in accordance with a command received from the controller 292.

Figure 34:
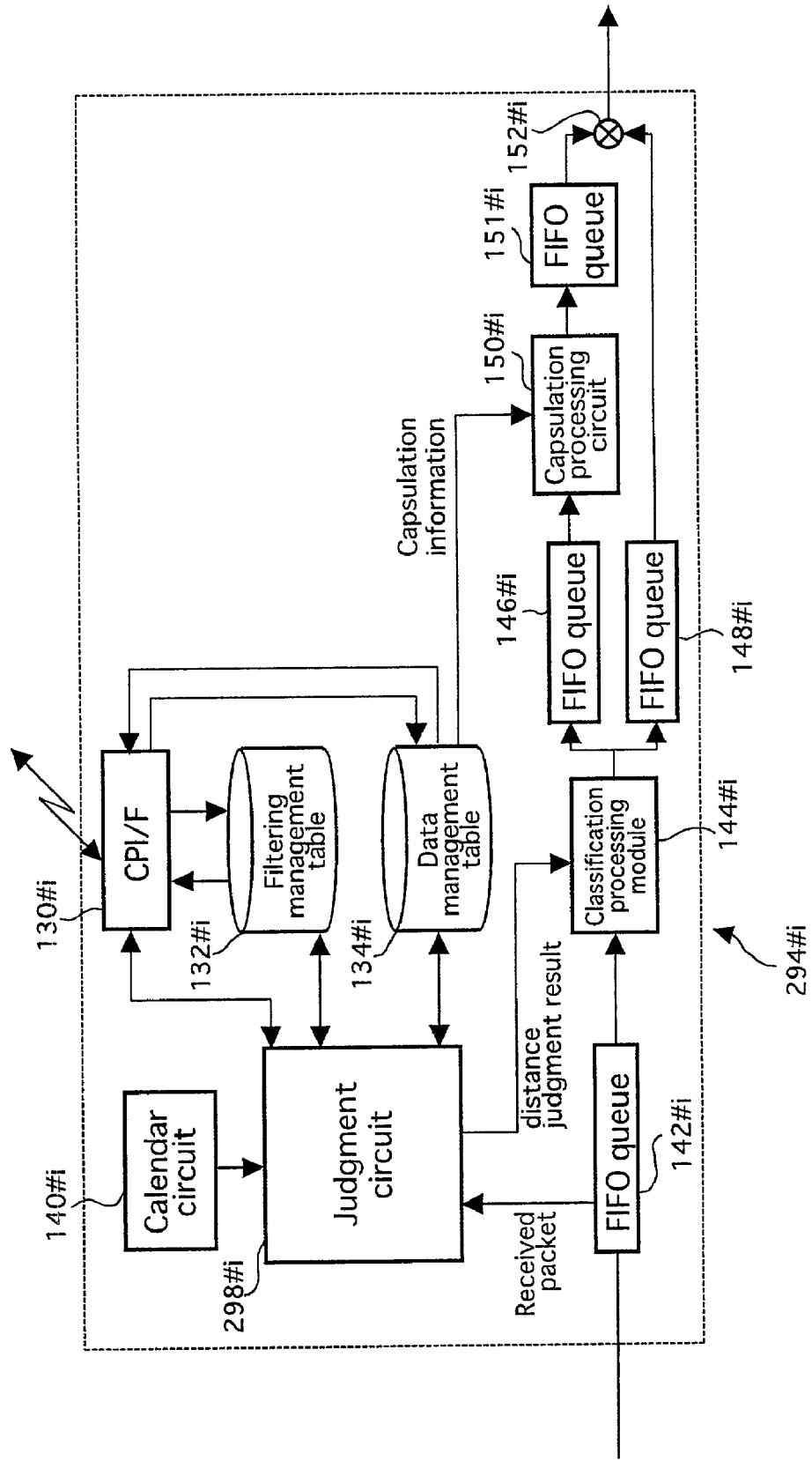
FIG. 34 is a diagram showing the configuration of a filtering unit employed in boundary router B shown in FIG. 33.

FIG. 34 is a diagram showing the configuration of the filtering unit 294#i employed in the boundary router B192 shown in FIG. 33. Configuration elements of the filtering unit 294#i which are virtually identical with those employed in the filtering unit 120#i shown in FIG. 8 are denoted by the same reference numerals as the latter. As shown in FIG. 34, the filtering unit 294#i includes a judgment circuit 298#i for executing the following functions: 1) Control a classification processing module 144#i to encapsulate a received packet in the same way as the filtering unit 120#i shown in FIG. 8 till reception of a blocked-network start message from the controller 292. 2) Control the classification processing module 144#i to encapsulate no received packet upon reception of a notice reporting completion of transmission of a blocked-network start message from the controller 292.

Figure 35:
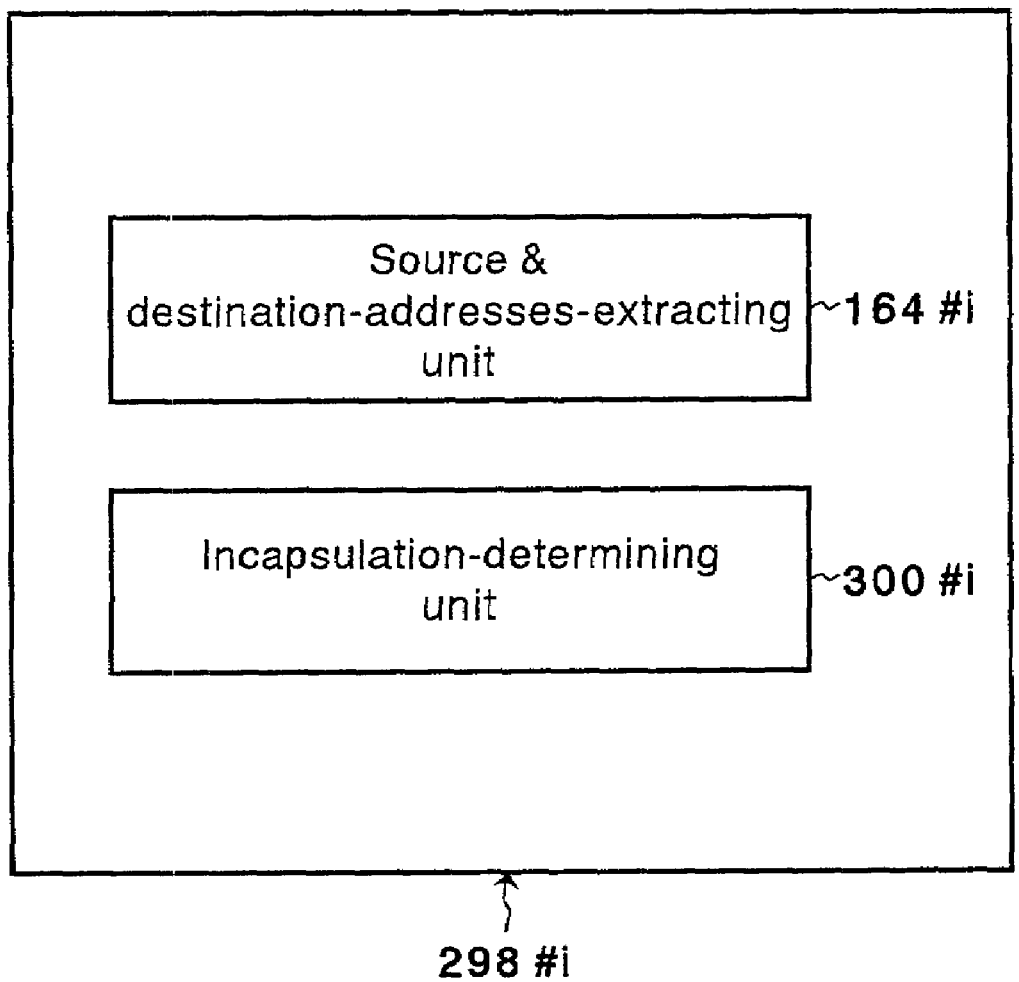
FIG. 35 is a diagram showing the configuration of a judgment circuit employed in the filtering unit shown in FIG. 34.

FIG. 35 is a diagram showing the configuration of the judgment circuit 298#i employed in the filtering unit 294#i shown in FIG. 34. Configuration elements of the judgment circuit 298#i which are virtually identical with those employed in the judgment circuit 138#i shown in FIG. 11 are denoted by the same reference numerals as the latter. As shown in FIG. 35, the judgment circuit 298#i comprises a source & destination-addresses-extracting unit 164#i and an encapsulation-determining unit 300#i. The encapsulation-determining unit 300#i executes the following functions: 1) Inform the classification processing module 144#i of a distance-judgment result indicating a long distance or a short distance so as to encapsulate or not to encapsulate a received packet in the same way as the filtering unit 120#i shown in FIG. 8 till reception of a notice reporting completion of transmission of a blocked-network start message from the controller 292. 2) Inform the classification processing module 144#i of a distance-judgment result indicating a short distance so as to encapsulate no received packet upon reception of a notice reporting completion of transmission of a blocked-network start message from the controller 292.

The operation of the communication network shown in FIG. 29 is explained as follows.

1: Blocking Process

Figure 36:
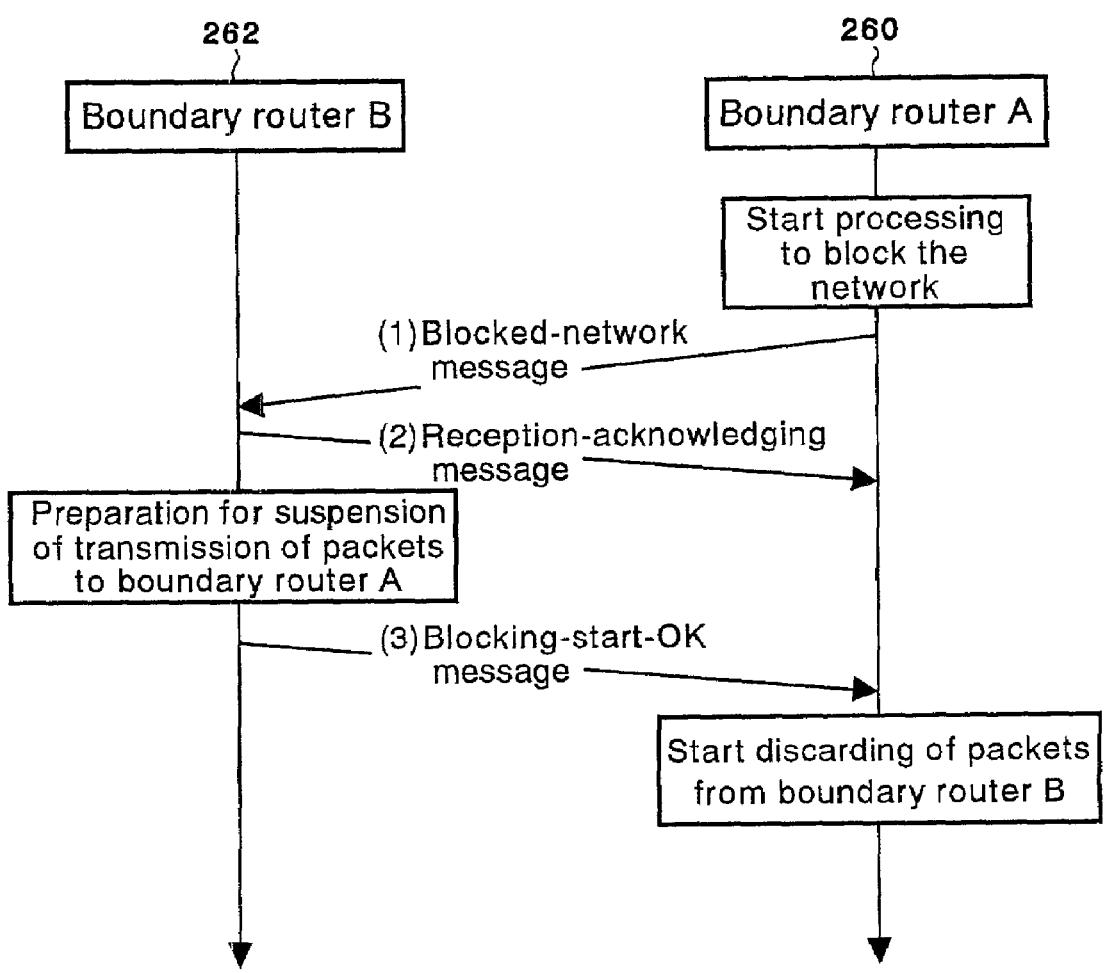
FIG. 36 is a diagram showing a sequence of processing to block an intranet.

FIG. 36 is a diagram showing a sequence of processing to block an intranet 24. In accordance with a command entered by typically a person in charge of maintenance to block the intranet 24, the boundary router A260 transmits a blocked-network start message by way of the IO port card 264#i to the boundary router B262 as shown by an arrow (1) in FIG. 36. The open-network start message is transmitted by way of the Internet 28 and the IO port card 290#j employed in the boundary router B262, being supplied to the controller 292. In response to the blocked-network start message, the controller 292 transmits a reception-acknowledging message to the boundary router A260 by way of the IO port card 290#j as shown by an arrow (2) in FIG. 36. The reception-acknowledging message is transmitted by way of the Internet 28 and the IO port card 264#i employed in the boundary router A260, being supplied to the controller 266. It should be noted that the boundary router A260 retransmits another blocked-network start message in case a reception-acknowledging message acknowledging the blocked-network start message transmitted earlier is not received within a predetermined period of time. When preparation for termination of transmission to the boundary router A260 is completed, the boundary router B262 transmits a blocking-start-OK message to the boundary router A260 as shown by an arrow (3) in FIG. 36 in accordance with a command received from typically a person in charge of maintenance. Then, the IO port card 290#i is informed of the completion of the transmission of the blocking-start-OK message. The blocking-start-OK message is transmitted by way of the Internet 28 and the IO port card 264#i employed in the boundary router A260, being supplied to the controller 266. The controller 266 notifies the filtering unit 270#i that a blocking-start-OK message has been received.

2: Boundary Router B262

Figure 37:
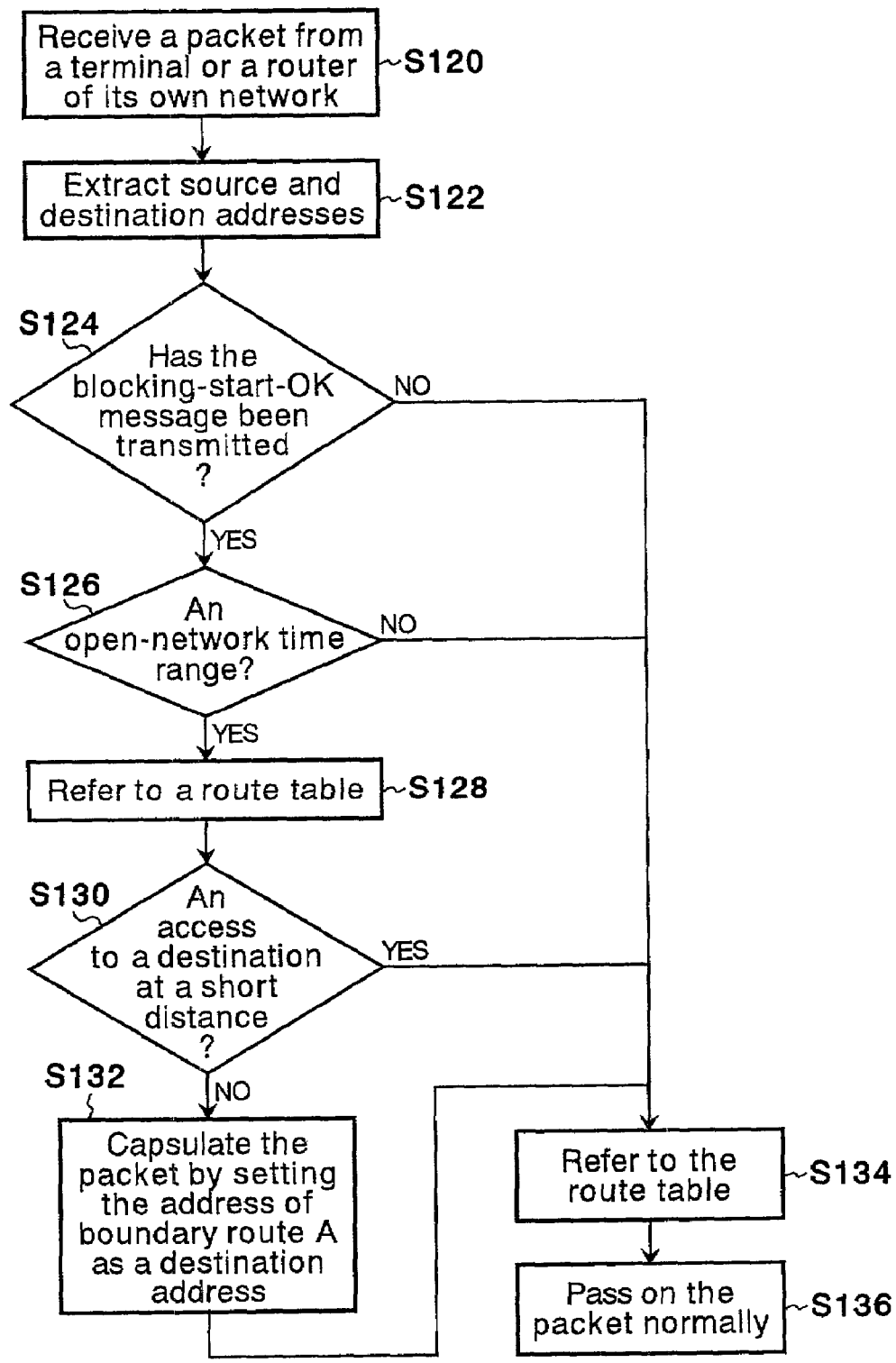
FIG. 37 is a flowchart representing packet control executed by boundary router B.

FIG. 37 is a flowchart representing packet control executed by the boundary router B262. As shown in the figure, the flowchart begins with a step S120 at which the IO port card 290#i employed in the boundary router B262 receives a packet from a router or a terminal of a network including the boundary router B262. At the next step S122, the IO port card 290#i extracts the source and destination IP addresses from the packet. At the next step S124, the IO port card 290#i forms a judgment as to whether or not transmission of a blocking-start-OK message has been completed. If the transmission of a blocking-start-OK message has not been completed, the flow of the control goes on to a step S126. If the transmission of a blocking-start-OK message has been completed, on the other hand, the flow of the control goes on to a step S134. At the step S126 to a step S136, the IO port card 290#i carries out the same pieces of processing as respectively the steps S6 to S16 of the flowchart shown in FIG. 14.

3: Boundary Router A260

Figure 38:
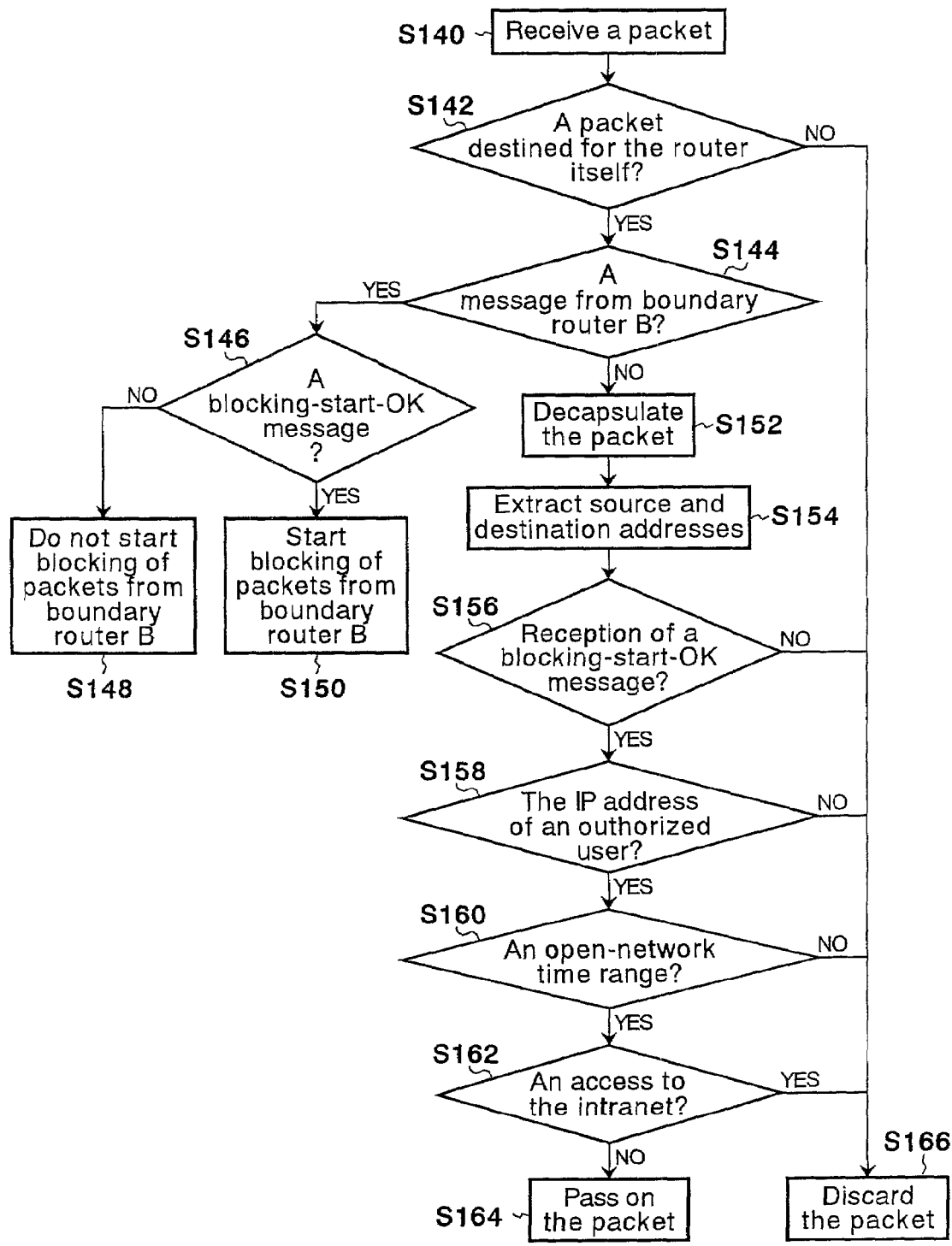
FIG. 38 is a flowchart representing packet control executed by boundary router A.

FIG. 38 is a flowchart representing packet control executed by the boundary router A260. As shown in the figure, the flowchart begins with a step S140 at which the IO port card 264#i employed in the boundary router A260 receives a packet. At the next step S142, the IO port card 264#i forms a judgment as to whether or not the received packet is destined for the boundary router A260. If the received packet is found destined for the boundary router A260, the flow of the control goes on to a step S144. If the received packet is found not destined for the boundary router A260, on the other hand, the flow of the control goes on to a step S166. At the step S144, the received packet is examined to determine whether or not the packet has been received from the boundary router B262. If the received packet is found to have been received from the boundary router B262, the flow of the control goes on to a step S146. If the received packet is found to have been received not from the boundary router B262, on the other hand, the flow of the control goes on to a step S152. At the step S146, the received packet is examined to determine whether or not the packet is a blocking-start-OK message. If the received packet is found to be not a blocking-start-OK message, the flow of the control goes on to a step S148. If the received packet is found to be a blocking-start-OK message, on the other hand, the flow of the control goes on to a step S150. At the step S148, a decision is made not to block packets coming from the boundary router B262. At the step S150, on the other hand, a decision is made to block packets coming from the boundary router B262 from now on.

At the step S152, the IO port card 264#i decapsulates the received packet. At the next step S154, the source and destination IP addresses are extracted from the received packet. The flow of the control then goes on to a step S156 to form a judgment as to whether or not reception of a blocking-start-OK message has already been completed. If the reception of a blocking-start-OK message has not been completed, the flow of the control goes on to a step S158. If the reception of a blocking-start-OK message has already been completed, on the other hand, the flow of the control goes on to a step S166. At a step S158 to the step S166, the IO port card 264#i carries out the same pieces of processing as respectively the steps S28 to S36 of the flowchart shown in FIG. 15.

In accordance with the fourth embodiment described above, by exchanging a blocked-network start message and a blocking-start-OK message, it is possible to synchronize a timing to block the network between the boundary routers so as to allow temporary suspension of services for preventive maintenance or the like in addition to the effects exhibited by the first embodiment. It should be noted that the third and fourth embodiments can be combined.

Fifth Embodiment

Figure 39:
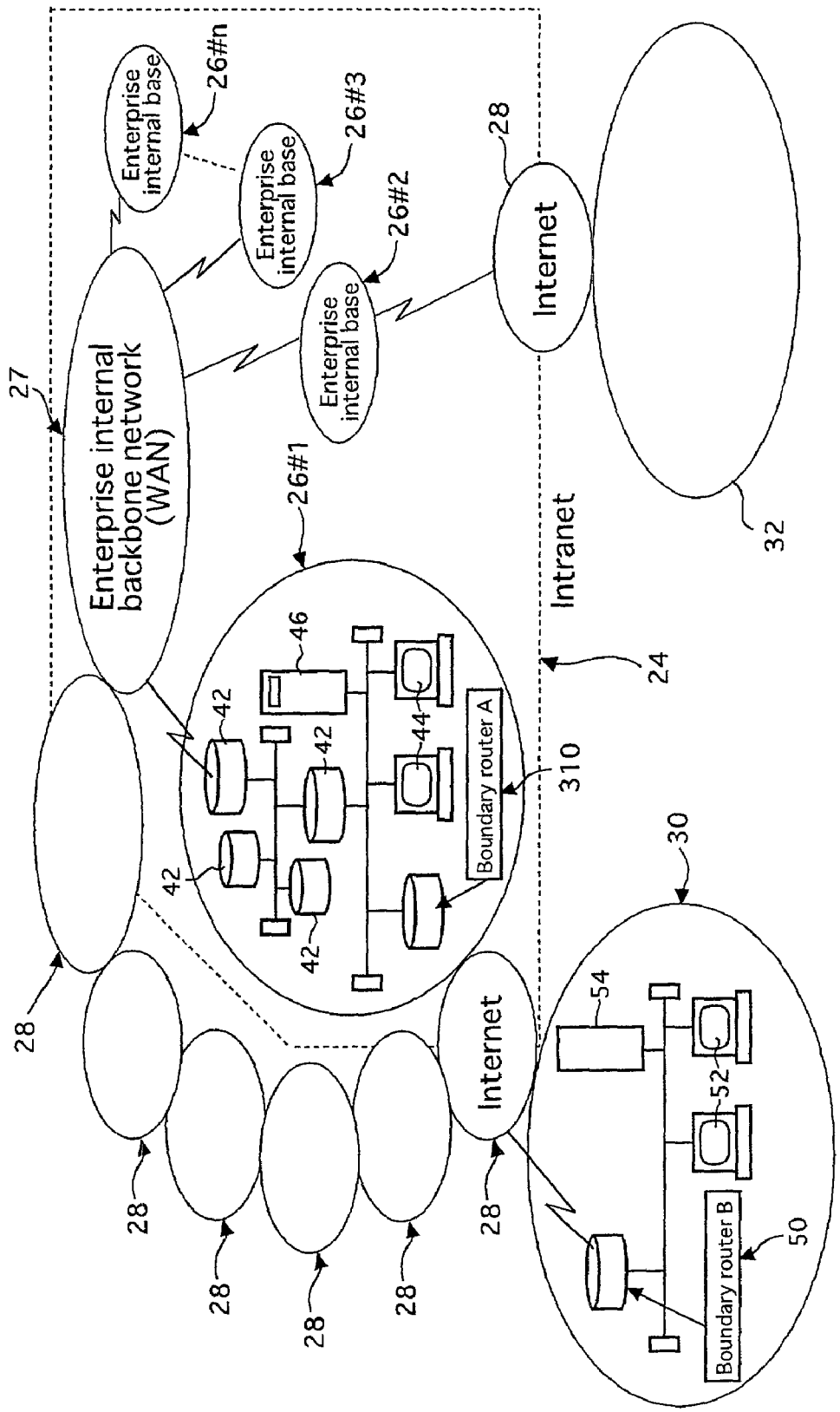
FIG. 39 is a diagram showing a communication network implemented by a fifth embodiment of the present invention.

FIG. 39 is a diagram showing a communication network implemented by a fifth embodiment of the present invention. Configuration elements of the fifth embodiment which are virtually identical with those employed in the first embodiment shown in FIG. 2 are denoted by the same reference numerals as the latter. The fifth embodiment is different from the first embodiment in that, in the case of the first embodiment, the boundary router A40 shown in FIG. 2 does not impose a limit on the number of packets to be passed through the intranet 24 during an open time window while, in the case of the fifth embodiment, a boundary router A310 discards a packet transmitted by an authorized user as the number of packets passed through the intranet 24 exceeds a predetermined packet count.

Figure 40:
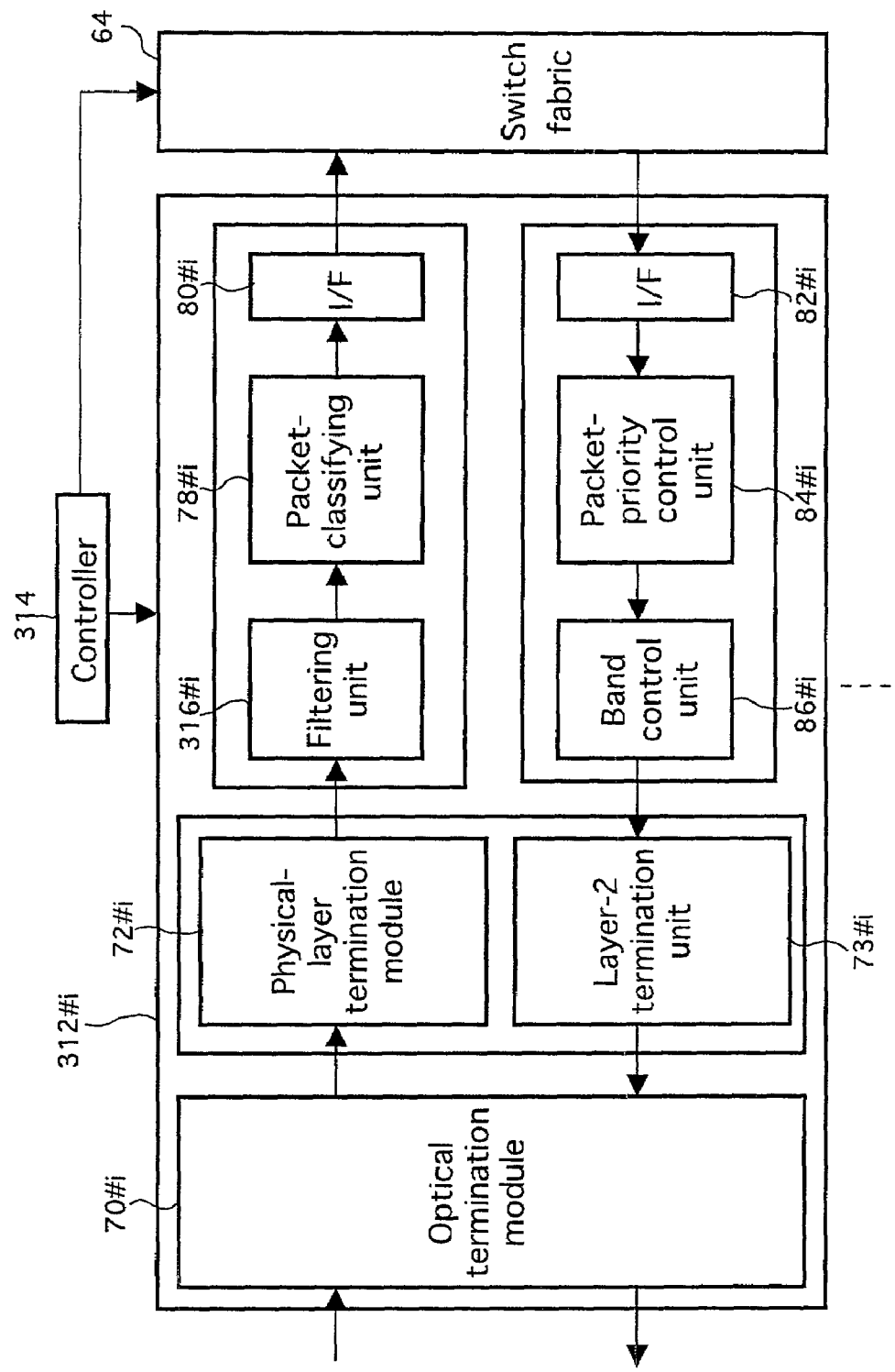
FIG. 40 is a diagram showing the configuration of boundary router A employed in the communication network shown in FIG. 39.

FIG. 40 is a diagram showing the configuration of the boundary router A310 employed in the communication network shown in FIG. 39. Configuration elements of the boundary router A310 which are virtually identical with those employed in the boundary router A40 shown in FIG. 3 are denoted by the same reference numerals as the latter. As shown in FIG. 40, the router A310 comprises a plurality of IO port cards 312#k where k=1 to m, a controller 314 and the switch fabric 64. In the case of the fifth embodiment, since the IO port card interfacing with the Internet 28 is different from the conventional one, the card is denoted by reference numeral 312#i in the following description.

Figure 41:
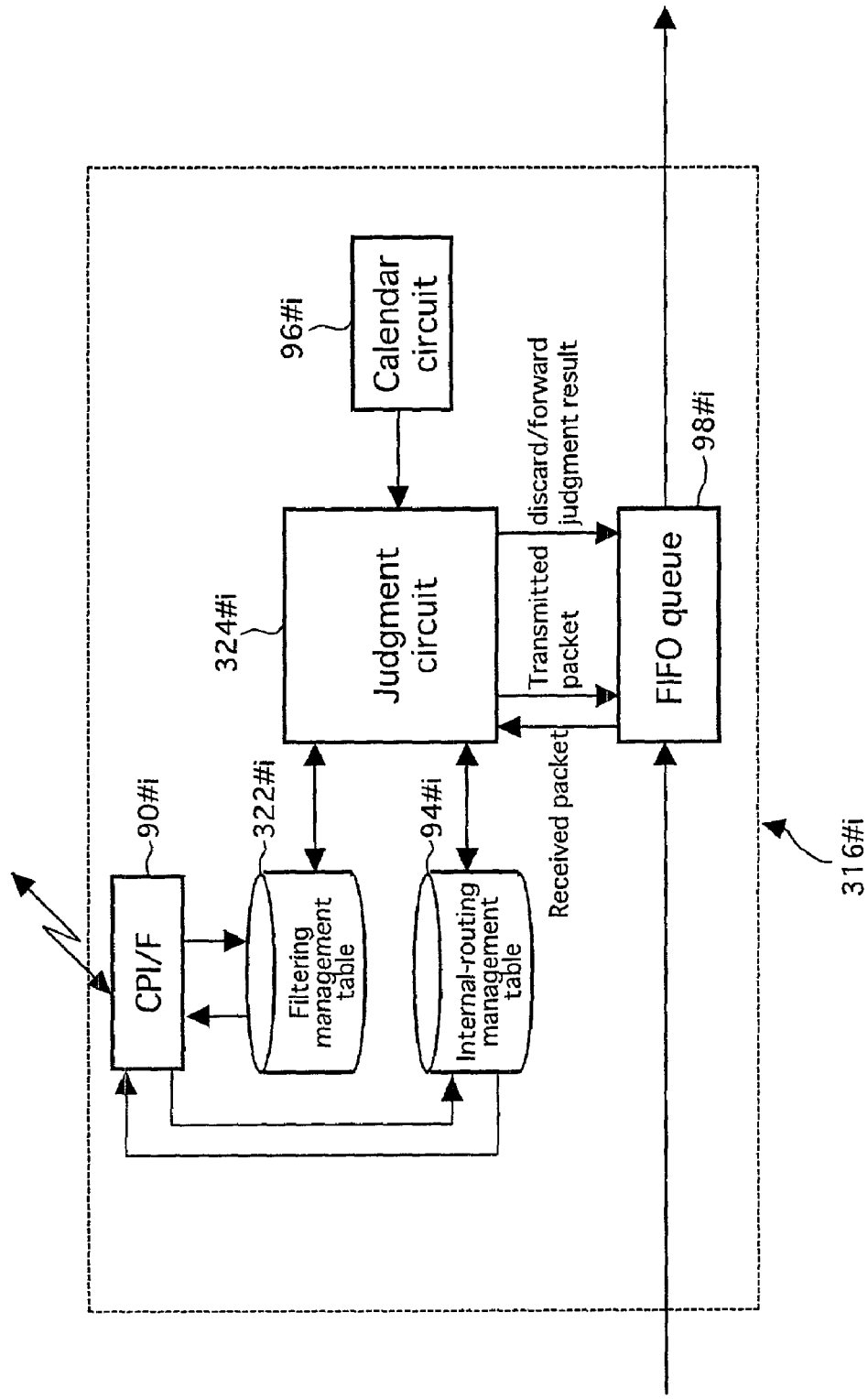
FIG. 41 is a diagram showing the configuration of a filtering unit employed in boundary router A shown in FIG. 40.

FIG. 41 is a diagram showing the configuration of a filtering unit 316#i employed in the boundary router A310 shown in FIG. 40. Configuration elements of the filtering unit 316#i which are virtually identical with those employed in the filtering unit 76#i shown in FIG. 4 are denoted by the same reference numerals as the latter.

FIG. 42 is a diagram showing the structure of a filtering management table 322#i used in the filtering unit 316#i shown in FIG. 41. As shown in FIG. 42, the filtering management table 322#i includes a predetermined packet count and the number of transmitted packets on each entry in addition to the information stored in the filtering management table 92#i shown in FIG. 5. The predetermined packet count is an upper limit imposed on the number of transmitted packets each having the same IP address on the same entry as a transmission-source address. The predetermined packet count is used in a prepaid-card system for rendering services limited by the packet count. The number of transmitted packets is the number of actually passed packets each having the IP address as a transmission-source address. The controller 314 sets the predetermined packet count whereas a judgment circuit 324#i updates the number of packets each time a packet having the IP address on the same entry as a transmission-source address is passed through the intranet 24.

Figure 43:
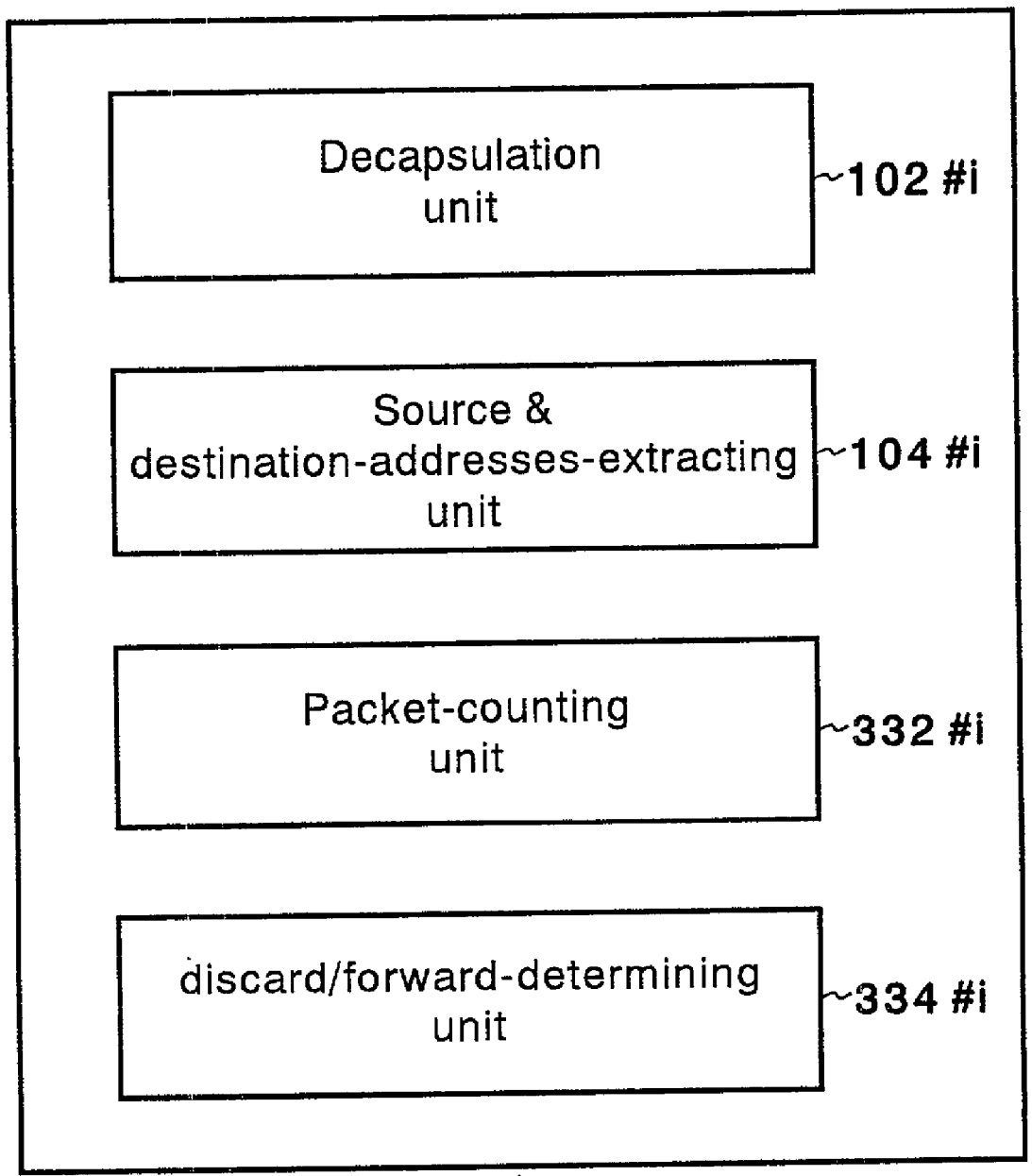
FIG. 43 is a diagram showing the configuration of a judgment circuit employed in the filtering unit shown in FIG. 41.

FIG. 43 is a diagram showing the configuration of the judgment circuit 324#i employed in the filtering unit 316#i shown in FIG. 41. Configuration elements of the judgment circuit 324#i which are virtually identical with those employed in the judgment circuit 94#i shown in FIG. 6 are denoted by the same reference numerals as the latter. As shown in FIG. 43, the judgment circuit 324#i comprises a decapsulation unit 102#i, a source & destination-addresses-extracting unit 104#i, a packet-counting unit 332#i and a discard/forward-determining unit 334#i. The packet-counting unit 332#i increments the number of received packets having a specific source IP address. The counted packets are received during an open time range stored on the same entry in the filtering management table 322#i as the specific source IP address and the number of received packets. The discard/forward-determining unit 334#i executes the following functions: 1) Compare the number of received packets with the predetermined packet count for a received packet having a destination outside the intranet 24 receiving the packet during a time range open to a specific authorized user. 2) Inform the FIFO queue 98#i of the result of comparison to pass on the received packet if the result of comparison indicates that the predetermined packet count is greater than the number of received packets. 3) Inform the FIFO queue 98#i of the result of comparison to discard the received packet if the result of comparison indicates that the predetermined packet count is equal to or smaller than the number of received packets. 4) Inform the FIFO queue 98#i of the result of comparison to discard the received packet if the specific user is not an authorized user, the packet is not received during an open time range or the packet is transmitted to make an access to an object in the intranet 24.

The controller 314 executes the following functions: 1) Create a routing table and execute routing control based on the table. 2) Create the internal routing management table 93#i and the filtering management table 322#i in the filtering unit 316#i in accordance with an input entered by a person in charge of maintenance.

The operation of the communication network shown in FIG. 39 is explained as follows:

1: Boundary Router B50

Since the operation of the boundary router B50 is the same as that employed in the first embodiment, its explanation is not repeated.

2: Boundary Router A310

Figure 44:
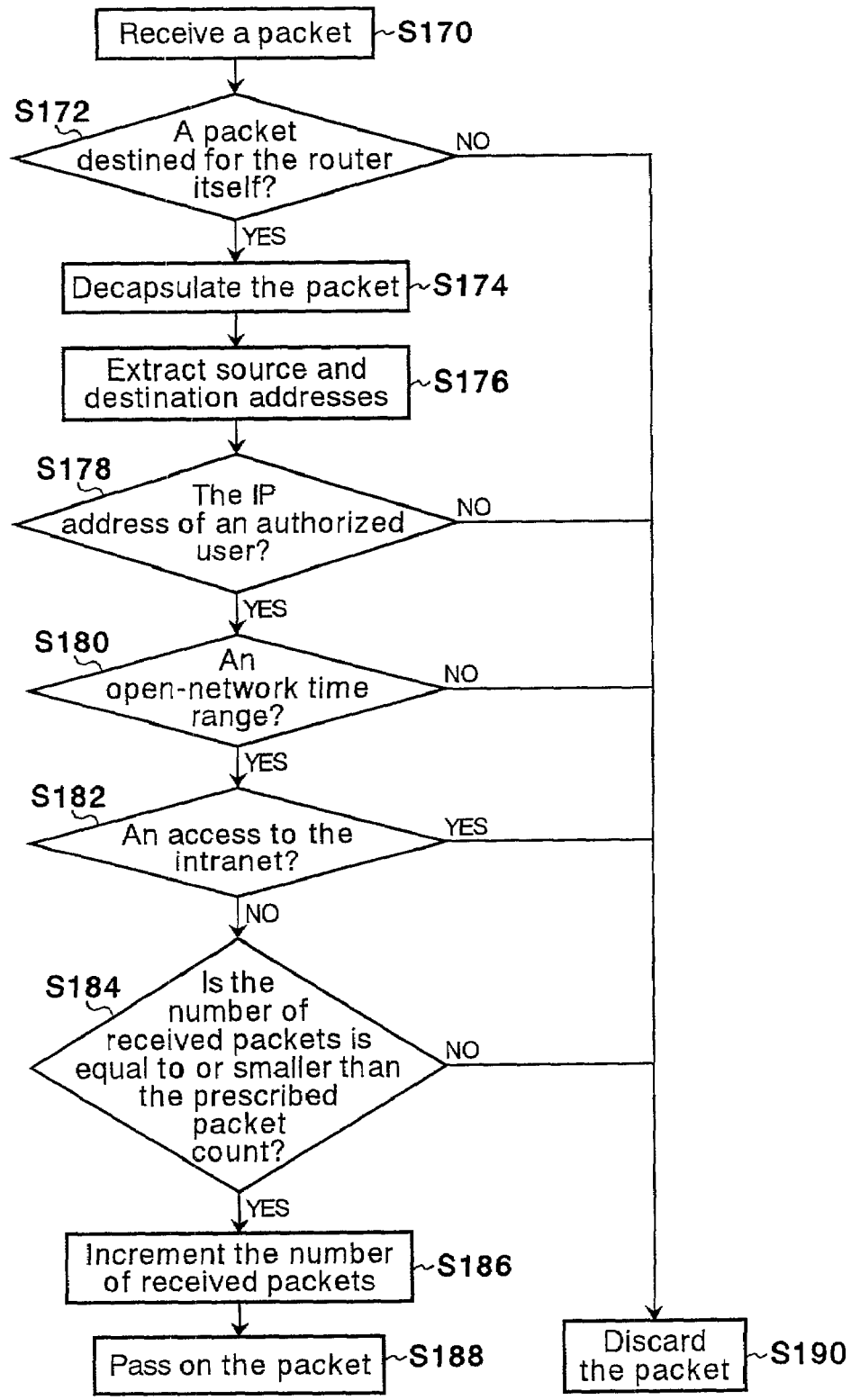
FIG. 44 is a flowchart representing packet control executed by boundary router A.

FIG. 44 is a flowchart representing packet control executed by the boundary router A310. At steps S170 to S182, the boundary router A310 carries out the same pieces of processing as respectively the steps S20 to S32 of the flowchart shown in FIG. 15. At a step S184, the judgment circuit 324#i employed in the IO port card 312#i searches the filtering management table 322#i for an entry associated with a source IP address, and compares the number of received packets for the entry with the predetermined packet count on the same entry in order to determine whether or not the number of received packets is smaller than or equal to the predetermined packet count. If the number of received packets is smaller than or equal to the predetermined packet count, the flow of the control goes on to a step S186. If the number of received packets is greater than the predetermined packet count, on the other hand, the FIFO queue 98#i is informed of a result of determination to discard the received packet. Then, the flow of the control goes on to a step S190. At the step S186, the judgment circuit 324#i increments the number of received packets associated with the received packet's source IP address stored in the filtering management table 322#i. The pieces of processing carried out at the steps S188 to S190 are the same as those of the steps S34 to S36 of the flowchart shown in FIG. 15.

In accordance with the fifth embodiment, it is possible to present a prepaid service limited by the number of received packets in addition to the same effects as those exhibited by the first embodiment.

Sixth Embodiment

Figure 45:
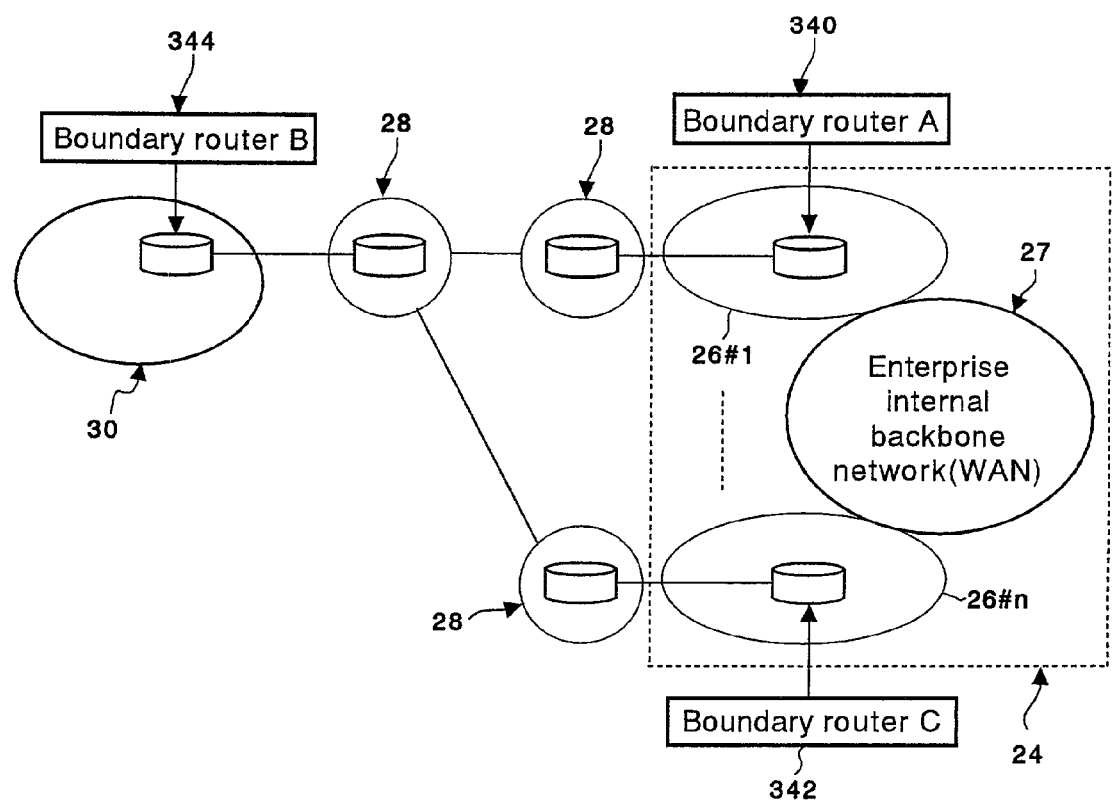
FIG. 45 is a diagram showing a communication network implemented by a sixth embodiment of the present invention.

FIG. 45 is a diagram showing a communication network implemented by a sixth embodiment of the present invention. Configuration elements of the sixth embodiment which are virtually identical with those employed in the first embodiment shown in FIG. 2 are denoted by the same reference numerals as the latter. The sixth embodiment is different from the first embodiment in that, in the case of the sixth embodiment, a boundary router B344 in the general-user network 30 transmits an encapsulated packet to a communicatable boundary router C342 of another enterprise internal base 26#n in case the communication with a boundary router A340 of the enterprise internal base 26#1 becomes impossible as shown in FIG. 45. The boundary router A340 is virtually identical with the boundary router C342. In addition to the function of the boundary router A40 employed in the first embodiment, the boundary routers A340 and C342 each have an additional function for verifying that the communication with the boundary router B344 is normal.

Figure 46:
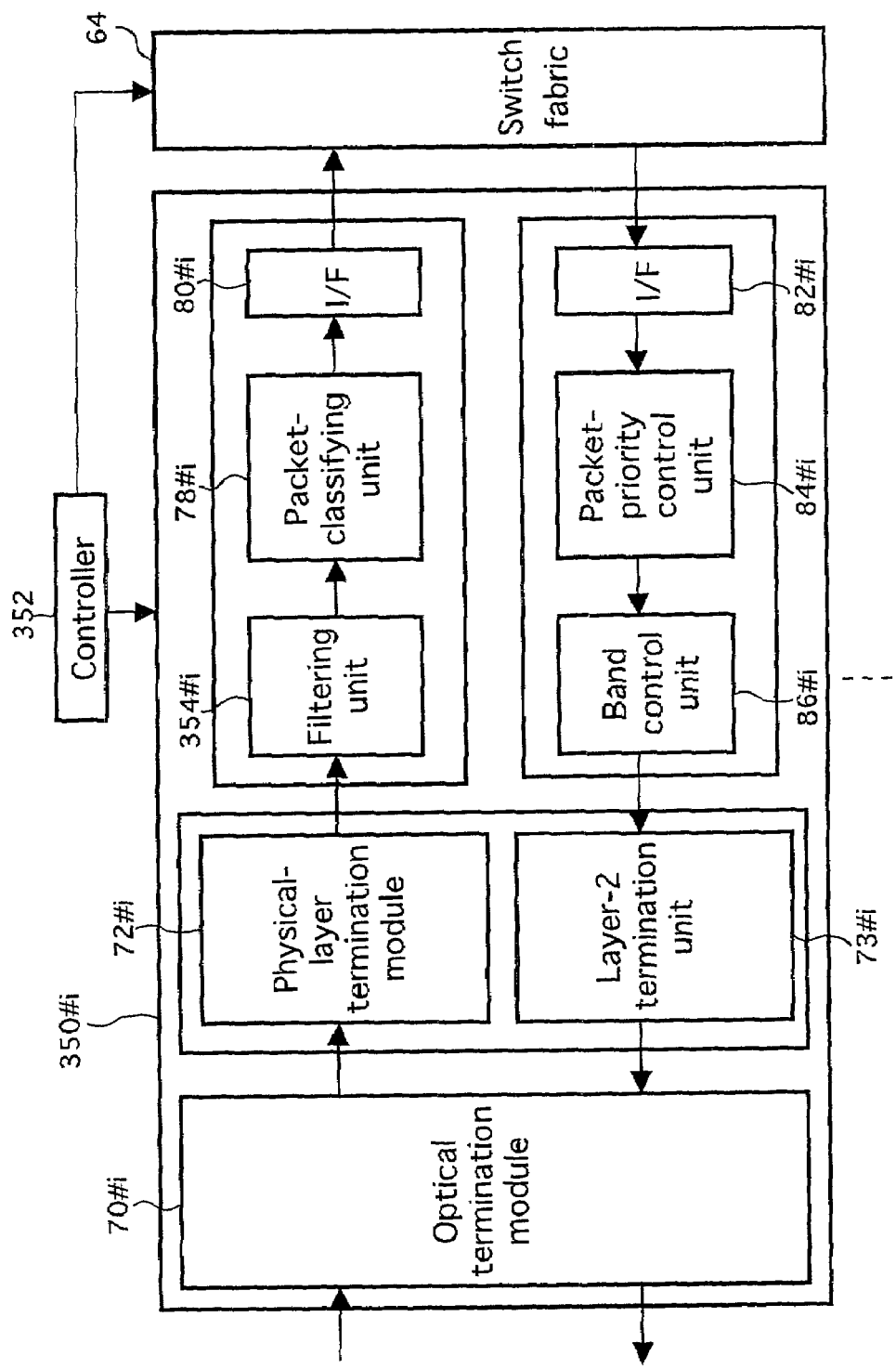
FIG. 46 is a diagram showing the configuration of boundary router A employed in the communication network shown in FIG. 45.

FIG. 46 is a diagram showing the configuration of the boundary router A340 employed in the communication network shown in FIG. 45. Configuration elements of the boundary router A340 which are virtually identical with those employed in the boundary router A40 shown in FIG. 3 are denoted by the same reference numerals as the latter. As shown in FIG. 46, the boundary router A340 comprises a plurality of IO port cards 350#k where k=1 to m, a controller 352 and the switch fabric 64. In the case of the sixth embodiment, since the IO port card interfacing with the Internet 28 is different from the conventional one, the card is denoted by reference numeral 350#i in the following description.

Figure 47:
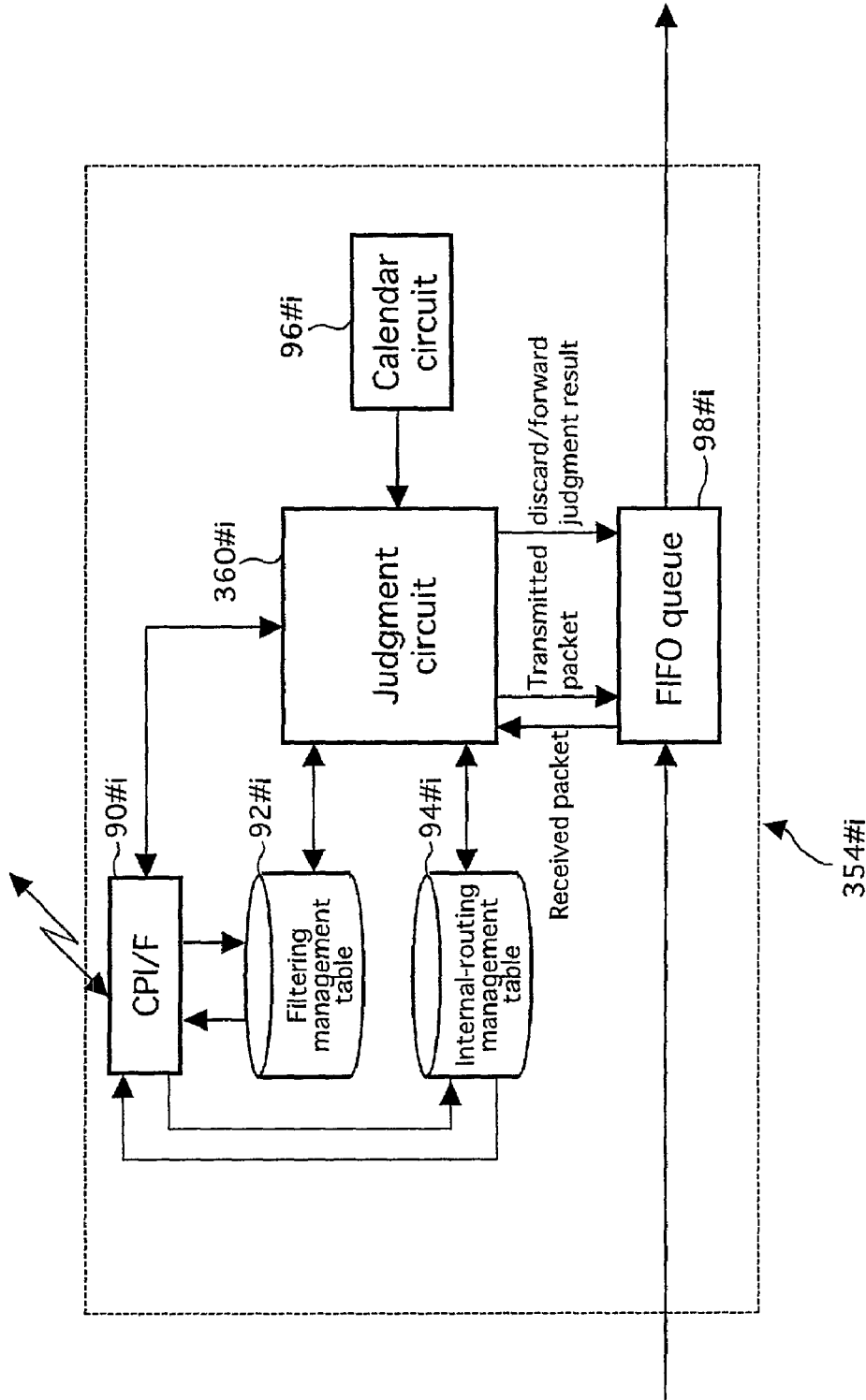
FIG. 47 is a diagram showing the configuration of a filtering unit employed in boundary router A shown in FIG. 46.

FIG. 47 is a diagram showing the configuration of a filtering unit 354#i employed in the boundary router A340 shown in FIG. 46. Configuration elements of the filtering unit 354#i which are virtually identical with those employed in the filtering unit 76#i shown in FIG. 4 are denoted by the same reference numerals as the latter.

Figure 48:
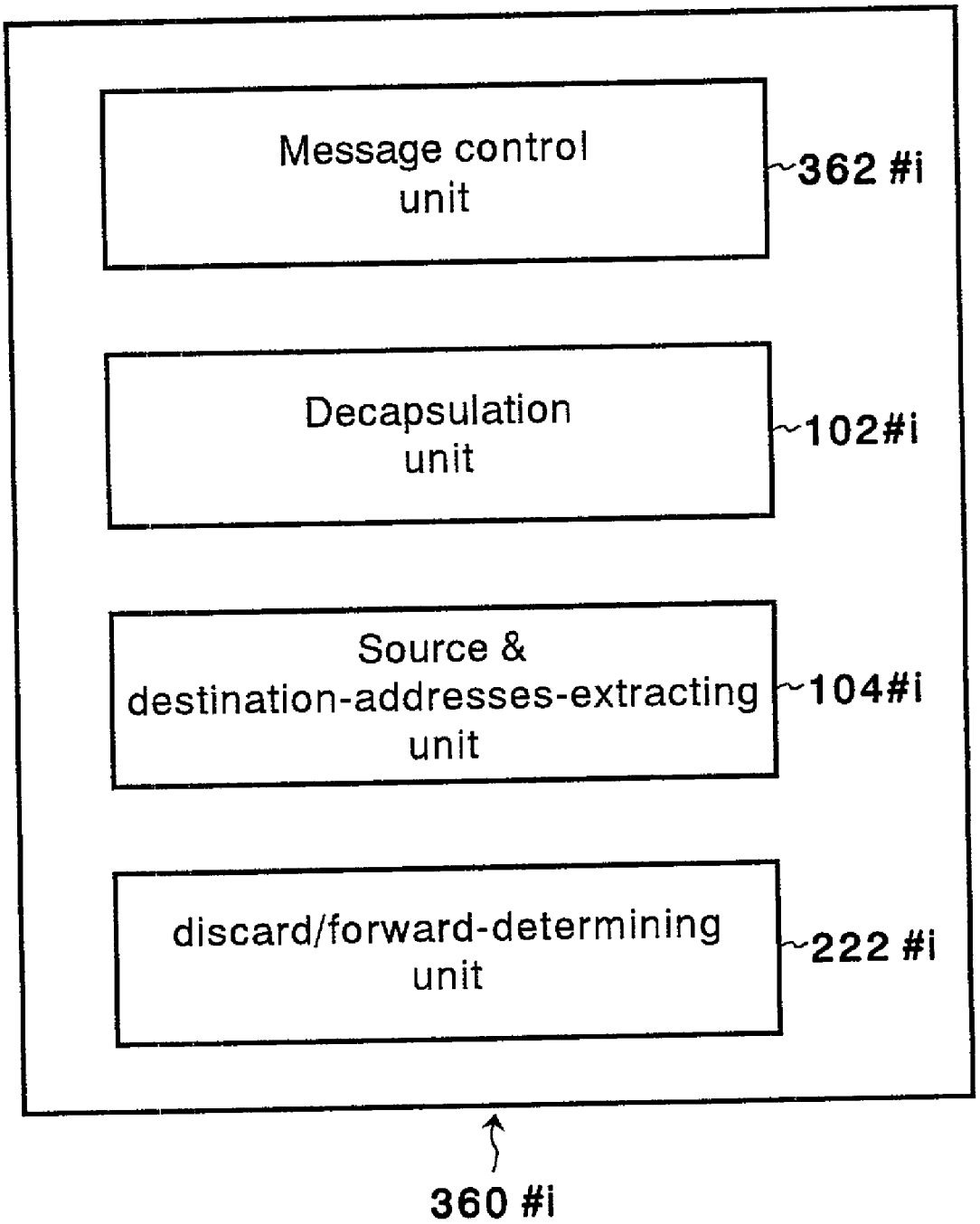
FIG. 48 is a diagram showing the configuration of a judgment circuit employed in the filtering unit shown in FIG. 47.

FIG. 48 is a diagram showing the configuration of a judgment circuit 360#i employed in the filtering unit 354#i shown in FIG. 47. Configuration elements of the judgment circuit 360#i which are virtually identical with those employed in the judgment circuit 94#i shown in FIG. 6 are denoted by the same reference numerals as the latter. As shown in FIG. 48, the judgment circuit 360#i comprises a message control unit 362#i, a decapsulation unit 102#i, a source & destination-addresses-extracting unit 104#i and a discard/forward-determining unit 222#i. The message control unit 362#i executes the following functions: 1) Control transmission of a message to the boundary router B344 in accordance with a command issued by the controller 352. The message is a periodical operation-verifying message issued by the boundary router B344 for verifying an operation. 2) Notify the controller 352 of a message received from the boundary router B344 upon reception of the message.

In addition to the functions of the controller 62 employed in the boundary router A40 shown in FIG. 3, the controller 352 executes a function of giving a command to the message control unit 362#i to transmit a normal-operation message to the boundary router B344 on reception of a periodical operation-verifying message from the boundary router B344.

Figure 49:
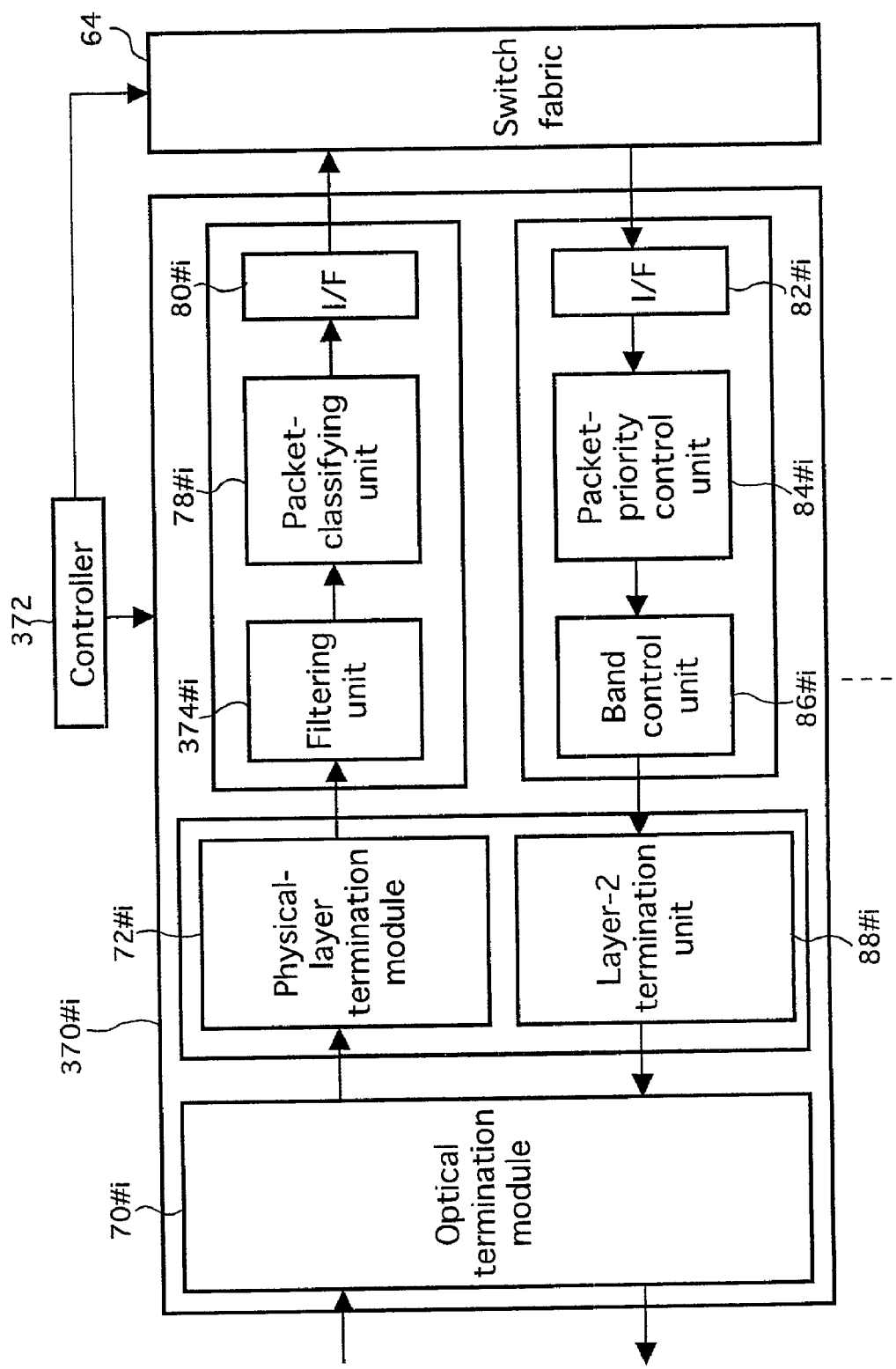
FIG. 49 is a diagram showing the configuration of boundary router B employed in the communication network shown in FIG. 45.

FIG. 49 is a diagram showing the configuration of the boundary router B344 employed in the communication network shown in FIG. 45. Configuration elements of the boundary router B344 which are virtually identical with those employed in the boundary router B50 shown in FIG. 7 are denoted by the same reference numerals as the latter. As shown in FIG. 49, the boundary router B344 comprises a plurality of IO port cards 370#k where k=1 to m, a controller 372 and the switch fabric 64. In this embodiment, an IO port card for interfacing with a transmission line connected to the Internet 28 to which a message is transmitted from the boundary router A340 or C342 and an IO port card for interfacing with a transmission line connected to a terminal 52 of the general-user network 30 are different from the conventional ones. For this reason, an IO port card for interfacing with a transmission line connected to the Internet 28 and an IO port card for interfacing with a transmission line connected to a terminal 52 are denoted by reference numerals 370#j and 370#i respectively in the following description. The IO port card 370#j executes functions different from those of the conventional one as follows: 1) Transmit a periodical operation-verifying message to the boundary router A340 or C342 in accordance with a command issued by the controller 372. 2) Notify the controller 372 of a normal-operation message received from the boundary router A340 or C342 upon reception of the message.

Figure 50:
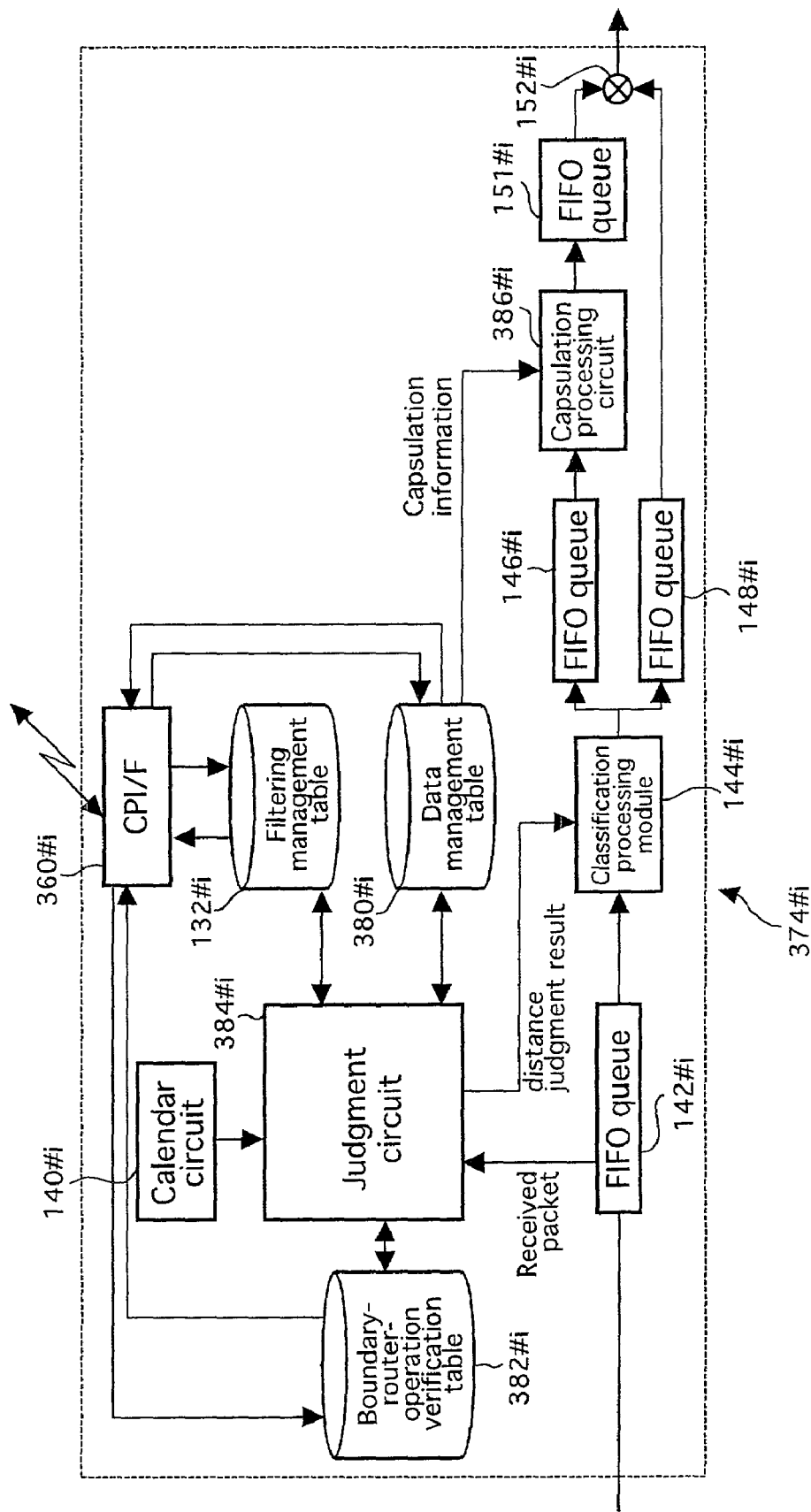
FIG. 50 is a diagram showing the configuration of a filtering unit employed in boundary router B shown in FIG. 49.

FIG. 50 is a diagram showing the configuration of a filtering unit 374#i employed in the boundary router B344 shown in FIG. 49. Configuration elements of the filtering unit 374#i which are virtually identical with those employed in the filtering unit 120#i shown in FIG. 8 are denoted by the same reference numerals as the latter. As shown in FIG. 50, the filtering unit 374#i includes a boundary-router-operation verification table 382#i.

FIG. 51 is a diagram showing the structure of a data management table 380#i used in the filtering unit 374#i shown in FIG. 50. As shown in FIG. 51, the data management 380#i is used for cataloging an encapsulation header to be used in encapsulation of a packet being transmitted to any other boundary router such as the boundary router A340 or C342 in the intranet 24.

FIG. 52 is a diagram showing the structure of the boundary-router-operation verification table 382#i used in the filtering unit 374#i shown in FIG. 50. As shown in FIG. 52, the boundary-router-operation verification table 382#i is used for cataloging operation status of each boundary router such as the boundary router A340 or C342 in the intranet 24. A notation ACT indicates status of a verified normal operation. On the other hand, a notation NON-ACT indicates status of a failure in verification of a normal operation.

Figure 53:
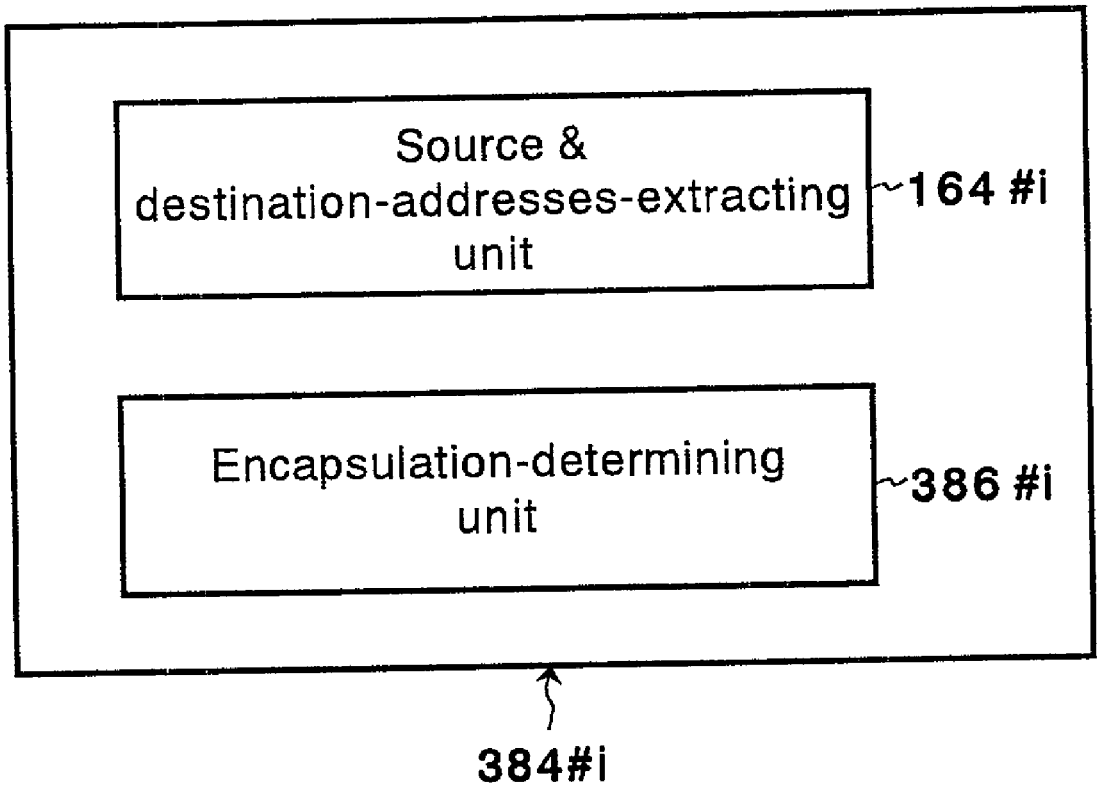
FIG. 53 is a diagram showing the configuration of a judgment circuit employed in the filtering unit shown in FIG. 50.

FIG. 53 is a diagram showing the configuration of a judgment circuit 384#i employed in the filtering unit 374#i shown in FIG. 50. Configuration elements of the judgment circuit 384#i which are virtually identical with those employed in the judgment circuit 138#i shown in FIG. 11 are denoted by the same reference numerals as the latter. As shown in FIG. 53, the judgment circuit 384#i comprises a source & destination-addresses-extracting unit 164#i and an encapsulation-determining unit 386#i. The encapsulation-determining unit 386#i executes the following functions: 1) Form a judgment as to whether the status of the boundary router A340 is ACT or NON-ACT by referring to the boundary-router-operation verification table 382#i prior to a transmission of an encapsulated packet to the intranet 24. 2) Give a command to the encapsulation-determining unit 386#i to transmit the encapsulated packet to the boundary router A340 if the status of the boundary router A340 is found to be ACT. 3) Give a command to the encapsulation-determining unit 386#i to transmit the encapsulated packet to the boundary router C342 if the status of the boundary router A340 is found to be NON-ACT but the status of the boundary router C342 is found to be ACT. 4) Notify the classification processing module 144#i of a judgment result indicating a short distance if the status of both the boundary routers A340 and C342 is found to be NON-ACT.

The encapsulation-determining unit 386#i encapsulates a packet being transmitted by adding an encapsulation header read out from the data management table 380#i to the packet in accordance with a command issued by the judgment circuit 384#i. The controller 372 employed in the boundary router B344 shown in FIG. 49 executes the following functions: 1) Give a command to the IO port card 370#j to transmit a periodical operation-verifying message to the boundary router A340 or C342. 2) Set the status of the boundary router A340 or C342 in the boundary-router-operation verification table 382#i at ACT upon reception of a normal-operation message from the IO port card 370#j. 3) Give a command to the IO port card 370#i to retransmit a periodical operation-verifying message to the boundary router A340 or C342 in case a normal-operation message is not received from the IO port card 370#j even if a predetermined period of time has lapsed since the transmission of the preceding periodical operation-verifying message. The command is given to the IO port card 370#i to retransmit a periodical operation-verifying message up to a predetermined number of times or till a normal-operation message is received from the IO port card 370#j. 4) Set the status of the boundary router A340 or C342 in the boundary-router-operation verification table 382#i at NON-ACT in case a normal-operation message is not received from the IO port card 370#j even after the command has been given by function 3 to the IO port card 370#i to retransmit a periodical operation-verifying message a predetermined number of times.

The operation of the communication network shown in FIG. 45 is explained as follows.

1: Verification of Normal Operations of the Boundary Routers A340 and C342

Figure 54:
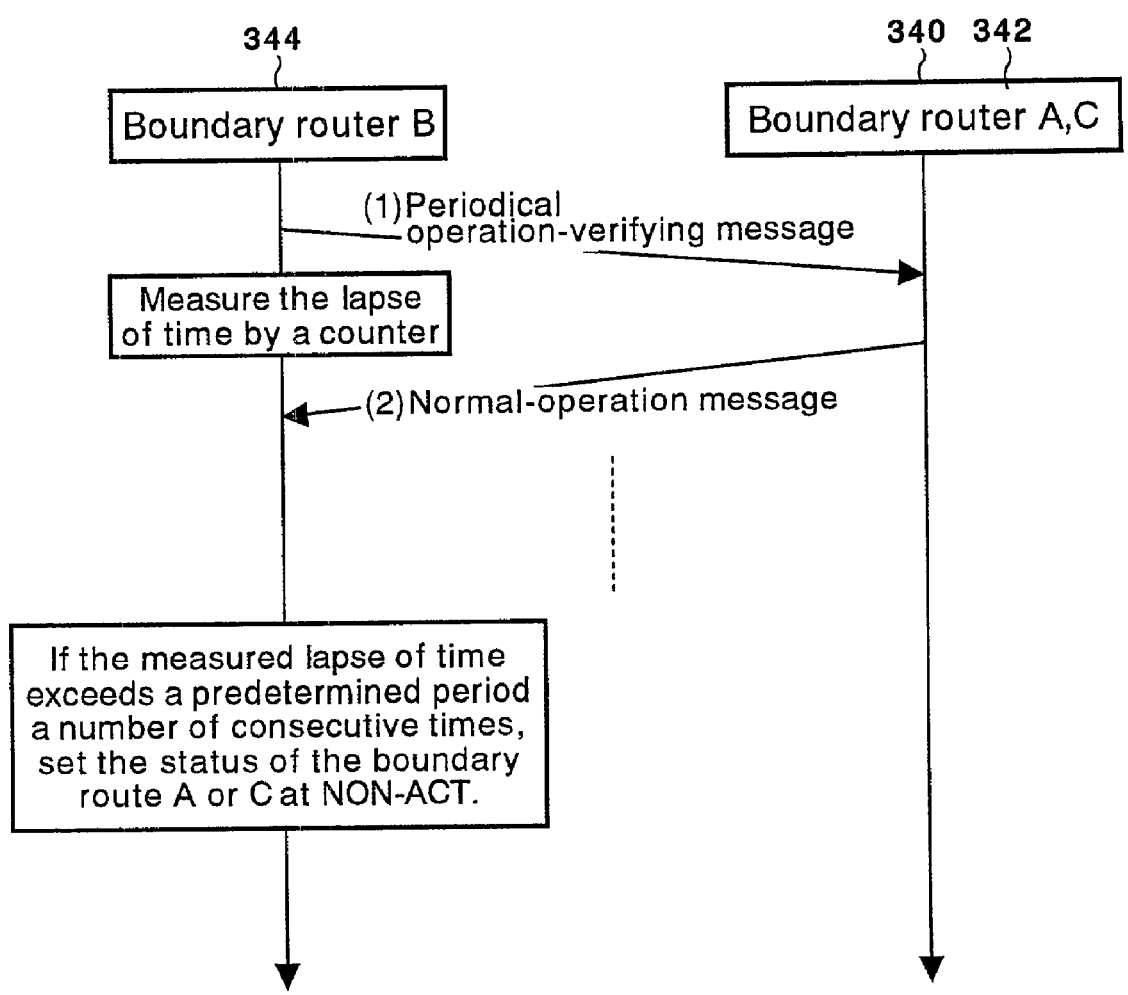
FIG. 54 is a diagram showing a sequence to verify operations of boundary routers.

FIG. 54 is a diagram showing a sequence to verify operations of the boundary routers A340 and C342. As shown by an arrow (1) in FIG. 54, the boundary router B344 transmits a periodical operation-verifying message to the boundary routers A340 and C342. The periodical operation-verifying message is transmitted to the boundary routers A340 and C342 by way of the Internet 28. As shown by an arrow (2) in FIG. 54, the boundary routers A340 and C342 each transmit a normal-operation message to the boundary router B344 upon reception of the periodical operation-verifying message. When receiving the normal-operation message, the boundary router B344 sets the status of the boundary routers A340 and C342 in the boundary-router-operation verification table 382#i at ACT. After transmitting a periodical operation-verifying message to the boundary routers A340 and C342, the boundary router B344 measures the lapse of time by using a timer. The boundary router B344 retransmits a periodical operation-verifying message to the boundary router A340 or C342 in case a normal-operation message is not received from the boundary router A340 or C342 even if a predetermined period of time has lapsed since the transmission of the preceding periodical operation-verifying message. The operation to retransmit a periodical operation-verifying message is carried out up to a predetermined number of times or till a normal-operation message is received from the boundary router A340 or C342. The boundary router B344 sets the status of the boundary router A340 or C342 in the boundary-router-operation verification table 382#i at NON-ACT in case a normal-operation message is not received from the boundary router A340 or C342 even after the operation to retransmit a periodical operation-verifying message has been carried out a predetermined number of times.

2: Boundary Router B344

Figure 55:
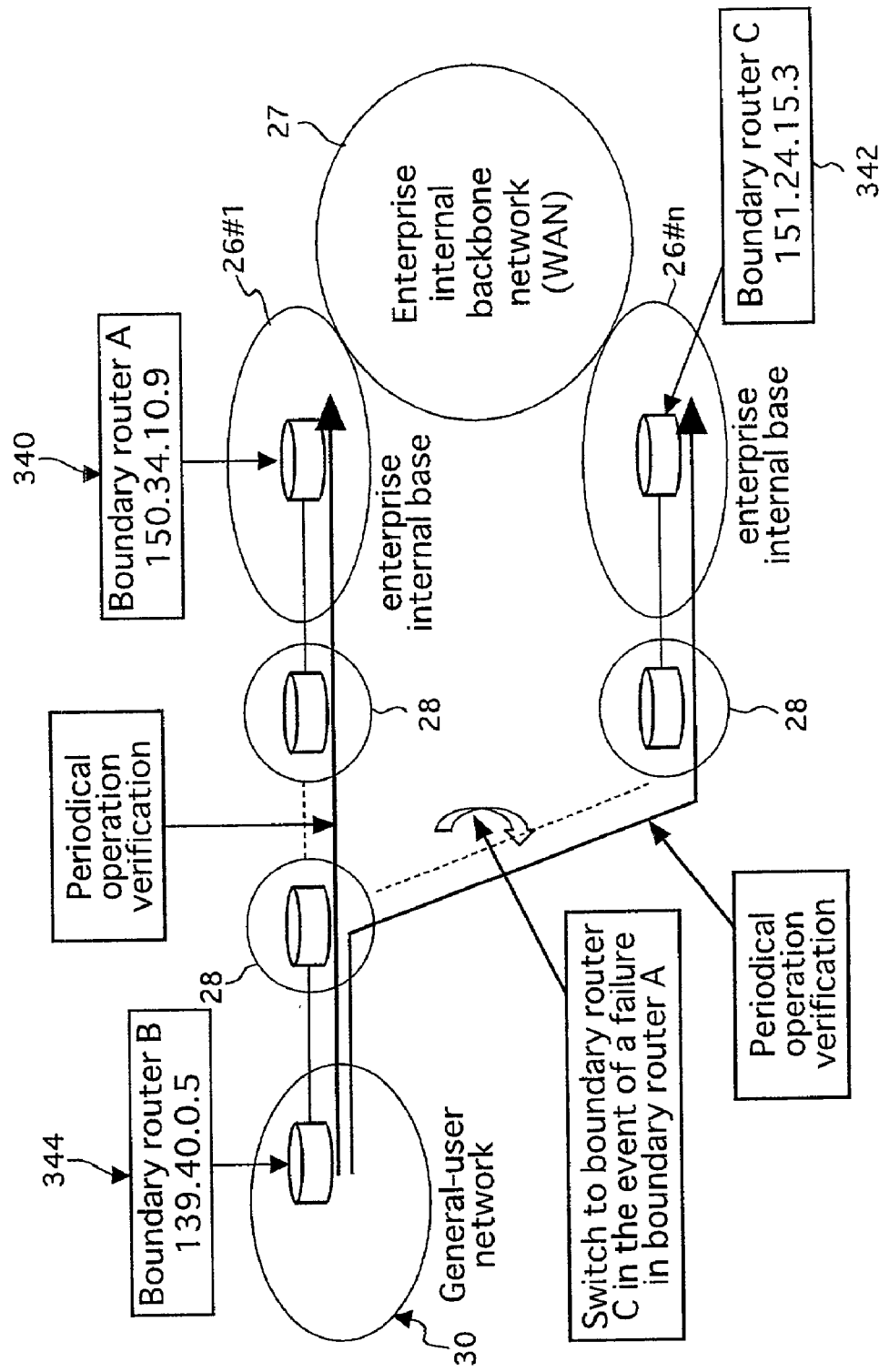
FIG. 55 is an explanatory diagram showing the operation of boundary router B.
Figure 56:
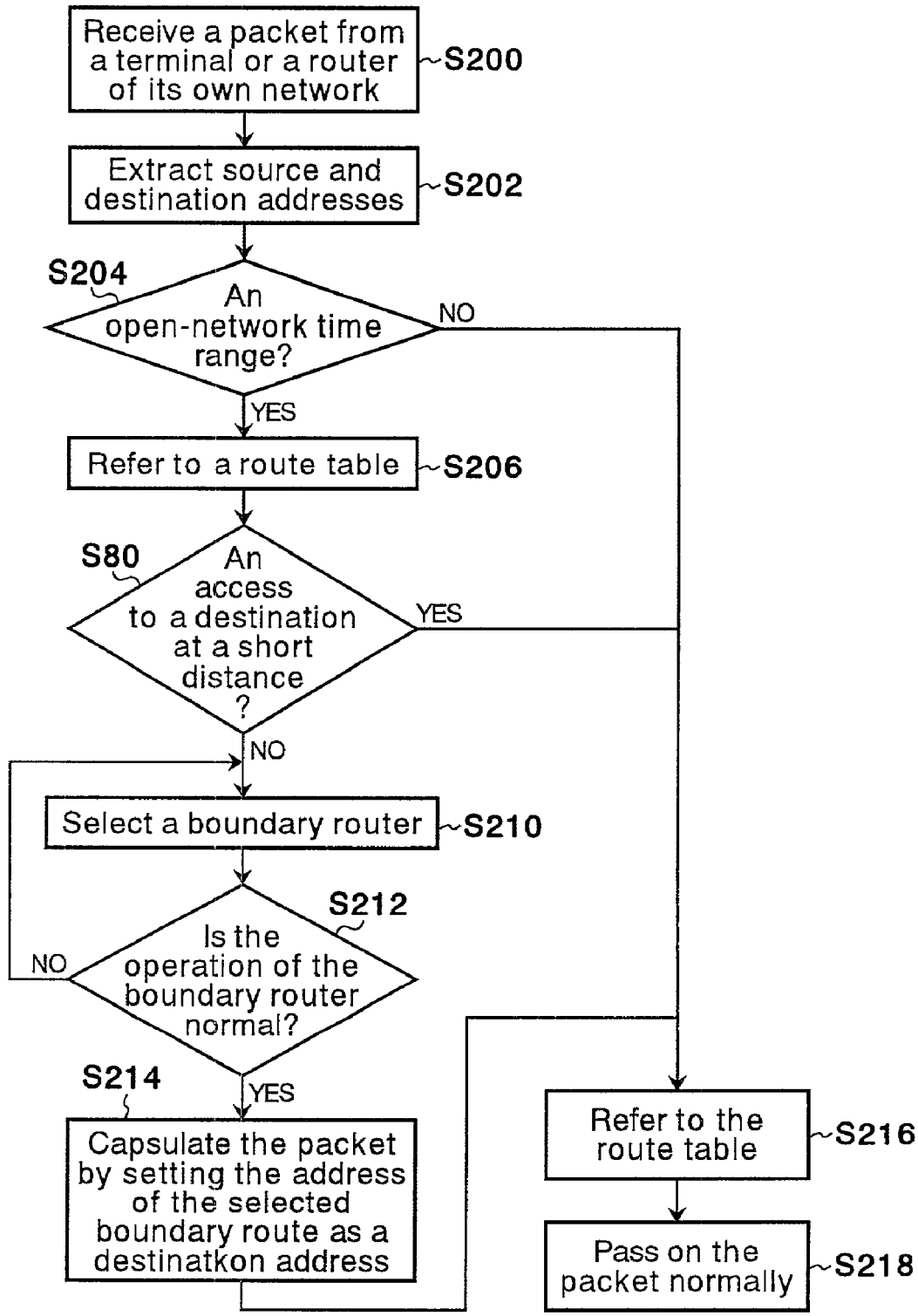
FIG. 56 is a flowchart representing packet control executed by boundary router B.

FIG. 55 is an explanatory diagram showing the operation of the boundary router B344. FIG. 56 is a flowchart representing packet control executed by boundary router B344. At steps S200 to S208 of the flowchart shown in FIG. 56, the boundary router B344 carries out the same pieces of processing as respectively the steps S2 to S10 of the flowchart shown in FIG. 14. At a step S210, the judgment circuit 384#i employed in the filtering unit 374#i shown in FIG. 50 selects a boundary router with a shortest distance among boundary routers. An example of such a boundary router is the boundary router A340. At the next step S212, the judgment circuit 384#i refers to the boundary-router-operation verification table 382#i to see whether the status of the selected boundary router is ACT or NON-ACT. If the status is normal, the flow of the control goes on to a step S214. If the status is abnormal, on the other hand, the flow of the control goes back to the step S210 at which another boundary router such as the boundary router C342 is selected. At the next step S212, the judgment circuit 384#i again refers to the boundary-router-operation verification table 382#i to see whether the status of the selected boundary router is ACT or NON-ACT. At the step S214, the IP address of the selected boundary router is set in a packet to be transmitted as a destination address in an encapsulation process. Pieces of processing carried out at steps S216 to S218 are the same as respectively the steps S14 to S16 of the flowchart shown in FIG. 14. In the event of a failure in the boundary router A340, for example, the destination is switched to the boundary router C342 as shown in FIG. 55. In this case, an address of 151.24.15.3 assigned to the boundary router C342 is set in an encapsulation header added to a packet to be transmitted prior to transmission of the packet to the final destination by way of the boundary router C342.

In accordance with the sixth embodiment described above, the operation of each boundary router in an intranet is verified. Thus, another boundary router can be selected in the event of a failure in a specific boundary router. As a result, the reliability is improved.

Seventh Embodiment

Figure 57:
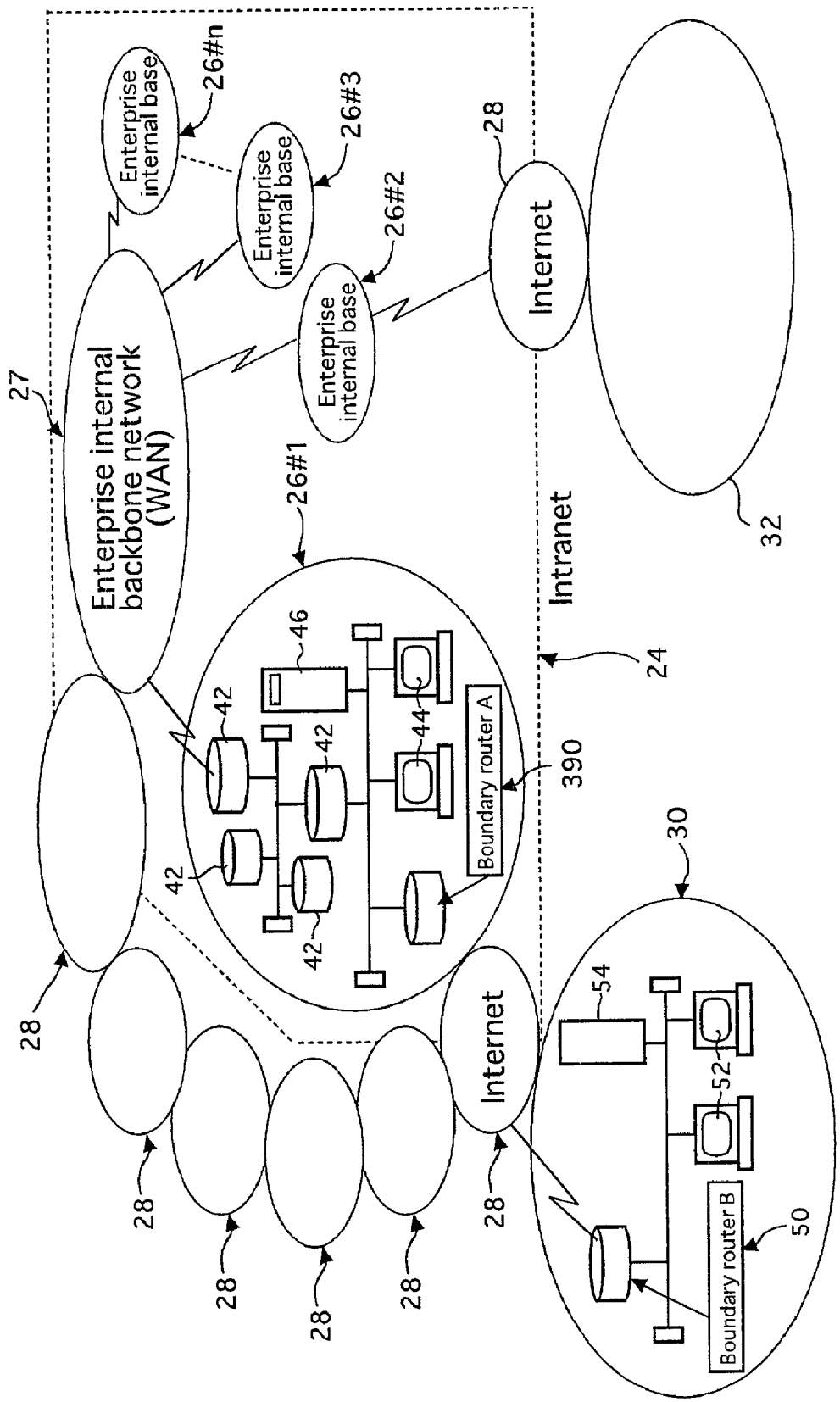
FIG. 57 is a diagram showing a communication network implemented by a seventh embodiment of the present invention.

FIG. 57 is a diagram showing a communication network implemented by a seventh embodiment of the present invention. Configuration elements of the seventh embodiment which are virtually identical with those employed in the first embodiment shown in FIG. 2 are denoted by the same reference numerals as the latter. The seventh embodiment is different from the first embodiment in that, in the case of the seventh embodiment, a boundary router A390 classifies authenticated users into preferentially treated users and ordinary users. Much like the first embodiment, an ordinary user is allowed to use the intranet 24 only during a time range open to the user. Unlike the boundary router A40 shown in FIG. 2, on the other hand, a preferentially treated user is allowed to use the intranet 24 indefinitely at any time. Authorized users are classified as such in order to render different services to different users and, hence, to utilize resources of the intranet 24 with a higher degree of efficiency.

Figure 58:
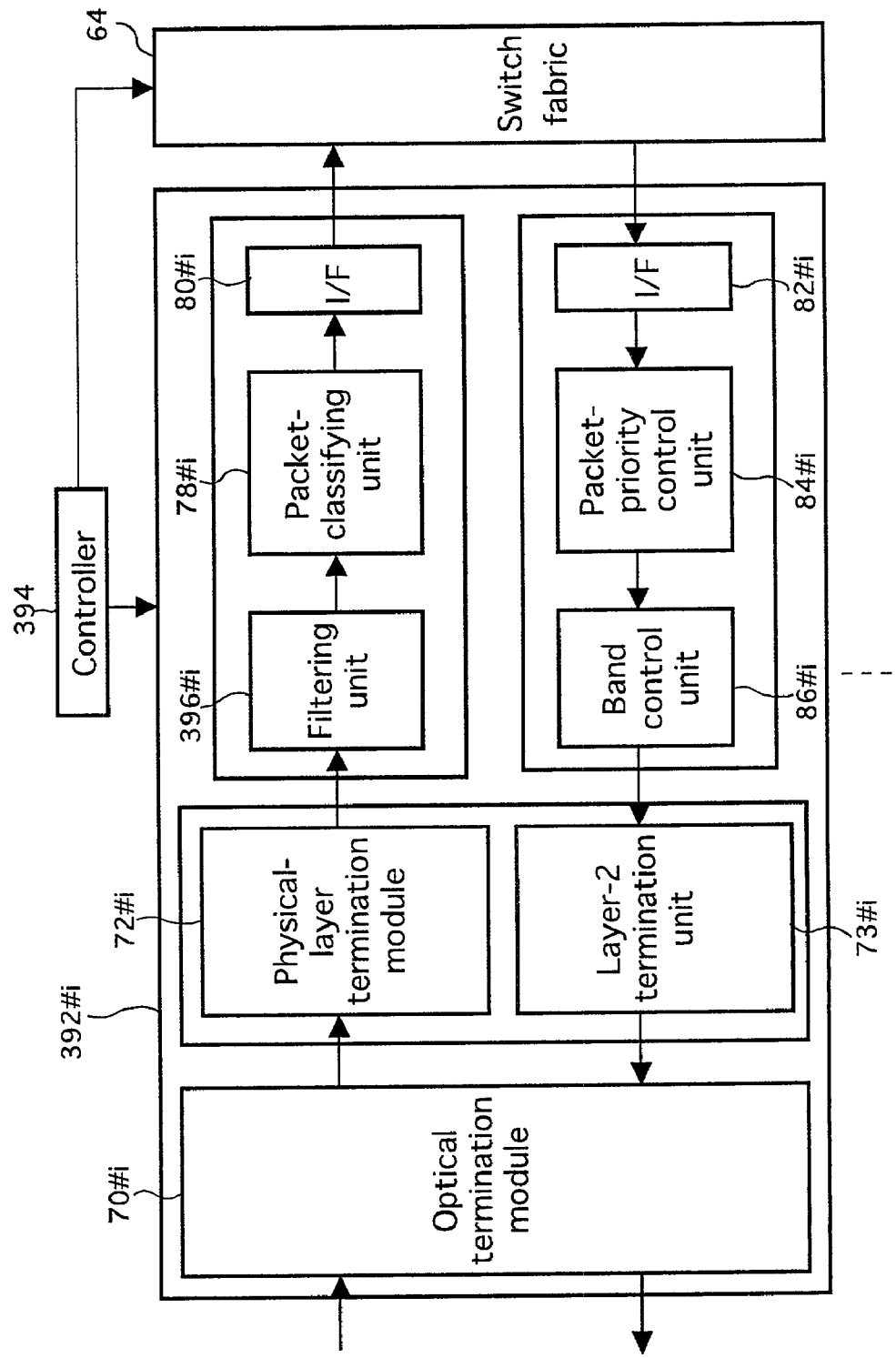
FIG. 58 is a diagram showing the configuration of boundary router A employed in the communication network shown in FIG. 57.

FIG. 58 is a diagram showing the configuration of the boundary router A390 employed in the communication network shown in FIG. 57. Configuration elements of the boundary router A390 which are virtually identical with those employed in the boundary router A40 shown in FIG. 3 are denoted by the same reference numerals as the latter. As shown in FIG. 58, the boundary router A390 comprises a plurality of IO port cards 392#k where k=1 to m, a controller 394 and the switch fabric 64. In the case of the seventh embodiment, since the IO port card interfacing with the Internet 28 is different from the conventional one, the card is denoted by reference numeral 392#i in the following description.

Figure 59:
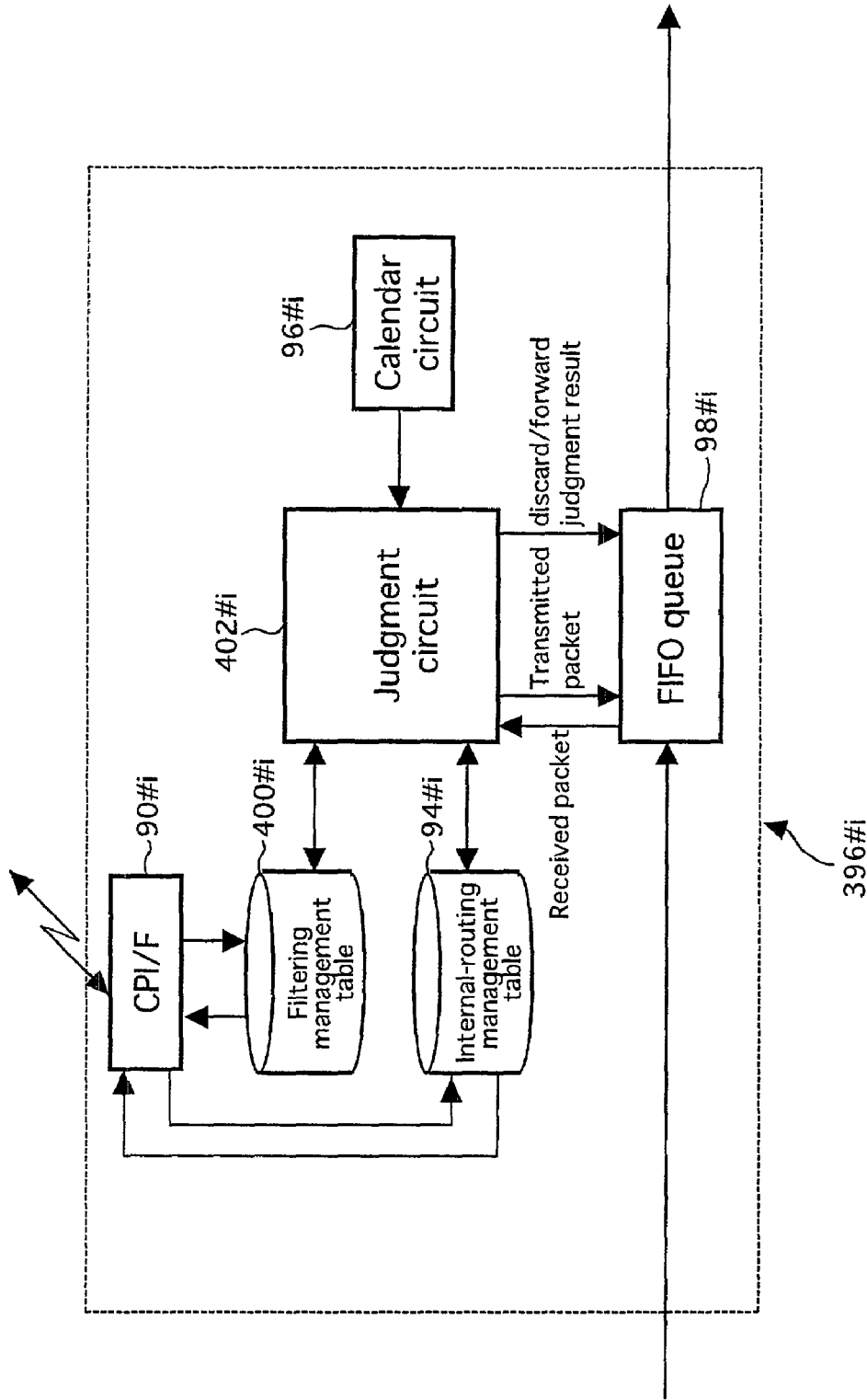
FIG. 59 is a diagram showing the configuration of a filtering unit employed in boundary router A shown in FIG. 58.

FIG. 59 is a diagram showing the configuration of a filtering unit 396#i employed in the boundary router A390 shown in FIG. 58. Configuration elements of the filtering unit 396#i which are virtually identical with those employed in the filtering unit 76#i shown in FIG. 4 are denoted by the same reference numerals as the latter.

FIG. 60 is a diagram showing the structure of a filtering management table 400#i used in the filtering unit 396#i shown in FIG. 59. As shown in FIG. 60, the filtering management 400#i includes a user category on each entry in addition to the pieces of information cataloged in the filtering management table 92#i shown in FIG. 5. The user category may indicate a preferentially treated user or an ordinary user. As described above, an ordinary user is allowed to use the intranet 24 only during a time range open to the user. An ordinary user is thus incapable of using the intranet 24 during a blocked-network time window. On the other hand, a preferentially treated user is allowed to use the intranet 24 indefinitely at any time.

Figure 61:
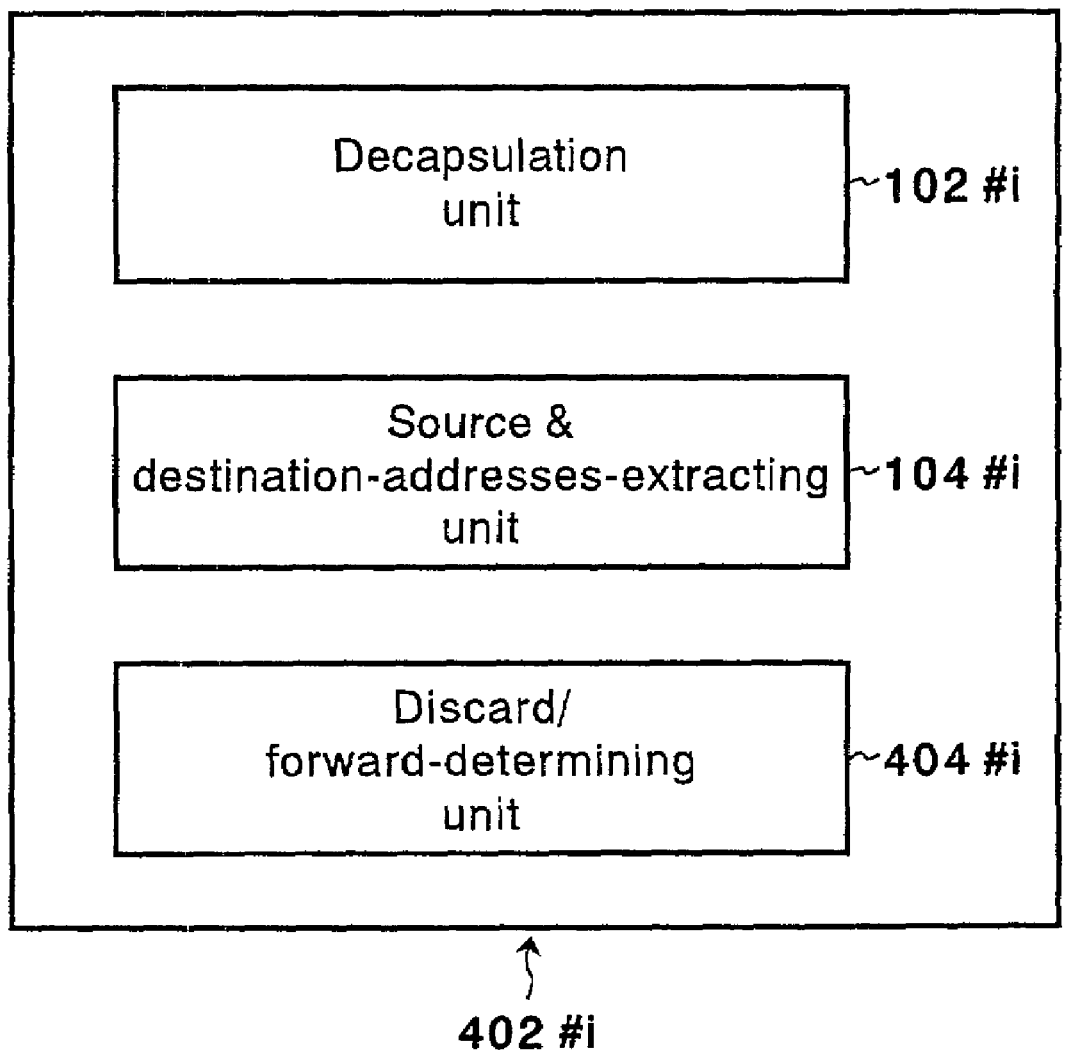
FIG. 61 is a diagram showing the configuration of a judgment circuit employed in the filtering unit shown in FIG. 59.

FIG. 61 is a diagram showing the configuration of a judgment circuit 402#i employed in the filtering unit 396#i shown in FIG. 59. Configuration elements of the judgment circuit 402#i which are virtually identical with those employed in the judgment circuit 94#i shown in FIG. 6 are denoted by the same reference numerals as the latter. As shown in FIG. 61, the judgment circuit 402#i comprises a decapsulation unit 102#i, a source & destination-addresses-extracting unit 104#i and a discard/forward-determining unit 404#i. The discard/forward-determining unit 404#i executes the following functions: 1) Refer to the filtering management table 400#i to determine whether an authorized user is a preferentially treated user or an ordinary user. 2) Pass on a received packet if the authorized user is a preferentially treated user and the packet is not transmitted to make an access to an object in the intranet 24. 3) Pass on a received packet if the authorized user is an ordinary user and the packet is not transmitted to make an access to an object in the intranet 24 during an open-network time range. 4) Discard or return a received packet if the conditions specified for functions 2 and 3 are not met.

Unlike the controller 62 employed in the boundary router A40 shown in FIG. 3, the controller 394 has a function to create the filtering management table 400#i used in the filtering unit 396#i in accordance with inputs entered by a person in charge of maintenance. The inputs include the IP address of an authorized user, the category of the authorized user, a network-opening time and a network-closing time.

The operation of the communication network shown in FIG. 57 is explained as follows.

1: Boundary Router B50

Since its operation is the same as the boundary router B50 employed in the first embodiment, the explanation is not repeated.

2: Boundary Router A390

Figure 62:
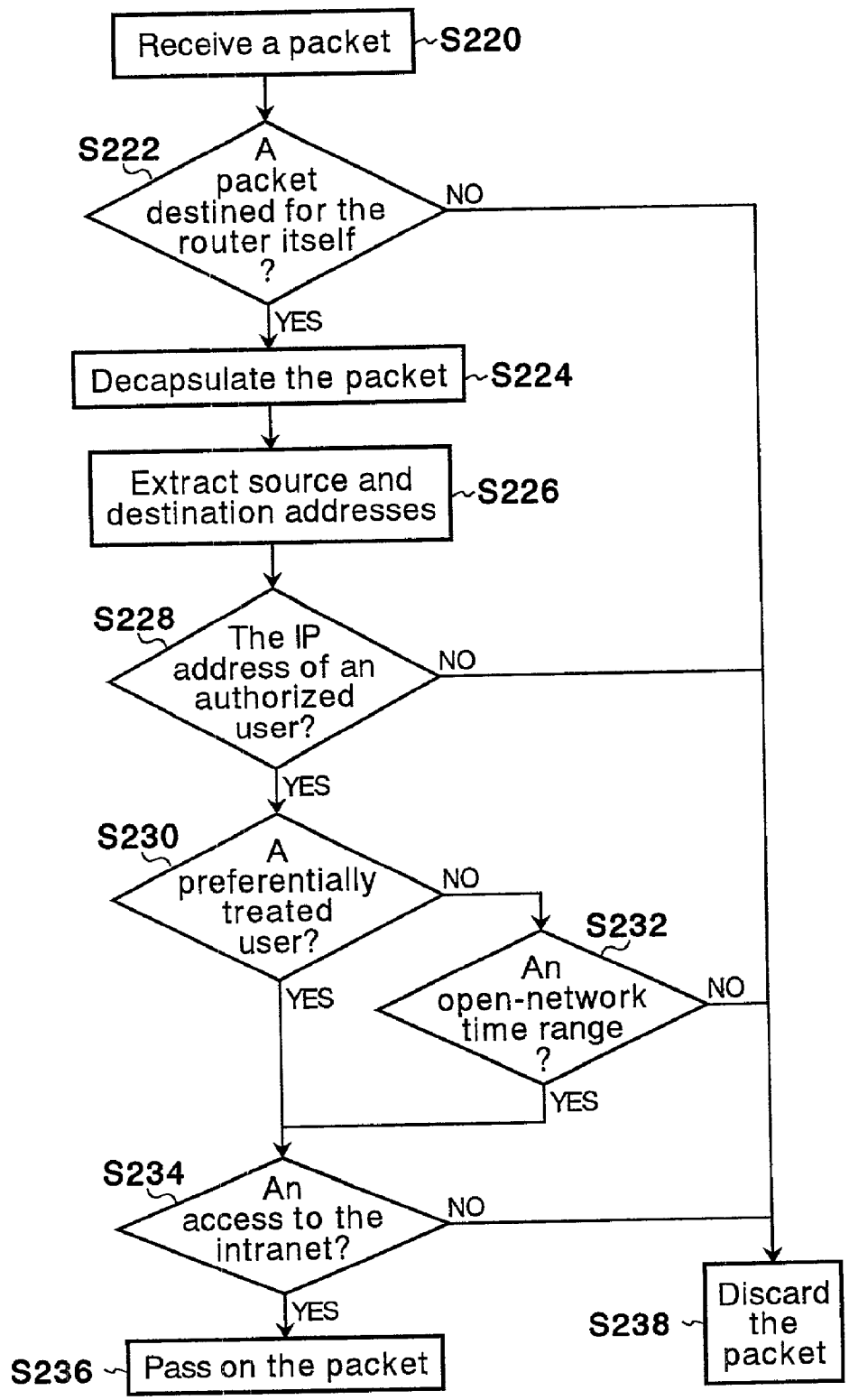
FIG. 62 is a flowchart representing packet control executed by boundary router A.

FIG. 62 is a flowchart representing packet control executed by the boundary router A390. At steps S220 to S228, the boundary router A390 carries out the same pieces of processing as respectively the steps S20 to S28 of the flowchart shown in FIG. 15. At a step S230, the judgment circuit 402#i employed in the IO port card 392#i searches the filtering management table 400#i for a user category associated with the source address of a received packet to determine whether an authorized user transmitting the packet is a preferentially treated user or an ordinary user. If the authorized user is a preferentially treated user, the flow of the control goes on to a step S234. If the authorized user is an ordinary user, on the other hand, the flow of the control goes on to a step S232. At steps S232 to S238, the boundary router A390 carries out the same pieces of processing as the steps S30 to S36 of the flowchart shown in FIG. 15. In this way, a preferentially treated user is allowed to use the intranet 24 without time limitations, that is, at any time such as a day time.

In accordance with the seventh embodiment, since a boundary router A390 classifies authenticated users into preferentially treated users and ordinary users, it is possible to render different services to different users in addition to the same effects as those exhibited by the first embodiment.

In accordance with the embodiments described above, a packet transmitted by an ordinary user is allowed to pass through an intranet during an open-network time range. As a result, resources of the intranet can be utilized more effectively.

It should be noted that the present invention is not limited to the details of the preferred embodiments described above. Instead, the scope of the present invention is defined by appended claims and all changes and modifications falling within the equivalence of the scope of the claims are therefore to be embraced by the invention.

What is claimed is:

1. A router provided on a boundary between the Internet and an intranet and used for receiving an incoming first packet and then passing on said first packet to a destination router indicated by a destination address of said first packet, said router comprising:
   a decapsulation unit for carrying out a process of decapsulating said first packet into a second packet in the case of said first packet including a predetermined address specified as said destination address;
   a first judgment unit for forming a judgment as to whether or not a user transmitting said first packet is an authorized user;
   a second judgment unit for forming a judgment as to whether or not the present time is within a time range allowed for said user transmitting said first packet; and
   a third judgment unit for forming a judgment as to whether or not said second packet obtained as a result of said process of decapsulating said first packet is allowed to pass through said intranet on the basis of a result of said judgment formed by said first judgment unit and a result of said judgment formed by said second judgment unit.

2. A router used for receiving an incoming packet and then passing on said packet to a destination router indicated by a destination address of said packet, said router comprising:
   a first judgment unit for forming a judgment as to whether or not the present time is within a time range open to a user transmitting said packet;
   a second judgment unit for comparing a distance to said destination address along a route to be traveled by said packet by way of a predetermined network with a distance to said destination address along a route to be traveled by said packet by way of the Internet only without passing through said predetermined network;
   a third judgment unit for forming a judgment as to whether to pass on said packet to said destination address along said route passing through said predetermined network or said route by way of said Internet only without passing through said predetermined network on the basis of a result of said judgment formed by said first judgment unit and a result of said judgment formed by said second judgment unit; and
   an encapsulation unit which is used for creating an encapsulated packet by adding an encapsulation header destined for said predetermined network to said packet in case a result of said judgment formed by said third judgment unit indicates that said packet is to be passed on to said destination address by way of said predetermined network.

3. A router according to claim 1 wherein:
   said router further has a message-transmitting unit for transmitting an open-network message to a second router transmitting said first packet; and
   said third judgment unit does not let said second packet obtained as a result of decapsulation of said first packet pass through said intranet prior to transmission of said open-network message.

4. A router according to claim 1 wherein:
   said router further has a message-transmitting unit for transmitting a blocked-network message to a second router transmitting said first packet; and
   said third judgment unit does not let said second packet obtained as a result of decapsulation of said first packet pass through said intranet after transmission of said blocked-network message.

5. A router according to claim 2 wherein said second judgment unit compares a distance to a destination address of a packet along a route to be traveled by said packet by way of a predetermined network with a distance to said destination address along a route to be traveled by said packet by way of the Internet only without passing through said predetermined network on the basis of distance information stored in a first table.

6. A router according to claim 2 wherein said encapsulation unit creates an encapsulated packet by adding an encapsulation header stored in a second table.

7. A router according to claim 5 wherein said distance information stored in said first table is obtained as a result of comparison of the first number of domains to be traveled to reach a predetermined router in said predetermined network with the second number of domains to be traveled to reach a destination address by communications with an adjacent router.

8. A router according to claim 2 wherein:
said router further has a message-receiving unit for receiving an open-network-message from said predetermined network; and
said third judgment unit transmits a packet by way of the Internet only without transmitting the packet by way of said predetermined network prior to reception of said open-network message.

9. A router according to claim 2 wherein:
said router further has a message-receiving unit for receiving a blocked-network-message from said predetermined network; and
said third judgment unit transmits a packet by way of the Internet only without transmitting the packet by way of said predetermined network after reception of said blocked-network message.

10. A router according to claim 2 wherein:
said router further has an operation-verifying unit for verifying operations of a plurality of other routers in said predetermined network; and
said encapsulation unit creates an encapsulated packet including an additional encapsulation header destined for one of said other routers with a normal operation verified by said operation-verifying unit.

11. A router according to claim 1 wherein:
said router further has a first table for storing a user category indicating whether a user transmitting a packet is a preferentially treated user or an ordinary user and storing an open-network time range for a user transmitting a packet indicated as an ordinary user by said user category for each source address;
said router further has a fourth judgment unit for forming a judgment as to whether a user transmitting a packet is a preferentially treated user or an ordinary user on the basis of said user category stored in said first table for a source address of said packet; and
said third judgment unit lets a second packet originated by a user judged by said fourth judgment unit to be a preferentially treated user pass through said intranet without regard to said open-network time range.

12. A communication network comprising the Internet, an intranet including a first boundary router connected to said Internet and a user network including a second boundary router connected to said Internet wherein:
said first boundary router includes:
a decapsulation unit for carrying out a process of decapsulating a first packet into a second packet in the case of said first packet including a predetermined address specified as a destination address;
a first judgment unit for forming a judgment as to whether or not a user transmitting said first packet is an authorized user;
a second judgment unit for forming a judgment as to whether or not the present time is within a time range allowed for said user transmitting said first packet; and
a third judgment unit for forming a judgment as to whether or not said second packet obtained as a result of said process of decapsulating said first packet is allowed to pass through said intranet on the basis of a result of said judgment formed by said first judgment unit and a result of said judgment formed by said second judgment unit; whereas
said second boundary router includes:
a fourth judgment unit for forming a judgment as to whether or not the present time is within a time range open to a user transmitting a third packet;
a fifth judgment unit for comparing a distance to a destination address of said third packet along a route to be traveled by said third packet by way of said intranet with a distance to said destination address along a route to be traveled by said third packet by way of the Internet only without passing through said intranet;
a sixth judgment unit for forming a judgment as to whether to pass on said third packet to said destination address along said route passing through said intranet or said route by way of said Internet only without passing through said intranet on the basis of a result of said judgment formed by said fourth judgment unit and a result of said judgment formed by said fifth judgment unit; and
an encapsulation unit which is used for creating an encapsulated packet by adding an encapsulation header destined for said first boundary router to said third packet in case a result of said judgment formed by said sixth judgment unit indicates that said third packet is to be passed on to said destination address by way of said intranet.

13. A communication network comprising:
a first edge node included in a user network for encapsulating a packet transmitted from a user included in said user network and transmitting an encapsulated packet having a destination address of a second edge node included in an intranet; and
said second edge node included in said intranet including a decapsulation unit for decapsulating said encapsulated packet, a table for cataloging users allowed to pass thought said intranet and a judgment unit for forming a judgment as to whether or not a first user having a source address of the decapsulated packet is cataloged in said table in a case where a second user having a destination address of said decapsulated packet is not included in said intranet and forming a judgment as to whether or not said decapsulated packet is allowed to transmit to an intranet after passing through said intranet on the basis of said judgment.

14. A communication method comprising:
encapsulating a packet and transmitting an encapsulated packet having a destination address of a second edge node included in an intranet by a first edge node included in a user network;
decapsulating said encapsulated packet by said second edge node included in an intranet;
forming a judgment as to whether or not a first user having a source address of the decapsulated packet is cataloged in a table for cataloging users allowed to pass though said intranet in a case where a second user having a destination address of said decapsulated packet is not included in said intranet; and
forming a judgment as to whether or not said decapsulated packet is allowed to transmit to an internet after passing through said intranet on the basis of the judgment.

* * * * *